(12) United States Patent
Magadi Rangaiah et al.

(10) Patent No.: US 8,521,167 B2
(45) Date of Patent: Aug. 27, 2013

(54) CELL RE-SELECTION IN A CELLULAR TELECOMMUNICATIONS NETWORK

(75) Inventors: Raghavendra Magadi Rangaiah, West Bromwich (GB); David Philip Hole, Southampton (GB); Johanna Lisa Dwyer, Kanata (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/308,008

(22) Filed: Nov. 30, 2011

(65) Prior Publication Data

US 2012/0135730 A1    May 31, 2012

Related U.S. Application Data

(60) Provisional application No. 61/418,028, filed on Nov. 30, 2010.

(51) Int. Cl.
*H04Q 7/20*    (2006.01)
(52) U.S. Cl.
USPC ............ 455/438; 455/439; 455/436; 370/331
(58) Field of Classification Search
USPC .......................... 455/438, 439, 436; 370/331
See application file for complete search history.

(56) References Cited

U.S. PATENT DOCUMENTS

| | | | |
|---|---|---|---|
| 7,852,817 B2 * | 12/2010 | Gallagher et al. | ............ 370/338 |
| 2008/0039086 A1 * | 2/2008 | Gallagher et al. | ......... 455/435.1 |
| 2008/0137612 A1 * | 6/2008 | Gallagher et al. | ............ 370/331 |
| 2008/0305793 A1 * | 12/2008 | Gallagher et al. | ......... 455/435.1 |
| 2009/0061877 A1 * | 3/2009 | Gallagher et al. | ............ 455/436 |
| 2010/0093358 A1 * | 4/2010 | Cheong et al. | ................ 455/444 |
| 2010/0279693 A1 * | 11/2010 | Hole | ............................. 455/436 |

FOREIGN PATENT DOCUMENTS

WO        2010127835 A1    11/2010

OTHER PUBLICATIONS

Nokia Siemens Networks; "E-UTRA Measurements and Cell Reselection Considerations," 3rd Generation Partnership Project (3GPP) TSG-RAN WG2 Meeting #58bis; Jun. 22, 2007; 6 pages.
3GPP TS 36.304 v9.4.0; "3rd Generation Partnership Project; Technical Specification Group Radio Access Network; Evolved Universal Terrestrial Radio Access (E-UTRA); User Equipment (UE) procedures in idle mode (Release 9)," Oct. 11, 2010; 32 pages.
Coppieters, Stefaan; Examiner; European Search Report from related European Patent Application No. 11191431; date of search completed Apr. 11, 2012; 2 pages.

* cited by examiner

*Primary Examiner* — Danh Le
(74) *Attorney, Agent, or Firm* — Fitch, Even, Tabin & Flannery LLP

(57) ABSTRACT

According to an aspect of the present invention, there is provided a method in a wireless cellular telecommunications device camped on a serving cell, the device storing a parameter obtained from a first cell. The method comprising: measuring an attribute of a signal received from a candidate cell; and, evaluating the candidate cell for re-selection. If a carrier frequency of the candidate cell matches a carrier frequency of the first cell, the evaluation of the candidate cell for re-selection is based on at least the measured attribute and the stored parameter, else the evaluation of the candidate cell for re-selection is performed without using the stored parameter. A device and computer readable medium are also provided.

76 Claims, 19 Drawing Sheets

//. # CELL RE-SELECTION IN A CELLULAR TELECOMMUNICATIONS NETWORK

TECHNICAL FIELD

The present disclosure relates to a cellular telecommunications system and, in particular, to a method of cell re-selection in a mobile device camped on a cell of the cellular telecommunications system.

BACKGROUND OF THE INVENTION

In a typical cellular radio system, a wireless telecommunication device communicates via one or more radio access networks (RAN) to one or more core networks. In a UMTS system such devices are typically referred to as User Equipment (UE) and in a GSM system such devices are typically referred to as Mobile Stations (MS). The terms can be considered as equivalent. In the description herein both terms may be used interchangeably, however, it will be noted that the term MS will be used predominantly since the present disclosure relates primarily to cell re-selection from a GSM EDGE Radio Access Network (GERAN) to a UMTS Terrestrial Radio Access Network (UTRAN) or an evolved UMTS Terrestrial Radio Access Network (e-UTRAN). It will be clear, however, that the present disclosure is not limited to this type of cell re-selection.

The Mobile Station (MS) comprises various types of equipment such as mobile telephones (also known as cellular or cell phones), laptops with wireless communication capability, tablet computers and personal digital assistants (PDAs) among others. These may be portable, hand held, pocket sized or installed in a vehicle for example and communicate voice or data signals or both with the radio access network (RAN). Of course the MS may not be mobile, but may be fixed in a location. In this context the term mobile may simply refer to the communication capabilities of the device.

In the following, reference will be made to Global System for Mobile Communications (GSM), Universal Mobile Telecommunications System (UMTS), Long Term Evolution (LTE) and to particular standards. However it should be understood that the present disclosure is not intended to be limited to any particular mobile telecommunications system or standard.

The RAN covers a geographical area divided into a plurality of cell areas. Each cell area is served by at least one base station, which in UMTS may be referred to as a Node B or enhanced Node B in LTE. Each cell may be identified by a unique identifier which is broadcast in the cell. The base stations communicate at radio frequencies over a radio interface with the UEs which are camped on the cell (these may be some or all of the UEs which are within the range of the base station). Several base stations may be connected to a radio network controller (RNC) which controls various activities of the base stations. The RNCs are typically connected to a core network. Each cell implements a particular radio access technology (RAT) such as UMTS Terrestrial Radio Access (UTRA) among others. In a GERAN (Global system for mobile communications (GSM)/Enhanced Data rates for GSM Evolution (EDGE) radio access network), the radio access network may include one or more base stations (BTSs) and one or more Base station controllers (BSCs) which together implement the functionality of the base station subsystem (BSS) in respect of any particular cell.

Cell selection, sometimes referred to as cell search, for a UE is described in the 3GPP TS 25.304 specification, V8.1.0, "User Equipment (UE) procedures in idle mode and procedures for cell re-selection in connected mode" which is incorporated herein by reference and referred to herein as the 25.304 specification. Section 5.2.3 and in particular section 5.2.3.1.1 of the 25.304 specification describes the cell selection process. One of the considerations in the cell selection process is whether a cell is "suitable". Criteria for suitability may include criteria related to signal strength and/or signal quality (referring to the signal transmitted by the candidate cell base station, as received by the UE). Some of the criteria that are used in the suitability evaluation are based on parameters which must be decoded by the device after tuning to the frequency of the candidate cell.

When idle, an MS will evaluate the properties of detected telecommunications cells, other than the cell it is currently connected to or camped on (often known as the serving cell), in order to identify if the detected or candidate cells would be better suited for connection rather than the serving cell. The process of the MS autonomously changing the serving cell while in idle mode is known as cell re-selection (though re-selection may not be restricted to idle mode or purely autonomous cell change or both). The process by which an MS first camps on a cell following power-up or loss of radio coverage is known as cell selection. The criteria for cell re-selection may include such things as received signal strength and signal quality. Parameters associated with these criteria may be broadcast or otherwise transmitted in the serving cell. One of the requirements for cell re-selection (and selection) may be that the candidate cell is suitable. The criteria for suitability may include criteria related to signal strength and/or signal quality (referring to the signal transmitted by the candidate cell base station, as received by the MS). Some of the criteria that are used in the suitability evaluation are based on parameters which must be decoded by the MS after tuning to the frequency of the candidate cell. The decoding of the parameters from the candidate cell can require significant battery power for the MS. Regular evaluation based on decoding suitability parameters in this way is particularly undesirable in mobile devices where battery life is limited.

The existing solution to this problem is to store and re-use the most recently decoded suitability criteria parameters. This solution is outlined in the 3GPP TS 45.008 specification V9.4.0, which is incorporated herein by reference and referred to herein as the '45.008 specification'. Section 6.6.5, section 6.6.6 and section 6.6.7 of the 45.008 specification describe the cell re-selection processes, entitled "Algorithm for cell re-selection from GSM to UTRAN", "Algorithm for inter-RAT cell re-selection based on priority information" and "Cell selection and re-selection to CSG cells and hybrid cells", respectively. The algorithm defined in Section 6.6.5 may be described as the 'ranking algorithm' and the algorithm defined in Section 6.6.6 may be described as the 'priority-based algorithm'. These terms may be used throughout the description herein.

According to the existing solution, when evaluating the suitability of a candidate cell, suitability parameters of a cell from which the suitability parameters were most recently decoded may be used. This solution, although it may reduce the battery usage or long term power requirements of the MS, carries with it inherent limitations. Specifically, for example, it is easy for an MS to discount the suitability of candidate cell and thus not re-select to the cell when it should. This may be because the parameters used to evaluate its suitability are incorrect, for example because the suitability parameters of the candidate cell are not the same as those that are being applied. Alternatively, an MS may incorrectly consider a cell as a valid cell for re-selection and proceed to, wastefully, tune to the candidate cell's frequency and decode parameters from that cell. This may be a particular problem if a wide range of threshold parameters are applicable to the cells that the MS could potentially reselect to. When one of these threshold parameters are stored, it may be used to incorrectly evaluate another cell in the network for which a different value is applicable.

In an example scenario, an operator may wish that devices in idle mode camp on cells of one frequency, and devices in connected mode, i.e. with active ongoing data or voice calls, operate in cells of a different frequency. The operator may attempt to achieve this by discouraging idle mode re-selection to a particular frequency by means of the suitability criteria, i.e. the suitability criteria are set such that an MS will be very unlikely to meet those criteria. In this scenario, the MS may evaluate such cells for suitability using a considerable amount of power in the process based on criteria that are easier to meet. Additionally, if the MS has stored these incorrect parameters for re-use in the suitability evaluation for other cells, the MS may not camp on a cell on which it should.

It would be desirable for a candidate cell meeting the re-selection criteria to not fail the suitability aspect of the re-selection tests. The present disclosure addresses the problem of how to efficiently and effectively evaluate a candidate cell for re-selection. The present disclosure minimises the need to tune to the frequency of a candidate cell and decode suitability parameters from candidate cells while avoiding the risk of discounting a candidate cell incorrectly.

BRIEF DESCRIPTION OF THE DRAWINGS

Examples of the present disclosure will now be described in detail with reference to the accompanying drawings, in which.

The same reference numerals used in different figures denote similar elements.

DETAILED DESCRIPTION

Figure 1A:
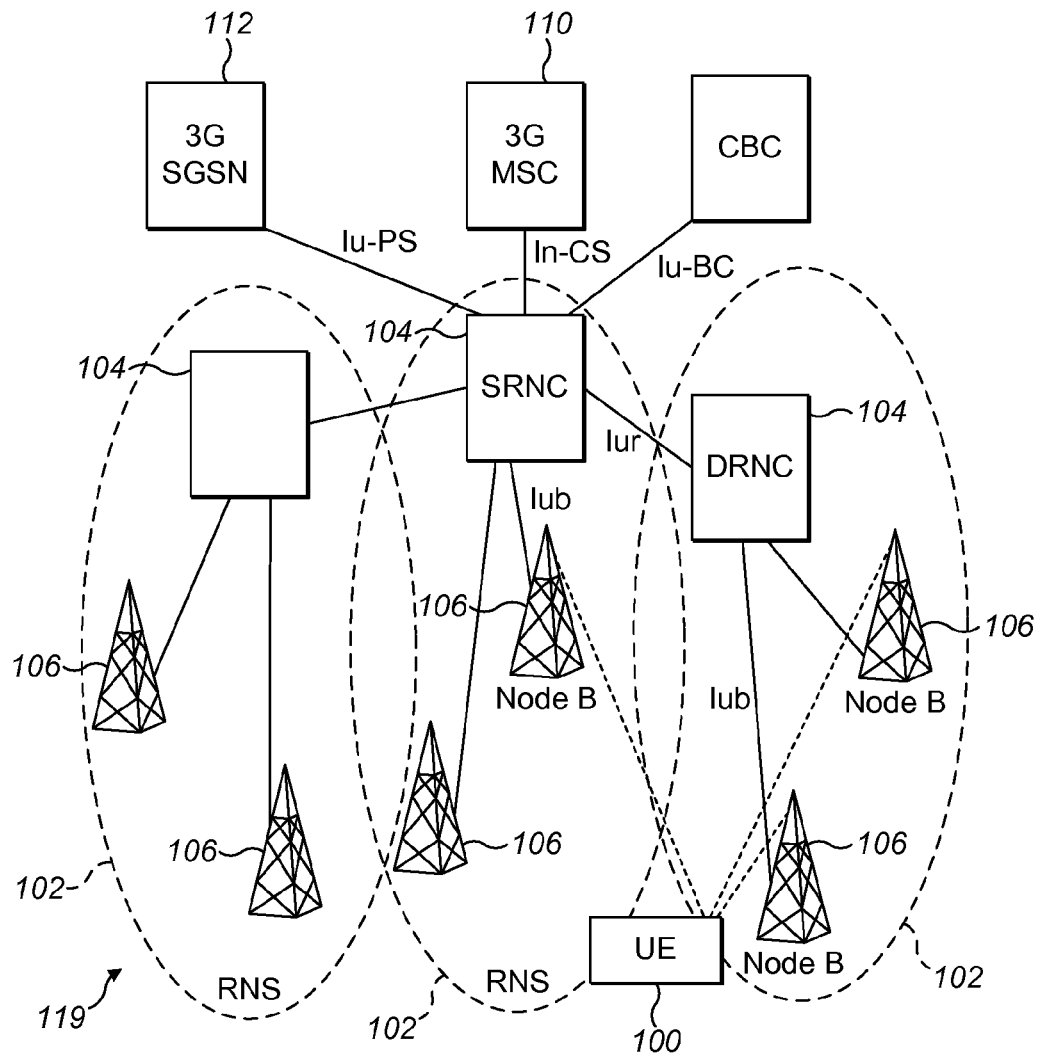
FIG. 1A is a diagram showing an overview of a network and a UE device.

Embodiments set out in this application relate generally to a method of cell re-selection in an electronic device. Embodiments may efficiently evaluate a candidate cell when performing re-selection, without having to tune to the frequency of a candidate cell and decode suitability parameters from that cell every time the evaluation is performed.

According to an aspect of the present invention, there is provided a method in a wireless cellular telecommunications device camped on a serving cell, the device storing a parameter obtained from a first cell, the method comprising:

measuring an attribute of a signal received from a candidate cell; and, evaluating the candidate cell for re-selection, wherein if a carrier frequency of the candidate cell matches a carrier frequency of the first cell, the evaluation of the candidate cell for re-selection is based on at least the measured attribute and the stored parameter, else the evaluation of the candidate cell for re-selection is performed without using the stored parameter.

According to an aspect of the present disclosure, there may be provided a method in a wireless cellular telecommunications device camped on a serving cell, the device storing a parameter obtained from a first cell, the method comprising:

measuring an attribute of a signal received from a candidate UTRAN cell; and, evaluating the candidate cell for re-selection, wherein, if a carrier frequency of the candidate cell matches a carrier frequency of the first cell, the evaluation of the candidate cell for re-selection is based on at least the measured attribute and the stored parameter, else the evaluation of the candidate cell for re-selection is performed without using the stored parameter.

According to an aspect of the present disclosure, there may be provided a method in a wireless cellular telecommunications device camped on a serving cell, the device storing a parameter obtained from a first cell, the method comprising:

measuring an attribute of a signal received from a candidate cell; and, evaluating the candidate cell for re-selection according to a ranking algorithm, wherein, if a carrier frequency of the candidate cell matches a carrier frequency of the first cell, the evaluation of the candidate cell for re-selection is based on at least the measured attribute and the stored parameter, else the evaluation of the candidate cell for re-selection is performed without using the stored parameter. The candidate cell may be a UTRAN cell.

In certain embodiments the method may further comprise performing re-selection from the serving cell to the candidate cell based on the evaluation.

Additionally, if the frequency of the candidate cell matches the frequency of the first cell, the evaluation may also include determining if the candidate cell meets re-selection requirements, wherein, if the measured attribute fails to exceed the stored parameter by a first pre-determined amount, the evaluation includes determining that the candidate cell does not meet re-selection requirements. The first predetermined amount may be +10 dB.

Further, if the carrier frequency of the candidate cell does not match the carrier frequency of the first cell, the evaluation of the candidate cell for re-selection may include: determining if the measured attribute exceeds a predetermined default value; and, if the measured attribute fails to exceed the predetermined default value, determining that the candidate cell does not meet re-selection requirements.

Additionally, the first cell may be different from the serving cell, the device having been previously camped on the first cell. Alternatively, the first cell and the candidate cell may be of the same wireless radio access technology.

In certain embodiments, the evaluation of the candidate cell may include: acquiring system information of the candidate cell, the system information including a parameter; determining if the measured attribute exceeds the candidate cell parameter by a second predetermined amount; and, if the measured attribute exceeds the candidate cell parameter by the second predetermined amount, performing re-selection to the candidate cell. The second predetermined amount may be 0 dB.

Further, the stored parameter may indicate a minimum required receive level. The measured attribute may be received signal code power (RSCP). Additionally, the serving cell may be a GERAN cell.

In certain embodiments, the method may further comprise: acquiring a parameter of a second cell; and, if a carrier frequency of the second cell does not match the carrier frequency of the first cell, storing said second cell parameter, else if the carrier frequency of the second cell matches the carrier frequency of the first cell, replacing the stored parameter with the second cell parameter such that when evaluating a candidate cell for re-selection, if the carrier frequency of the candidate cell matches the carrier frequency of the second cell, the evaluation of the candidate cell for re-selection is based on at least the measured attribute and the stored second cell parameter. If the candidate cell has an identifier equivalent to an identifier of the first cell, the evaluation of the candidate cell for re-selection may be based on at least the measured attribute and the stored parameter, else the evaluation of the candidate cell for re-selection may be performed without using the stored parameter. The identifier may be a primary scrambling code.

Additionally, the method may further comprise: determining if a candidate cell is a closed subscriber group cell; and, if the candidate cell and the first cell are closed subscriber group cells, the evaluation of the candidate cell for re-selection is based on at least the measured attribute and the stored parameter, else the evaluation of the candidate cell for re-selection is performed without using the stored parameter.

The serving and candidate cells may be of the same wireless radio network. Alternatively, the serving and candidate cells may be of different wireless radio networks.

According to an aspect of the present disclosure, there may be provided a wireless cellular telecommunications device adapted to: camp on a serving cell; store a parameter obtained from a first cell; measure an attribute of a signal received from a candidate UTRAN cell; and, evaluate the candidate cell for re-selection, wherein if a carrier frequency of the candidate cell matches a carrier frequency of the first cell, the evaluation of the candidate cell for re-selection is based on at least the measured attribute and the stored parameter, else the evaluation of the candidate cell for re-selection is performed without using the stored parameter.

According to an aspect of the present disclosure, there may be provided a wireless cellular telecommunications device adapted to: camp on a serving cell; store a parameter obtained from a first cell; measure an attribute of a signal received from a candidate cell; and, evaluate the candidate cell for re-selection according to a ranking algorithm, wherein if a carrier frequency of the candidate cell matches a carrier frequency of the first cell, the evaluation of the candidate cell for re-selection is based on at least the measured attribute and the stored parameter, else the evaluation of the candidate cell for re-selection is performed without using the stored parameter.

According to an aspect of the present disclosure, there may be provided a computer-readable storage medium having stored thereon instructions which can be executed by a device to: camp on a serving cell; store a parameter obtained from a first cell; measure an attribute of a signal received from a candidate UTRAN cell; and, evaluate the candidate cell for re-selection, wherein if a carrier frequency of the candidate cell matches a carrier frequency of the first cell, the evaluation of the candidate cell for re-selection is based on at least the measured attribute and the stored parameter, else the evaluation of the candidate cell for re-selection is performed without using the stored parameter.

According to an aspect of the present disclosure, there may be provided a computer-readable storage medium having stored thereon instructions which can be executed by a device to: camp on a serving cell; store a parameter obtained from a first cell; measure an attribute of a signal received from a candidate cell; and, evaluate the candidate cell for re-selection according to a ranking algorithm, wherein if a carrier frequency of the candidate cell matches a carrier frequency of the first cell, the evaluation of the candidate cell for re-selection is based on at least the measured attribute and the stored parameter, else the evaluation of the candidate cell for re-selection is performed without using the stored parameter.

According to an aspect of the present disclosure, there may be provided a method in a wireless cellular telecommunications device camped on a serving cell, the device storing a parameter obtained from a first cell, the method comprising:

measuring an attribute of a signal received from a candidate cell; and, evaluating the candidate cell for re-selection, wherein, if the candidate cell has an identifier equivalent to an identifier of the first cell, the evaluation of the candidate cell for re-selection is based on at least the measured attribute and the stored parameter, else the evaluation of the candidate cell for re-selection is performed without using the stored parameter.

In certain embodiments, if the candidate cell has an identifier equivalent to the identifier of the first cell, the evaluation may include determining if the candidate cell meets re-selection requirements, wherein, if the measured attribute fails to exceed the stored parameter by a first pre-determined amount, the evaluation includes determining that the candidate cell does not meet re-selection requirements. The first predetermined amount may be 0 dB. Alternatively, the first predetermined amount may be +10 dB.

According to an aspect of the present disclosure, there may be provided a method in a wireless cellular telecommunications device camped on a serving cell, the device storing a first parameter obtained from system information of a first cell, the method comprising:

measuring an attribute of a signal received from a candidate cell;

determining if the candidate cell is a closed subscriber group cell; and, evaluating the candidate cell for re-selection, wherein, if the candidate cell is determined to be a closed subscriber group cell, the evaluation of the candidate cell for re-selection is based on at least the measured attribute irrespective of the first stored parameter, said first stored parameter indicating a minimum value for the measured attribute.

In certain embodiments, the device has a second stored parameter obtained from a closed subscriber group cell and in which the first cell is not a closed subscriber group cell, wherein, if the candidate cell is determined to be a closed subscriber group cell, the evaluation of the candidate cell for re-selection is based on at least the measured attribute and the second stored parameter.

Additionally, if the evaluation is based on at least the measured attribute and the second stored parameter, the evaluation may include determining if the cell meets re-selection requirements, wherein, if the measured attribute fails to exceed the second stored parameter by a first pre-determined amount, determining that the candidate cell does not meet re-selection requirements. The first predetermined amount may be 0 dB. Alternatively, the first predetermined amount may be +10 dB.

Further, if the candidate cell has an identifier equivalent to an identifier of the second cell and the candidate cell is determined to be a closed subscriber group cell, the evaluation of the candidate cell for re-selection may be based on at least the second stored parameter, else the evaluation of the candidate cell for re-selection is performed without using the second stored parameter.

The identifier may be a locally unique identifier. The identifier may be a physical layer identifier. The identifier may be a primary scrambling code.

In certain embodiments, if the candidate cell has a carrier frequency matching a carrier frequency of the second cell and the candidate cell has a primary scrambling code matching the primary scrambling code of the second cell and the candidate cell is determined to be a closed subscriber group cell, the evaluation of the candidate cell for re-selection is based on at least the measured attribute and second stored parameter, else the evaluation of the candidate cell for re-selection is performed without using the second stored parameter.

Additionally, if the evaluation is performed without using the stored parameter, the evaluation of the candidate cell may include: determining if the measured attribute exceeds a predetermined default value; and, if the measured attribute fails to exceed the predetermined default value, determining that the candidate cell does not meet re-selection requirements.

The candidate cell may be a UTRAN cell. The candidate cell may be a E-UTRAN cell. The identifier of the first cell may also be a physical layer cell identifier. The serving cell may be a GERAN cell.

In certain embodiments, the method may further comprise performing re-selection from the serving cell to the candidate cell based on the evaluation. The evaluation of the candidate cell may also include: acquiring system information of the candidate cell, the system information including a parameter; determining if the measured attribute exceeds the candidate cell parameter by a second predetermined amount; and, if the measured attribute exceeds the candidate cell parameter by the second predetermined amount, performing re-selection to the candidate cell. The second predetermined amount may be 0 dB.

Further, the stored parameter may indicate a minimum required receive level. The measured attribute may be a received signal code power (RSCP).

Also, the serving and candidate cells, may be of the same wireless radio network. Alternatively, the serving and candidate cells may be of different wireless radio networks.

According to an aspect of the present disclosure, there may be provided a wireless cellular telecommunications device adapted to: camp on a serving cell; store a parameter obtained from a first cell; measure an attribute of a signal received from a candidate cell; and, evaluate the candidate cell for re-selection, wherein, if the candidate cell has an identifier equivalent to an identifier of the first cell, the evaluation of the candidate cell for re-selection is based on at least the measured attribute and the stored parameter, else the evaluation of the candidate cell for re-selection is performed without using the stored parameter.

According to an aspect of the present disclosure, there may be provided a wireless cellular telecommunications device adapted to: camp on a serving cell; store a parameter obtained from system information of a first cell; measure an attribute of a signal received from a candidate cell; determine if the candidate cell is a closed subscriber group cell; and, evaluate the candidate cell for re-selection, wherein, if the candidate cell is determined to be a closed subscriber group cell, the evaluation of the candidate cell for re-selection is based on at least the measured attribute irrespective of the first stored parameter, the parameter indicating a minimum value for the measured attribute.

According to an aspect of the present disclosure, there may be provided a computer-readable storage medium having stored thereon instructions which can be executed by a device to: camp on a serving cell; store a parameter obtained from a first cell; measure an attribute of a signal received from a candidate cell; and, evaluate the candidate cell for re-selection, wherein, if the candidate cell has an identifier equivalent to an identifier of the first cell, the evaluation of the candidate cell for re-selection is based on at least the measured attribute and the stored parameter, else the evaluation of the candidate cell for re-selection is performed without using the stored parameter.

According to an aspect of the present disclosure, there may be provided A computer-readable storage medium having stored thereon instructions which can be executed by a device to: camp on a serving cell; store a parameter obtained from a first cell; measure an attribute of a signal received from a candidate cell; determine if the candidate cell is a closed subscriber group cell; and, evaluate the candidate cell for re-selection, wherein, if the candidate cell is determined to be a closed subscriber group cell, the evaluation of the candidate cell for re-selection is based on at least the measured attribute irrespective of the first stored parameter, the parameter indicating a minimum value for the measured attribute.

According to an aspect of the present disclosure, there may be provided a method in a wireless cellular telecommunications device camped on a serving cell, the device storing a parameter obtained by decoding system information of a first cell, the method comprising:

measuring an attribute of a signal received from a candidate cell; and, evaluating the candidate cell for re-selection based on the measured attribute according to a priority-based re-selection algorithm irrespective of the stored parameter, wherein the parameter indicates a minimum required received signal code power.

In certain embodiments, the method may further comprise performing re-selection from the serving cell to the candidate cell based on the evaluation. The evaluation of the candidate cell may also includes acquiring system information of the candidate cell, the system information including a parameter; determining if the measured attribute exceeds the candidate cell parameter by a predetermined amount; and, if the measured attribute exceeds the candidate cell parameter by a predetermined amount, performing re-selection to the candidate cell. The predetermined amount may be 0 dB.

Additionally, the evaluation of the candidate cell for re-selection may include: determining if the measured attribute exceeds a predetermined default value; and, if the measured attribute fails to exceed the predetermined default value, determining that the candidate cell does not meet re-selection requirements.

In certain embodiments, the measured attribute may be received signal code power (RSCP). The candidate cell may be a UTRAN cell. The serving cell may be a GERAN cell.

Further, the method may also comprise: measuring an attribute of a signal received from a second cell; and, evaluating the second cell for re-selection based on the measured attribute and the stored parameter according to a ranking algorithm.

Additionally, the serving and candidate cells may be of the same wireless radio network. Alternatively, the serving and candidate cells may be of different wireless radio networks.

According to an aspect of the present disclosure, there may be provided a wireless cellular telecommunications device adapted to: camp on a serving cell; store a parameter obtained by decoding system information of a first cell; measure an attribute of a signal received from a candidate cell; and, evaluate the candidate cell for re-selection based on the measured attribute according to a priority-based re-selection algorithm irrespective of the stored parameter, wherein the parameter indicates a minimum required signal code power.

According to an aspect of the present disclosure, there may be provided a computer-readable storage medium having stored thereon instructions which can be executed by a device to: camp on a serving cell; store a parameter obtained by decoding system information of a first cell; measure an attribute of a signal received from a candidate cell; and, evaluate the candidate cell for re-selection based on the measured attribute according to a priority-based re-selection algorithm irrespective of the stored parameter, wherein the parameter indicates a minimum required signal code power.

Other aspects and features of the present teaching will become apparent to those ordinarily skilled in the art upon review of the following description of specific embodiments of a method and apparatus for cell re-selection in a telecommunication system and the accompanying claims. Any method disclosed herein may be implemented in a mobile station device of a wireless communications network.

Radio Access Networks of the GSM/EDGE (GSM/EDGE Radio Access Network, GERAN), UMTS (UMTS Terrestrial Radio Access Network, UTRAN) or LTE (evolved UMTS Terrestrial Radio Access Network, e-UTRAN) type typically include multiple cells covering a geographical area each of which may implement a different radio access technology (RAT). 2G may refer to GSM and 3G may refer to UMTS and the terms may be used interchangeably. As described above, a Mobile Station (MS) once connected to a cell, known as the serving cell, may evaluate other detected cells, known as candidate cells, to determine if they would be more suitable for connection than the serving cell. When operating in a cell, the MS is referred to as being camped on the cell. In the description herein the MS may be referred to as being "in a cell", "camped on a cell" or using a "serving cell". These terms may be used interchangeably and define that the MS is able to be paged for downlink data by that cell. The description herein may refer to 2G and 3G.

Figure 2:
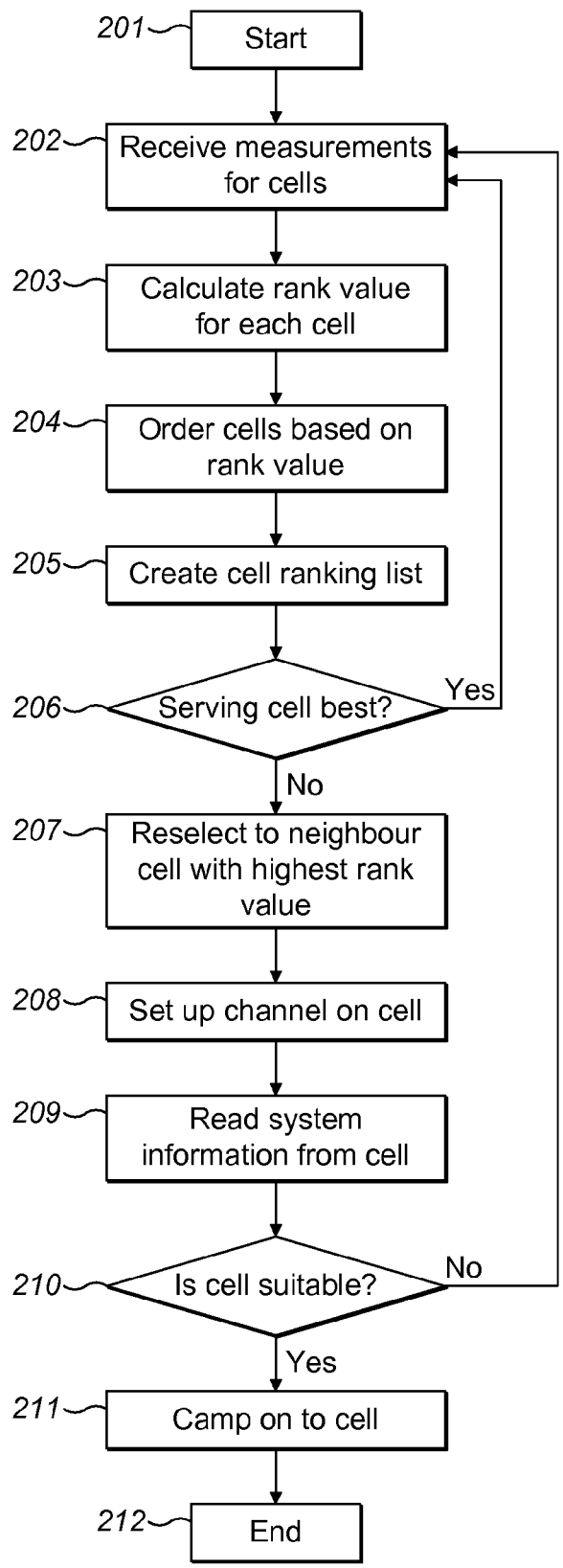
FIG. 2 shows a flow diagram of a known ranking algorithm for cell re-selection.

By the terms 'Ranking Algorithm' and 'Priority-Based Re-selection Algorithm' which are used throughout the description herein, we mean the following:

In a ranking algorithm, radio measurements of cells (possibly modified by offsets and/or scaling factors, and possibly subject to minimum thresholds) are compared and re-selection is generally made to the highest thus-ranked cell. In a ranking algorithm, cells on different frequencies, or using different radio access technologies may be compared directly and thus ranked relative to each other. Radio measurements (or derived values for example based on a received cell signal quality or power) are the key basis of comparison of candidate cells. An example of a ranking algorithm is shown in FIG. 2.

In a priority-based re-selection algorithm, cells (typically grouped according to their frequency of operation and/or radio access technology) are assigned priorities. These priorities are the primary means by which cells are considered (radio measurements of the neighbour cells being a secondary consideration) when determining which cell, if any, the device should reselect to. (Note that other considerations may be made, such as based on measurements of the serving cell, in addition to the priority level). According to current 3GPP priority-based re-selection, priorities are assigned on a per-frequency basis (i.e. such that all cells operating using the same radio access technology and same carrier frequency are assigned the same priority), or (in the case of GSM cells) on a per-radio access technology (cells operating according to GSM-based technologies operating on different carrier frequencies may be assigned the same priority). In particular, radio measurements of cells of different priorities need not be compared to each other (though radio measurements may be used for any cell, regardless of its respective priority, to check if it meets minimum camping/service criteria or to evaluate it against a measurement threshold). For example, a cell of one priority can be determined to meet all applicable re-selection criteria, without consideration of any radio measurements of a cell of a lower priority.

Referring to the drawings, FIG. 1A is a schematic diagram showing an overview of a UMTS network and a user equipment device. Clearly in practice there may be many user equipment devices operating with the network but for the sake of simplicity FIG. 1A only shows a single user equipment device 100.

For the purposes of illustration, FIG. 1A also shows a radio access network 119 (UTRAN) used in a UMTS system having a few components. It will be clear to a person skilled in the art that in practice a network will include far more components than those shown.

The network 119 as shown in FIG. 1A comprises three Radio Network Subsystems (RNS) 102. Each RNS has a Radio Network Controller (RNC) 104. Each RNS 102 has one or more Node B 102 which are similar in function to a Base Transmitter Station of a GSM radio access network. User Equipment UE 100 may be mobile within the radio access network. Radio connections (indicated by the straight dotted lines in FIG. 1A) are established between the UE and one or more of the Node Bs in the UTRAN.

Figure 1B:
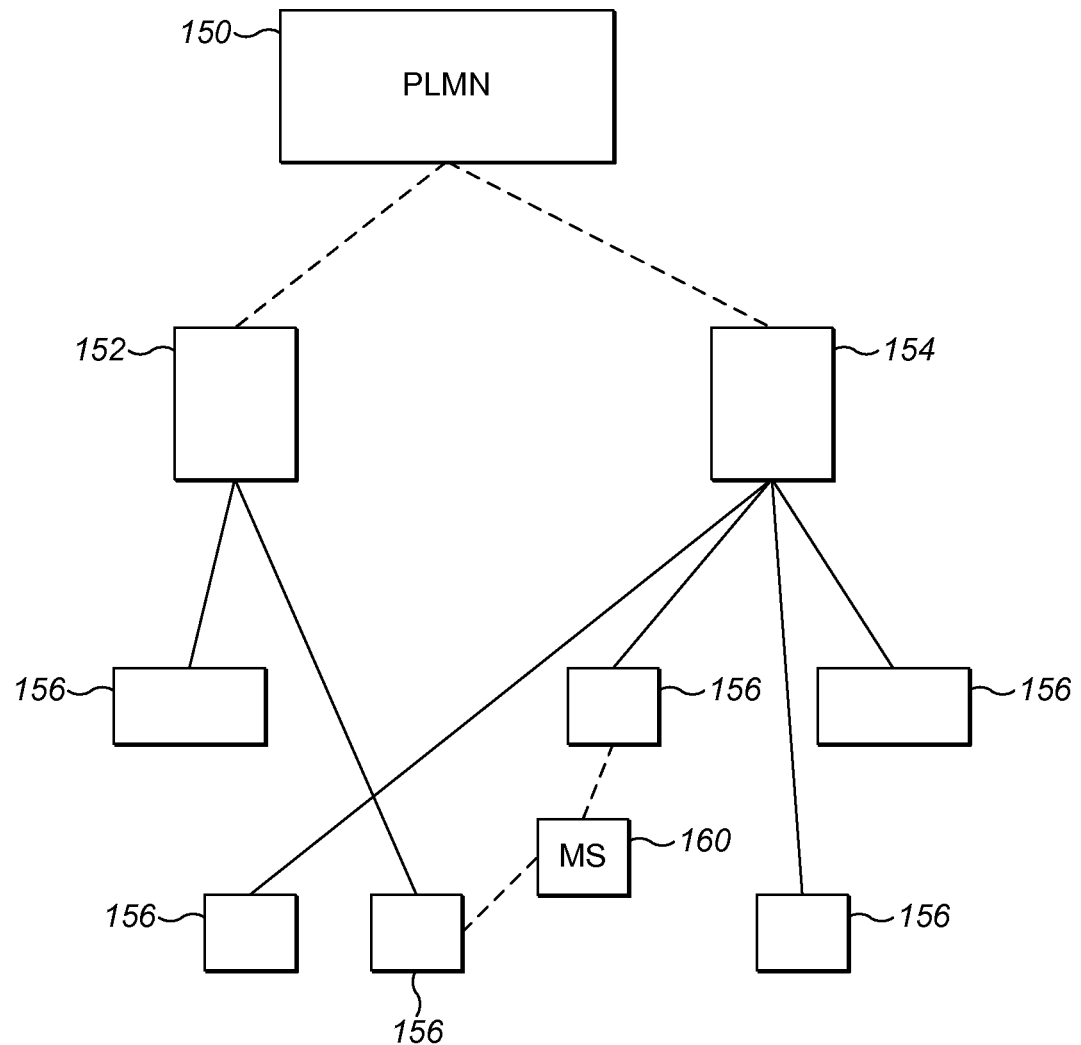
FIG. 1B shows a schematic system suitable for implementing a first embodiment of the present invention.

FIG. 1B shows a further schematic of a network system. Typically each radio access network (RAN) includes radio access devices 156 to provide the radio link between the wireless communications device, the MS 160, and the rest of the radio access network. These radio access devices 156 are known as base stations in GSM and Node Bs in UMTS. The RAN in e-UTRAN comprises only e-Node Bs. In GSM and UMTS, the RAN also comprises a Radio Network Controller (RNC) or Base Station Controller (BSC), 152, 154, and the base stations; the RNCs and BSCs are connected to one or more core networks (typically at least one for packet-switched services and one for circuit-switched services). RNCs connect to 3G base stations (node Bs) and BSCs connect to 2G base stations (in which case the combined BSC and base station perform the functionality of a base station subsystem (BSS)), even though they may be physically co-located or even in the same unit. The core network (not shown) is associated with a Public Land Mobile Network (PLMN) 150; it is possible for a single RAN to connect to the core networks of multiple PLMNs (not shown).

Each 3G cell may be uniquely (within the local area) identified by a frequency and a primary scrambling code. Generally a cell refers to a radio network object that can be uniquely identified by an MS 160 from a cell identifier that is broadcast over geographical areas by a base station, node B, e Node B or similar entity. A single physical Node B may generate more than one cell since it may operate at multiple frequencies, or with multiple scrambling codes or both. A candidate cell may be ultimately connected to the same PLMN as the serving cell.

FIG. 2 shows a flow diagram illustrating known processes performed by an MS during a known cell re-selection procedure according to a ranking algorithm. Referring to FIG. 2, the process starts at step 201. At step 202, cell measurements, for example intra-frequency, inter-frequency and inter-RAT cell measurements, are generated or received by the MS. At step 203 rank values are calculated for each cell. In one example these cells are the serving cell and neighbouring cells. One example of the calculation usable to calculate a rank value in the form of cell-ranking criterion R is defined in section 5.2.6.1.4 of the 3GPP TS 25.304 specification, V8.1.0, "User Equipment (UE) procedures in idle mode and procedures for cell re-selection in connected mode" which is incorporated herein by reference and referred to herein as the 25.304 specification (see the calculations for R, for serving cells and R, for neighbouring cells in that section). In that example the rank values are calculated for cells if they satisfy the conditions set in section 5.2.6.1.4 of the 25.304 specification.

At step 204 the cells are ordered based on the rank values. In one example, only cells with rank values better than that of the serving cell are considered and these are compiled in a list. At step 205 the resulting Cell Ranking List is created. At step 206 if the MS finds that the serving cell is best (i.e. has the highest rank value) then the MS remains camped on to the serving cell and the process reverts to step 202.

If at step 206 the MS finds that the serving cell is not the best (i.e. does not have the highest rank value) then at step 207 the MS attempts to reselect to a neighbour cell with the highest rank value. To this end, at 208 a channel (in one example a Primary Common Control Physical Channel (PC-CPCH)) is set up, at 209 system information (in one example in the form of Master Information Blocks (MIBs) and System Information Blocks (SIBs)) is read from the neighbour cell and at 210 a check is made that the cell is a suitable cell. A suitable cell is a cell on which an MS may camp; examples include a cell which has acceptable signal strength and/or is not in a forbidden location area and/or is not barred and/or for an automatic search, belongs to the correct Public Land Mobile Network (PLMN). If the cell is suitable the MS camps on to the neighbour cell at 211. If the cell is not a suitable cell, the process reverts to 202. The process ends at 212.

As noted above, the process shown in FIG. 2 requires that a communications channel is established with the candidate cell in order to determine the system information from the cell and hence the suitability of the cell for selection. Generally, the described process of establishing a channel with the candidate cell is simply to permit the decoding of system information, which is broadcast. In the context of the present disclosure, establishing a communications channel does not, necessarily, imply any particular behaviour by the network, that is, the network does not positively 'establish' the channel, given that it may continually broadcast the system information.

This decoding is particularly power intensive and time-consuming for the MS. If the serving cell is a GERAN cell, then it is likely that it will often be below a neighbouring cell in the ranking list as a result of the ranking calculation. Consequently the MS may be repeatedly be checking the neighbouring cells for suitability and therefore establishing communication channels on those cells to decode the system information.

It may be the case that the system information received from the neighbouring cells contains a parameter of suitability such that it is unlikely that the MS will ever determine that cell to be suitable. The parameter may have been set by the network operator so that MS can vary rarely, if ever, camp on that cell. In this scenario, the MS will repeatedly establish a communication channel on the cell using a large and unnecessary amount of power in the process.

In an example scenario, an operator may wish that devices in idle mode camp on cells of one frequency, and devices in connected mode, i.e. with active ongoing data or voice calls, operate in cells of a different frequency. The operator may attempt to achieve this by discouraging idle mode re-selection to a particular frequency by means of the suitability criteria, i.e. the suitability criteria are set such that an MS will be very unlikely to meet those criteria. In the scenario above, the MS will consistently evaluate such a cell for suitability using a considerable amount of power in the process, even though the cell may never be suitable.

It has previously been proposed that, in order to reduce the power requirements of the MS, it may store previously decoded suitability parameters. The reason for requiring storage of suitability criteria is to allow the MS to evaluate a candidate cell, using these criteria, without having to first read the SIBs of the candidate cell (which would otherwise have to be read in order to determine the suitability criteria applicable to that cell). In many cases, the cell will not meet the suitability criteria (based on the stored parameters) and no further evaluation of this cell is needed; thus, storing criteria from a previous attempt can significantly reduce the battery consumption as SIBs need not be read from cells which do not meet these criteria.

However, such storage may cause problems if the networks are configured as described above, particularly if the stored parameters are associated with (i.e. decoded from) a cell where idle mode re-selection is intended to be restricted, i.e. those with unachievable (or rarely achievable) parameters. Since the stored suitability criteria are unlikely to be met, the MS will not attempt re-selection (noting that the MS may abandon re-selection at this stage, without reading the system information of the target cell and therefore without being able to determine that, in actual fact, the suitability criteria would be met for this cell). In certain circumstances, the MS could remain camped on a GSM cell longer than intended in instances where a UMTS cell would be more appropriate.

The suitability parameters or threshold criteria, may indicate a minimum required receive level. The signal quality, signal power or signal strength of the cell may need to exceed this by a predetermined amount, for example 0 dB or +10 dB. The suitability parameters or threshold criteria may, in practice, be the Qrxlevmin value or the Pcompensation value or both. Other suitability parameters or threshold criteria are of course considered.

The stored Qrxlevmin value may have a range of −115 to −24 dBm, and there is no default value (a value to be used if value not explicitly signalled), since its inclusion in the 3G cell's system information is mandatory. Qrxlevmin may be a suitability parameter for that cell.

Pcompensation is a further suitability parameter derived (at least partly) from one or more parameters broadcast in the cell also currently referred to in Section 6.6.5 of the 45.008 specification. Its value is most likely to be 0 dB.

Figure 3:
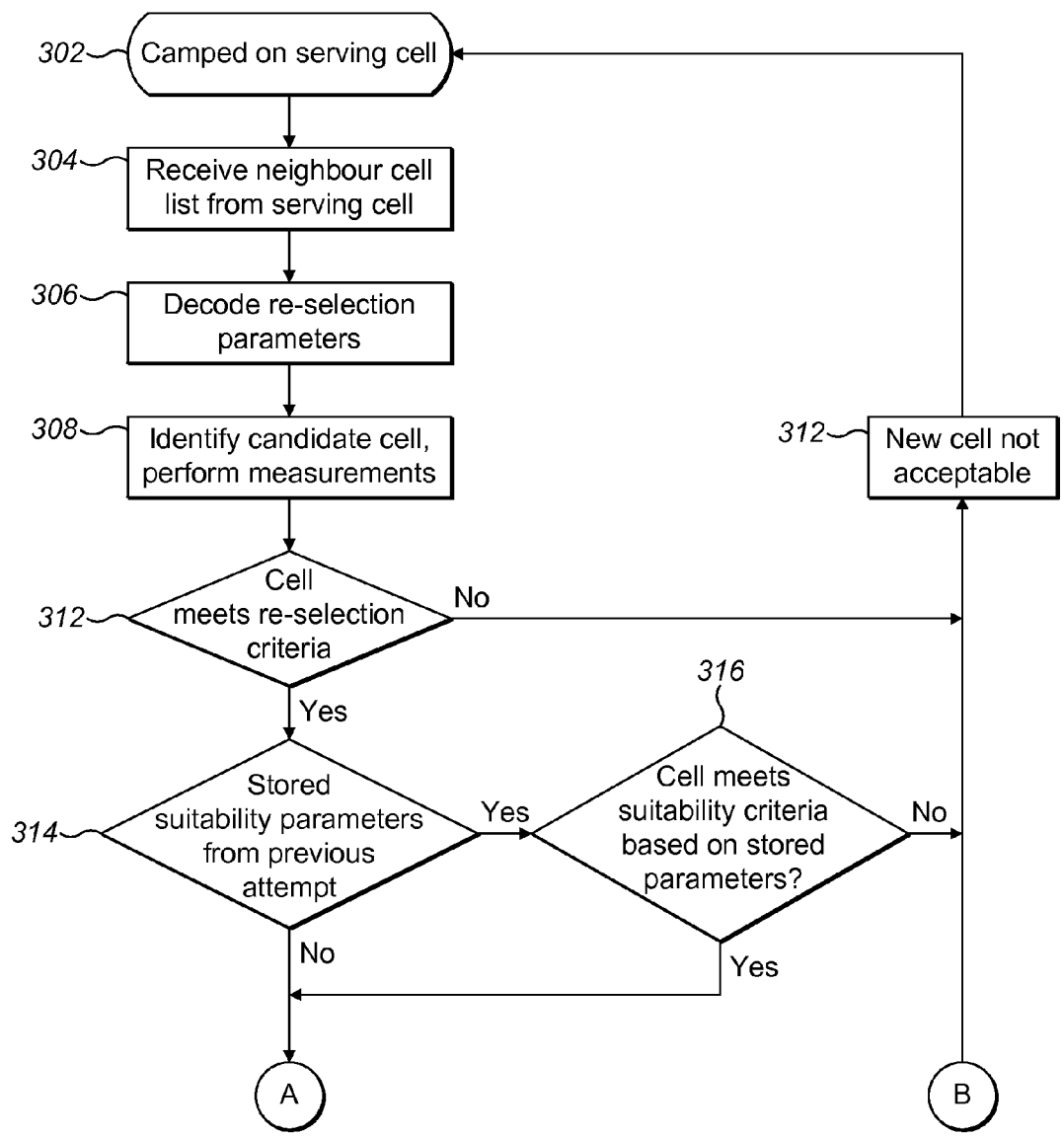
FIG. 3 shows a flow diagram of a known method of storing suitability parameters when performing cell re-selection.
Figure 3:
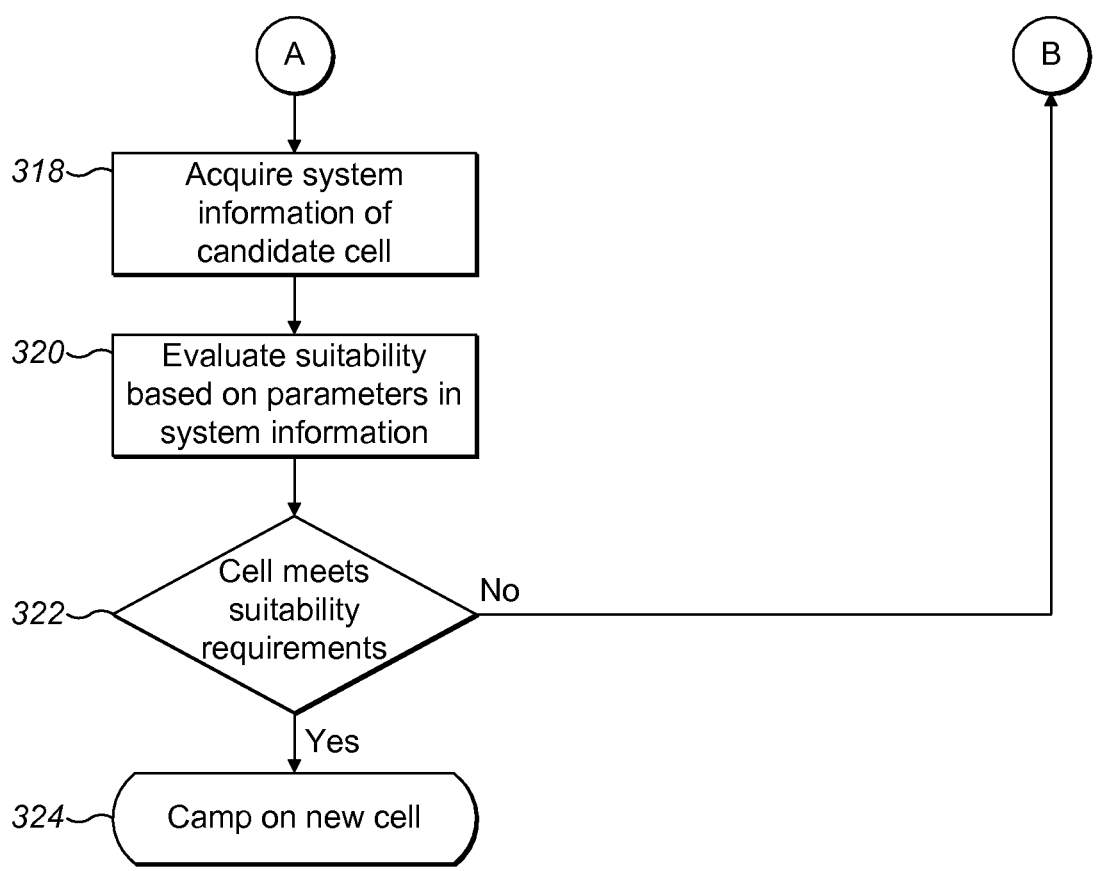

FIG. 3 illustrates the known process of cell re-selection using stored parameters. The algorithm applicable is outlined in the 45.008 specification. Specifically, section 6.6.5, entitled "Algorithm for cell re-selection from GSM to UTRAN".

The illustrated process starts at step 302 with the MS camped on the serving cell. Depending on the configuration and the algorithm used, the neighbour cell is received from the serving cell (step 304) and the re-selection parameters are decoded from that list (step 306). The MS then identifies a candidate cell and performs measurements (step 308). These may include signal strength and signal quality among others. Next, at step 310, the MS determines if the candidate cell meets the re-selection criteria. This test may be limited to those criteria which can be derived from parameters received in the serving cell. In some cases, depending on the parameters broadcast in the serving cell and whether or not it has stored suitability parameters, the MS may omit evaluating the candidate cell based on stored suitability parameters. If the candidate cell does not meet the re-selection criteria, the process restarts as the cell is not acceptable (step 312).

Between steps 312 and 314 (not shown), if the serving cell transmits Received Signal Code Power (RSCP) parameters to be used in lieu of the 'suitability test' within the re-selection algorithm, then the candidate cell is evaluated against these regardless of whether it has stored suitability parameters or not. If this test is done and passed (not shown), the process moves to step 318.

If the candidate cell is acceptable, the MS checks if it has stored suitability parameters from a previous attempt (step 314). If it does, the candidate cell is evaluated to determine if it meets suitability criteria based on these stored parameters (step 316). If the candidate cell does not meet the suitability criteria, the cell is deemed unacceptable and the process is restarted (step 312). If the cell does meet the suitability criteria based on the stored parameters, then the MS establishes a communication channel with the cell and acquires system information from the candidate cell (step 318). Similarly, if the MS does not have stored suitability parameters from a previous attempt, the MS establishes a communication channel with the cell and acquires system information from the candidate cell (step 318).

The suitability of the cell is then evaluated using parameters in the system information (step 320). If the candidate cell meets the suitability criteria, the MS camps on the cell (step 324). If the candidate cell does not meet the suitability requirements, the cell is deemed not acceptable (step 312) and the MS remains camped on the serving cell.

Section 6.6.5, "Algorithm for cell re-selection from GSM to UTRAN", outlines the algorithm for determining the re-selection suitability described above and based on a ranking algorithm. The ranking algorithm is used where priority based re-selection is not, for example, due to network configuration or device capability. Section 6.6.6, entitled "Algorithm for inter-RAT cell re-selection based on priority information" outlines the priority-based re-selection. Typically, priority-based re-selection is preferred. For example, a device which is capable of LTE must support priority-based re-selection. In the ranking algorithm, criteria for re-selection from GERAN to UTRAN may be referred to as CPICH RSCP-based criteria. CPICH stands for common pilot channel and RSCP stands for Received Signal Code Power. For reference, an excerpt of the algorithm defined in section 6.6.5 of the 45.008 specification is as follows, where FDD stands for Frequency Division Duplex and MS for Mobile Station:

"If the 3G Cell Re-selection list includes UTRAN frequencies, the MS shall, at least every 5 s update the value RLA_C for the serving cell and each of the at least 6 strongest non-serving GSM cells.

The MS shall then reselect a suitable (see TS 25.304) UTRAN cell if
    for a TDD cell the measured RSCP value exceeds the value of RLA_C
    for the serving cell and all of the suitable (see 3GPP TS 03.22) non-serving GSM cells by the value XXX_Qoffset for a period of 5 s and
    for an FDD cell the following criteria are all met for a period of 5 s:
1. its measured RSCP value exceeds the value of RLA_C for the serving cell and all of the suitable (see 3GPP TS 03.22) non-serving GSM cells by the value XXX_Qoffset,
2. its measured Ec/No value is equal or greater than the value FDD_Qmin, and
3. its measured RSCP value is equal to or greater than FDD_RSCP_threshold, if supported by the MS.

In case of a cell re-selection occurring within the previous 15 seconds, XXX_Qoffset is increased by 5 dB where
    FDD_RSCP_threshold equals Qrxlevmin+Pcompensation+10 dB, if these parameters are available, otherwise −∞ (criterion not effective).
    Qrxlevmin is the minimum required RX level in the UTRAN FDD cell (dBm), see 3GPP TS 25.304.
    Pcompensation is max(UE_TXPWR_MAX_RACH−P_MAX, 0) (dB), see 3GPP TS 25.304.
    UE_TXPWR_MAX_RACH is the maximum TX power level an MS may use when accessing the UTRAN FDD cell on RACH (dBm), see 3GPP TS 25.304.
    P_MAX is the maximum RF output power of the MS (dBm) in UTRAN FDD mode, see 3GPP TS 25.304.
    FDD_Qmin and XXX_Qoffset are broadcast on BCCH of the serving cell. XXX indicates other radio access technology/mode.
    Note: The parameters required to determine if the UTRAN cell is suitable are broadcast on BCCH of the UTRAN cell. An MS may start re-selection towards the UTRAN cell before decoding the BCCH of the UTRAN cell, leading to a short interruption of service if the UTRAN cell is not suitable.
    The MS may store the UTRAN cell RSCP suitability criterion parameters above, whenever decoded from a UTRAN FDD cell of an equivalent PLMN. The most recently decoded parameters are valid re-selection criteria towards all UTRAN FDD cells. This list of parameters shall be cleared after PLMN selection (see 3GPP TS 23.122)."

It should be noted that the definition of suitable in the above algorithm requires that cell selection criteria be met. These criteria for UMTS cells are defined in the 3GPP TS 25.304 specification sub-clause 5.2.3.1.2. The suitability parameters referred to in the 45.008 specification when defining re-selection are Qrxlevmin and Pcompensation (which depends on UE_TXPWR_MAX_RACH). The 25.304 specification defines other parameters affecting suitability that are not used in the re-selection tests defined in the 45.008 specification.

For later releases of the specification, the phrase "if supported by the MS" in item 3 above was removed, making this consideration mandatory for mobile stations complying with later releases of the specifications.

The definition of FDD_RSCP_threshold has also been previously modified to read as follows:

"FDD_RSCP_threshold equals FDD_RSCPmin−min ((P_MAX−21 dBm), 3 dB) if FDD_RSCPmin is broadcast on the serving cell, else Qrxlevmin+Pcompensation+10 dB, if these parameters are available, otherwise the default value of FDD_RSCPmin."

Additionally, the paragraph starting "The MS may store" of the algorithm was updated to read as follows:

"The MS shall store the UTRAN cell RSCP suitability criterion parameters above, whenever decoded from a UTRAN FDD cell of an equivalent PLMN while attempting to camp on the UTRAN FDD cell. The most recently decoded parameters from one UTRAN FDD cell of an equivalent PLMN are valid re-selection criteria towards all UTRAN FDD cells. This list of parameters shall be cleared after PLMN selection (see 3GPP TS 23.122)."

This change was made for the following reasons:

"If the FDD_RSCPmin parameters are not provided in the broadcast of the GSM serving cell, the FDD_RSCP_threshold is derived from broadcast information of the UTRAN cells. These parameters could be different for each UTRAN cell.

It is unclear from which UTRAN cell and when the MS shall read these parameters and when they should be re-read. Furthermore it is unclear whether a parameter set of one UTRAN cell is valid for the re-selection towards all cells or only towards the UTRAN cell from which the parameters were read."

When this change to the specification was made, a summary was given as follows:

"It is clarified that the MS shall refresh the parameter set when attempting to camp on a UTRAN FDD cell of an equivalent PLMN and thus is not required to read this parameter from the UTRAN neighbour cells while camping on a GSM cell.

It is further clarified, that the parameters received from one UTRAN cells are valid re-selection criteria towards all UTRAN FDD cells."

As stated previously, the reason for requiring storage of suitability criteria is to allow the MS to evaluate a candidate cell, using these criteria, without having to first read the System Information Blocks (SIBs) of the candidate cell (which would otherwise have to be read in order to determine the suitability criteria applicable to that cell). In many cases, the cell will not meet the criteria and no further evaluation of this cell is needed; thus, storing criteria from a previous attempt can significantly reduce the battery consumption as SIBs need not be read from cells which do not meet these criteria.

It was mentioned above that Section 6.6.5 applies only where priority based re-selection does not. Specifically, Section 6.6.5 states: "The algorithm in this subclause shall be used for re-selection from GSM to UTRAN if the conditions for the use of the cell re-selection algorithm based on priority information (see subclause 6.6.6) are not satisfied". Section 6.6.6, "Algorithm for inter-RAT cell re-selection based on priority information", defines that priority-based re-selection criteria allow an operator to configure a set of cells (on the same frequency and using the same RAT) as having a particular priority; different priorities can be assigned to different RATs or frequencies or both. Multiple frequencies of the same RAT may share a priority level. Two frequencies cannot share a priority level if they are used for different RATs. As with the algorithm defined in section 6.6.5 and discussed above, there is a requirement that the target or candidate cell be suitable as defined in the 25.304 specification and described above. For reference, an excerpt of the algorithm defined in section 6.6.6 of the 45.008 specification is as follows:

"The MS shall then reselect a suitable (see 3GPP TS 25.304 for UTRAN and 3GPP TS 36.304 for E-UTRAN) cell of another radio access technology if the criteria below are satisfied. S_non-serving_XXX is the measurement quantity of a non-serving inter-RAT cell and XXX indicates the other radio access technology/mode and is defined as follows:

for a UTRAN cell, is the measured RSCP value for the cell minus UTRAN_Qrxlevmin for the cell's frequency;

for a E-UTRAN cell, is the measured RSRP value for the cell minus E-UTRAN_Qrxlevmin for the cell's frequency if THRESH_E-UTRAN_high_Q is not provided; otherwise, if THRESH_E-UTRAN_high_Q is provided, is the measured RSRQ value for the cell minus E-UTRAN_QQUALMIN for the cell's frequency.

( . . . )

Cell re-selection to a cell of another inter-RAT frequency shall be performed if any of the conditions below (to be evaluated in the order shown) is satisfied:

The S_non-serving_XXX of one or more cells of a higher priority inter-RAT frequency is greater than THRESH_XXX_high (or, in case of an E-UTRAN target, THRESH_E-UTRAN_high_Q, if provided) during a time interval T_re-selection; in that case, the mobile station shall consider the cells for re-selection in decreasing order of priority and, for cells of the same inter-RAT frequency or of inter-RAT frequencies of equal priority, in decreasing order of S_non-serving_XXX and reselect the first cell that satisfies the conditions above;

the value of S_GSM is lower than THRESH_GSM_low for the serving cell and all measured GSM cells during a time interval T_re-selection; in this case, the mobile station shall consider for re-selection the inter-RAT cells in the following order, and reselect the first one that satisfies the following criteria:

cells of a lower priority inter-RAT frequency whose S_non-serving_XXX is greater than THRESH_XXX_low (or, in case of an E-UTRAN target, THRESH_E-UTRAN_low_Q, if provided) during a time interval T_re-selection; these cells shall be considered in decreasing order of priority and, for cells of the same RAT, in decreasing order of S_non-serving_XXX;

if no cells satisfy the criterion above, inter-RAT cells for which, during a time interval T_re-selection, S_non-serving_XXX is higher than S_GSM for the serving cell by at least a specific hysteresis H_PRIO; these cells shall be considered in decreasing order of S_non-serving_XXX A UTRAN FDD cell shall only be reselected if, in addition to the criteria above, its measured Ec/No value is equal to or greater than FDD_Qmin−FDD_Qmin_Offset.

If E-UTRAN_Qmin is provided for a E-UTRAN frequency, a E-UTRAN cell on that frequency shall only be reselected if, in addition to the criteria above, its measured RSRQ value is equal to or greater than E-UTRAN_Qmin.

If THRESH_E-UTRAN_high_Q is provided for a E-UTRAN frequency, and if E-UTRAN_RSRPmin is provided, a E-UTRAN cell on that frequency shall only be reselected if, in addition to the criteria above, its measured RSRP value is equal to or greater than E-UTRAN_RSRPmin. If E-UTRAN_RSRPmin is not provided, the default value shall be used.

E-UTRAN cells which are included in the list of not allowed cells shall not be considered as candidates for cell re-selection. If the strongest cells on a E-UTRAN frequency are included in the list of not allowed cells, the mobile station may reselect the strongest valid cell (see subclause 8.4.7) on that frequency.

Cell re-selection to a cell of another radio access technology (e.g. UTRAN or E-UTRAN) shall not occur within 5 seconds after the MS has reselected a GSM cell from an inter-RAT cell if a suitable GSM cell can be found.

If the mobile station applies either common priorities or individual priorities received through dedicated signalling and priorities are available only for some inter-RAT frequencies, cells belonging to frequencies for which no priority is available or no threshold is provided by the serving cell shall not be considered for measurement and for cell re-selection.

If a mobile station in 'camped normally' state (see 3GPP TS 43.022) applies individual priorities received through dedicated signalling and no priority is available for the serving cell, the mobile station shall consider any GSM cell (including the serving cell) to have lowest priority (i.e. lower than the eight network configured values).

A mobile station in 'camped on any cell' state (see 3GPP TS 43.022) shall ignore individual priorities received through dedicated signalling and shall apply priorities received from the system information of the serving cell while attempting to find a suitable cell. If the mobile station supports CS voice services, the MS shall avoid reselecting acceptable (but not suitable) E-UTRA cells regardless of the priorities provided in system information.

NOTE 4: If the MS is camping on an acceptable cell, individual priorities are not discarded until an event leading to their deletion occurs."

If a cell supports priority-based re-selection according to section 6.6.6 of the 45.008 specification, it will transmit to an MS camped on the cell a list of its neighbouring cells—the 'neighbour cell list' (this may identify individual cells, or frequencies on which neighbour cells operate, or both). Along with the list, a System Information Type 2quater (SI2quater) message may indicate a parameter applicable to one or more cells in the list, referred to as UTRAN_Qrxlevmin in the excerpt above. This parameter of the candidate cell, which is broadcast in the serving cell, i.e. the UTRAN_Qrxlevmin, is expected in normal operation to be closely related to the corresponding RSCP threshold sent by the respective cell(s) as used in the suitability check. As such, this parameter allows the MS to identify if the cell meets an RSCP-based criterion without power intensive decoding and evaluation of system information broadcast by the candidate cell unless that criterion is met.

However, support for priority-based re-selection remains optional for non-LTE capable devices. For LTE capable devices priority based re-selection must be used. Moreover, priority-based re-selection is not supported in any pre-Release 7 devices. In addition, there is the possibility that priority-based re-selection is not applicable in the serving cell, for example if the cell is a GERAN cell. It is quite possible that operators will not upgrade GERAN networks to support priority-based re-selection, even when LTE is deployed, especially near the edges of LTE coverage. Therefore, while LTE cells or UTRAN cells most likely will support priority-based re-selection, overlapping or nearby GSM cells may not. A device supporting priority-based re-selection is required to use the old 6.6.5 rules, i.e. re-selection according to the ranking algorithm, in such a case. In this scenario the problems described above are applicable; in that an MS may remain camped on a GSM cell longer than is appropriate when a UMTS or LTE capable cell is available but the MS does not consider it to be suitable or power intensive system information reception and decoding are required.

The priority-based re-selection (PBR) RSCP threshold parameter broadcast in the serving cell is optional and is set up in the network configuration. The parameter is likely to be (or correlate with) the minimum required measured RSCP level. Additionally, the PBR parameter may be broadcast as a specific value and associated with one or more explicitly signalled frequencies, or may be broadcast as a 'default' value to be used with cells of frequencies not explicitly signalled together with the parameter value. The parameter is applicable only to cells which operate on the same frequency associated with the parameter.

The default value only applies to frequencies in the neighbour cell list. An example of a broadcast default parameter is the DEFAULT_UTRAN_QRXLEVMIN parameter encoded within the 3G Priority Parameters Description Struct; an example of an parameter associated with explicitly signalled frequencies is the UTRAN_QRXLEVMIN parameter encoded within the Repeated UTRAN Priority Parameters struct (see 3GPP TS 44.018 v.10.3.0). If no parameter is broadcast in the cell, the algorithm specifies a value to be used, i.e. as the UTRAN_Qrxlevmin. The PBR parameter may not have been broadcast in the cell due to network configuration or may not have been received fully by the MS.

For the purposes of this discussion, a network comprising three cells may be considered, although it will be understood that this is only an example and more cells implementing a variety of Radio Access Technologies (RATs) may be equally utilised with the present disclosure. In the examples described, unless indicated to the contrary, a first candidate cell, cell A, is a UTRAN cell. Another cell, cell B, is the cell currently serving the MS and is a GERAN cell. Another cell, cell C, is second candidate cell and is also a UTRAN cell. Although GERAN and UTRAN cells are used in this description, it should be understood that any RAT can be implemented by each cell, however, for the purposes of the disclosure, cells A and C should be implementing the same RAT.

As described, referring to the above nomenclature, when an MS is connected to, or as it is known, camped on, cell B (the serving cell), the MS may evaluate cells A and C to determine their appropriateness for re-selection.

During GSM to UMTS or LTE cell re-selection, the existing 3GPP TS 45.008 section 6.6.5 described above, i.e. re-selection according to a ranking algorithm, mandates the storage and, in some cases, usage of previously received suitability requirements for UTRAN FDD cells.

The 45.008 specification refers to "equivalent PLMNs", which may include the registered PLMN (generally, these procedures are agnostic to which PLMN is being considered as long as it is within the list of equivalent PLMNs—PLMNs in this list are "regarded as equivalent to each other for PLMN selection, cell selection/re-selection and handover"; TS 23.122 sub-clause 4.4.3). The text goes on to indicate that these values are cleared on PLMN selection; however, re-selection between different equivalent PLMNs is not considered PLMN selection.

This may lead to a scenario where, for example in national roaming scenarios where two operators' PLMNs are set as equivalent to each other, suitability criteria from one roaming partner are applied to a cell of a second roaming partner (or the home or serving PLMN). The use of equivalent PLMNs is up to the operator(s) to determine and the scope of these problems is not limited to how or why equivalent PLMNs are used, or whether they are used at all.

More importantly and more generally, there is a potential that if threshold criteria for a cell or category of cells (such as those operating at a particular frequency) are different from those for another cell or category of cells (such as those operating on another frequency, either on the same PLMN or on a different, equivalent PLMN), then the behaviour of the mobile station will vary considerably depending on stored requirements, which may in turn depend on the most recent UTRAN cell from which it received (and stored) the requirements.

More specifically, one could consider an exemplary scenario, where an operator wishes that devices in idle mode camp on cells of one frequency, and devices in connected mode (i.e. with active ongoing data/voice calls) operate in cells of a different frequency. The operator may attempt to achieve this by discouraging (to the point of making it practically impossible) idle mode re-selection to a particular frequency by means of the suitability criteria i.e. the suitability criteria are set such that a mobile will be very unlikely to meet these criteria.

According to the existing rules, the UE may store and apply these same criteria (which it decoded as part of an attempt—most likely unsuccessful—to reselect to a cell on the first frequency) when evaluating a UTRAN cell on any frequency, including to cells on the second frequency where idle mode re-selection is not intended to be restricted.

Since the stored criteria are very unlikely to be met, the MS will not attempt re-selection (noting that the MS may abandon re-selection at this stage, without reading the system information of the target cell and therefore without being able to determine that, in actual fact, the suitability criteria would be met for this cell).

This problem could restrict 2G to 3G cell re-selection potentially causing the device to be essentially stuck in 2G (or at least, remain there for longer than intended). In some cases the device can move to 3G only either if power is turned off or PLMN re-selection happens (see 3GPP TS 23.122).

In the case of priority-based re-selection, considering the exemplary case where a mobile has stored very stringent criteria from one cell, this may make it inappropriately abandon evaluation of a second cell as part of the priority-based re-selection, even though all the (correct) criteria to permit re-selection evaluation are available in the serving cell.

In addition to the above scenarios, further issues are created by the use of Closed Subscriber Group (CSG) cells. Home NodeB (HNB), Home eNB (HeNB) or femtocell are concepts introduced for UMTS and LTE (E-UTRAN) to improve indoor and micro-cell coverage as well as to leverage wireline backhaul to the 'home'. Note that "femtocell" is widely used outside of 3GPP to mean any cell with a very small coverage, and typically installed in a private premises (either private or corporate). The terms HeNB/HNB are used in 3GPP with specific meanings i.e. that the cell is a Closed Subscriber Group (CSG) cell, or hybrid cell.

An important aspect of HeNB/HNB functionality is the ability to restrict access to particular users. For example, to employees of the company on whose site the H(e)NB is deployed, to customers of a particular coffee shop chain, or (in the case of H(e)NBs deployed in private homes) to individuals.

To achieve this functionality, 3GPP has defined the concept of a Closed Subscriber Group. A CSG cell is one which indicates that it is a CSG cell (by means of 1 bit broadcast in the system information) and broadcasts a CSG ID (also in system information). A cell can only indicate one (or none) CSG IDs, however multiple cells may share a CSG ID. A device (UE or MS) may be subscribed to multiple CSGs. Such subscriptions may be temporary in nature (e.g. a coffee shop allows a customer 1 hour's access to its CSG).

CSG cells are a specific category of cells, which may be used as "femto" cells or to provide uncoordinated (i.e. not subject to normal radio planning as is used for "macro" cells) coverage or both. They may be limited to users with specific subscriptions (e.g. associated with an employer, school/university, coffee shop etc.)

The term "macro" cell, while not having significance in 3GPP specifications, is widely used to mean a cell other than a CSG cell and is used accordingly in this description.

A CSG cell may operate using UTRAN or E-UTRAN protocols and radio specifications, and may operate on the same or a different frequency to non-CSG cells.

UMTS CSG cells will not be listed in the neighbour cell lists of non-CSG cells; therefore legacy UMTS devices (i.e. Release 7 or earlier) will not search for such cells. Should such a device attempt to access a CSG cell, its registration attempt will be rejected.

E-UTRAN is specified first in Release 8 and therefore all E-UTRAN capable devices will necessarily be "CSG-aware" devices, even if they have no CSG subscription.

Re-selection criteria for these cells are different. It is simply required that the cell is suitable, the strongest on the frequency, and accessible to the device (e.g. it has a subscription to the cell).

Generally, network operators are keen that devices which have a subscription to a CSG cell camp on that cell in preference to a non-CSG cell. However, the determination by the device to search for CSG cells is implementation-specific, and may be manually triggered. It is expected that devices will store some information (such as GPS coordinates, a list of macro cells which are detected) corresponding to the location of cells which they are able to access and use this to speed up subsequent accesses—this is referred to as 'fingerprinting'.

The decision of which target cell to camp on is also dependent on the cell selection and re-selection rule defined for UTRAN and E-UTRAN. Currently, in Release 8, it is specified that a UE may re-select to a cell only if it is the best cell (i.e. the cell with the strongest signal strength) of any cells using its particular carrier frequency. It is also specified that while the UE is camped on a suitable CSG cell, the UE shall always consider the current frequency to be the highest priority frequency.

Idle mode re-selection away from CSG cells towards a non-CSG cell follows legacy behaviour for re-selection to such cells. However, no parameters for cell re-selection to CSG cells are likely to be available in the serving cell, and therefore there is no hint to the device as to what the criteria might be (as there is in the case of priority-based re-selection, as described above). Furthermore, these cells are likely to be configured to provide very limited coverage, meaning that their suitability requirements may be relatively stringent, compared with non-CSG cells. Storing suitability requirements from CSG cells and using them on non-CSG cells (or vice versa) may result in either very infrequent re-selection attempts (because the stored criteria are very high), or drained battery life (if cells are incorrectly determined to meet the suitability requirements prior to reading the system information of the candidate cell). Even amongst CSG cells, different cells may have very different requirements.

CSG cells may be identifiable as such based on only their physical layer identities (frequency, physical layer identity, primary scrambling code, etc.)—either because they operate on a dedicated frequency, or because the range of physical layer identities is transmitted in the network.

Hybrid cells (introduced in Release 9) are yet a further category of cells that may have different suitability requirements from non-hybrid cells.

In E-UTRAN, neighbour cell lists are not explicit i.e. they do not positively identify cells: they simply indicate a frequency and, optionally, a list of "Not Allowed" (blacklisted) cells that mobiles should not attempt to access. Devices are expected to detect cells on a frequency by blind searching. However, this may lead to a significant problem in the case where many of the detected cells are CSG cells. In order to minimize unnecessary processing of such cells by devices which have no CSG subscription, the network may optionally indicate the "PCI split" applicable to CSG cells, that is, the set of physical layer cell identities/identifiers that are reserved for CSG cells.

The PSC split is the analagous indication for UMTS cells, in case an operator does list CSG cells in the neighbour cell list.

There has also been discussion of using a PCI/PSC split to distinguish between hybrid cells and non-hybrid cells.

It is worth noting that CSG cells may have significantly different criteria for re-selection (compared with other, non-CSG cells, or possibly even compared to other CSG cells) and that they may be identifiable as being CSG cells without the need for decoding of broadcast system information (e.g. based on physical layer parameters: frequency/PSC/PCI etc.), as is described above.

There currently exists no solution to resolve the problems identified and described above.

Example of the Present Disclosure

In accordance with the present disclosure, it is proposed that threshold criteria decoded from cells are selectively stored and used in order that the evaluation of candidate cells be efficient and more accurate than present solutions.

It is proposed and described by way of exemplary implementation, that storage and usage of stored suitability requirements discriminates between cells (or classes of cells) that can be discriminated at the physical layer, for example where physical layer addresses (or ranges thereof) and/or operating frequencies are used to distinguish categories of cells. In this way, an MS can discriminate stored suitability requirements according to a class of cell or an individual cell without having to establish a communication channel on that cell. In one example, requirements are used according to the frequency of the cell or the identity of the cell. In one example, CSG cells versus non-CSG cell requirements is an exemplary discrimination (CSG cells are likely to use a dedicated range of physical layer addresses, which may be either PCI (E-UTRAN cells) or PSC (UTRAN cells)). Additionally, usage of stored parameters may be restricted to individual CSG cells (i.e. can only be used in evaluating the same cell as that from which they were received).

Additionally, previously stored suitability requirements (which may have been obtained as a result of ranking-based re-selection) shall not be used when evaluating cells according to priority-based re-selection rules. This may be dependent on whether the corresponding (signal quality/signal strength) parameters are available in the current serving cell. The network may be configured not to send these parameters, i.e. the parameters may not be included in the system information of the current serving cell.

Figure 4:
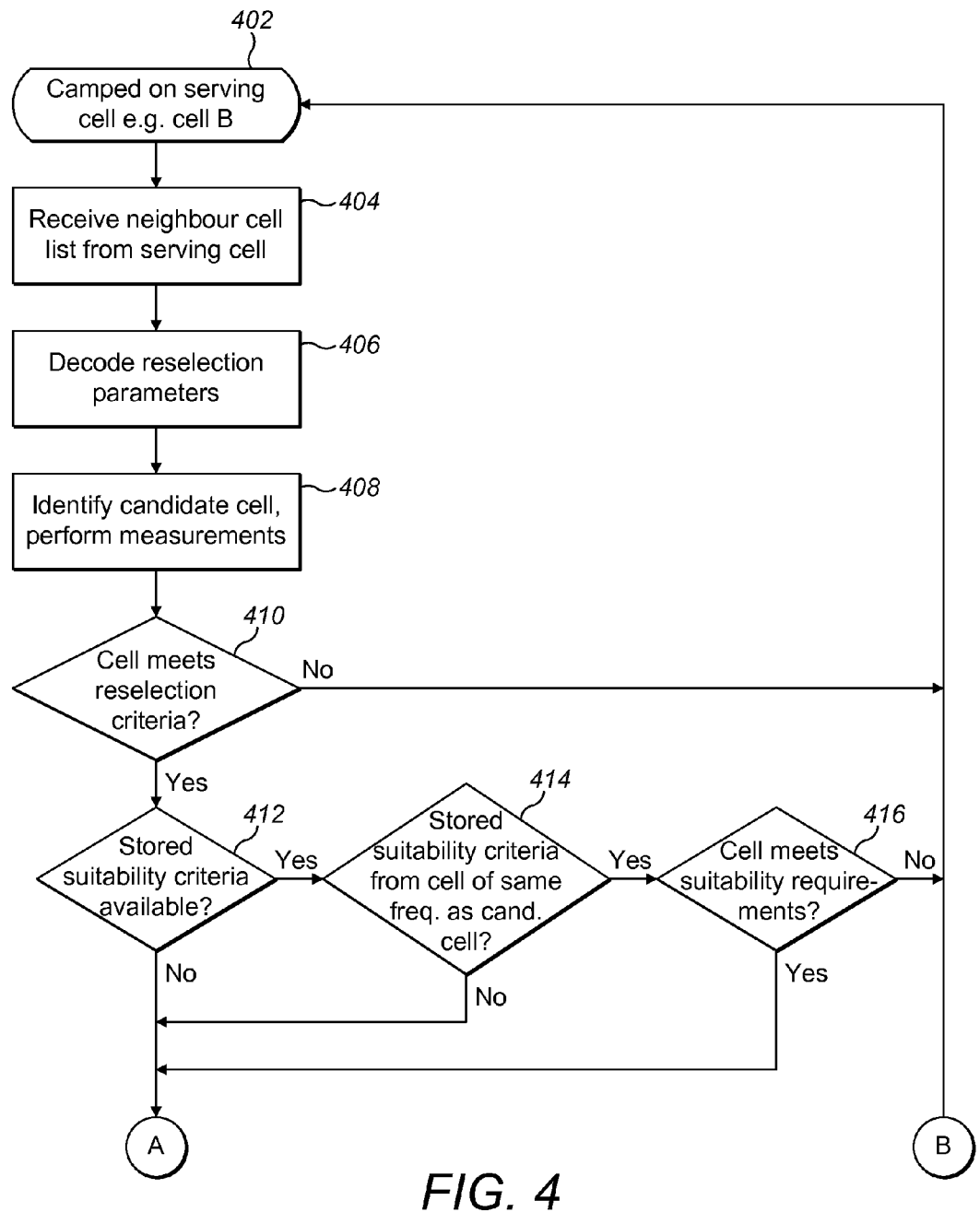
FIG. 4 shows a flow diagram illustrating an example of the present disclosure in which stored suitability parameters are applied on a per-frequency basis.
Figure 4:
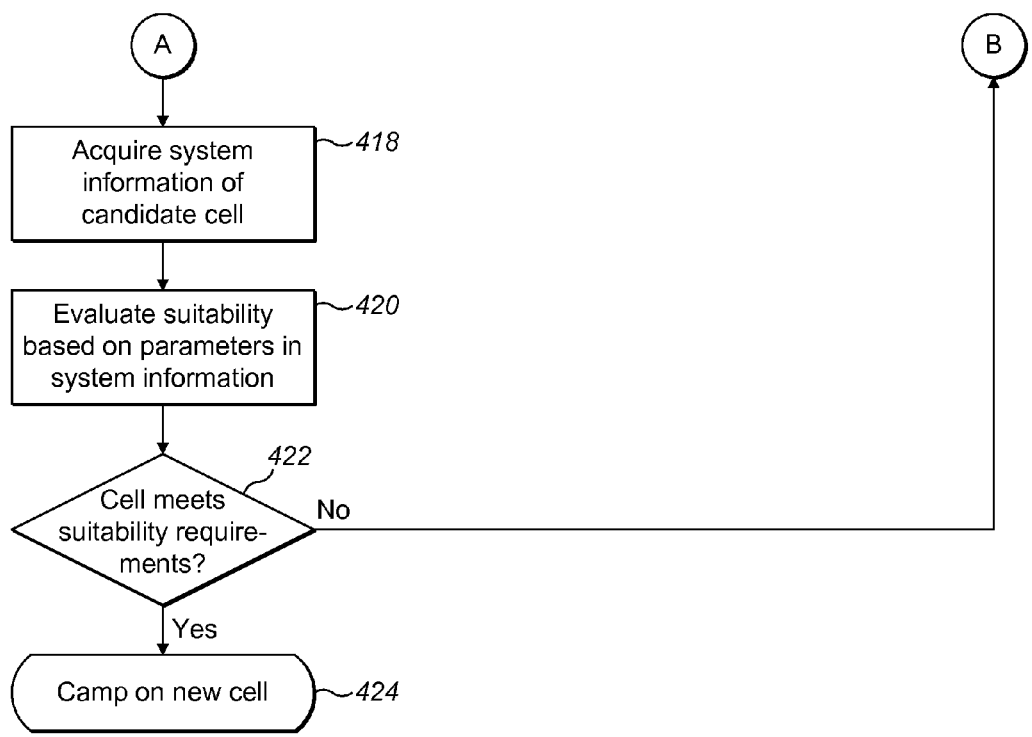

In a first embodiment, threshold criteria are stored and used in accordance with the frequency of the applicable cell. For example, threshold parameters are stored on the device and linked with the frequency of the cell from which they were decoded. These parameters are then only to be used when evaluating cells of that frequency. In this way, network defined configurations of cells having particular frequencies are prevented from causing an MS to remain camped on a cell incorrectly. In a further example, for priority-based re-selection, threshold criteria may be stored and re-used on a per-priority level basis As illustrated in FIG. 4, storage and usage of stored suitability requirements may be on a per frequency basis. In other words, requirements decoded from a cell on frequency A are used only for evaluation of other cells on the same frequency.

The illustrated process begins with the MS being camped on a serving cell. In this description, the serving cell may be described as 'cell B'. The serving cell may be of any RAT, but in this example, it may be considered as a GSM cell for convenience. It is irrelevant whether the MS camped on the serving cell by using cell re-selection or cell selection. Optionally, the MS will acquire the UMTS or LTE neighbour cell list. This may be broadcast in the serving cell or may be acquired otherwise (step 404). The re-selection parameters may be decoded from the neighbour cell list (step 406).

Once these optional steps have been performed, the MS may then identify a candidate cell. This may or may not be from the neighbour cell list. The MS then acquires measurements of the identified cell to identify characteristics of the cell such as signal strength, signal quality or signal power (step 408). It will be understood that the steps may be carried out in any particular order. In a specific example, it may be envisaged that the measurements are performed for all cells in the list before a candidate cell is identified.

Once a candidate cell has been identified and measurements of that cell have been performed, the MS determines if the cell meets initial re-selection requirements (step 410). This test may be based on the parameters decoded from the serving cell in the neighbour cell list. If the cell is deemed not to meet these initial re-selection requirements, then the MS will remain camped on the serving cell and will not continue the re-selection process.

If the MS determines that the cell meets the initial re-selection criteria, then the MS will check if it has any stored criteria related to suitability previously decoded from another cell (step 412). The parameters may have been decoded from the system information of a cell when evaluating the cell's suitability. If the MS has criteria stored, the MS will then determine if the criteria is from a cell having the same frequency as the candidate cell (step 414). The criteria must have been decoded from the system information of a cell operating on the same frequency as the candidate cell. To enable this, the MS may be required to maintain an indication of the frequency of the cell the criteria was determined from, in association with the criteria in the data store. In this description, the candidate cell may be referred to as 'cell C' for convenience.

If the parameters are determined to be from a cell having the same frequency as the candidate cell, the candidate cell is checked for its appropriateness for re-selection (step 416). The stored criteria, from a previous suitability check, is used to determine if the cell meets these requirements. In one example, the measurements performed by the MS are used to determine if the cell meets a particular threshold. If the candidate cell does not meet or exceed the requirements based on the stored parameter, for example the characteristics of a signal received by the MS from the cell do not exceed the threshold indicated by the parameter, the process stops and the MS remains camped on the serving cell. It should be noted that the attribute(s) of the signal may have to exceed the threshold by a predetermined amount, which may for example be 0 dB or +10 dB. The parameter may be the minimum receive level, the QRXLEVMIN value.

Conventionally, a stored Qrxlevmin value may have a range of −115 to −24 dBm, and there is no default value, since its inclusion in the 3G cell's system information is mandatory. Qrxlevmin may be a suitability parameter for that cell.

Pcompensation is a further suitability parameter derived (at least partly) from one or more parameters broadcast in the cell also currently referred to in Section 6.6.5 of the 45.008 specification. Its value is most likely to be 0 dB.

If, based on the parameter, it is determined that the candidate cell meets or exceeds the requirement then the MS may go on to further evaluate the cell in the known manner, for example, by tuning to the frequency of the cell and evaluating it using decoded data. If the MS does not have stored criteria available (step 412) or if the MS does not have stored criteria obtained from a cell having the same frequency as the candidate cell (step 414), then this decoding is performed.

Optionally, before acquiring the system information of the candidate cell to decode suitability parameters at step 418, not shown is that the MS may evaluate the candidate cell using default parameters which are not explicitly signalled. In one example the default parameter is a predetermined amount and is specified in the re-selection specification. If the candidate cell does not meet the requirements based on this default parameter, the MS does not continue with the re-selection and the MS remains camped on the serving cell. If the MS does meet these requirements based on the default parameter, the MS continues with the re-selection process.

In the illustrated example, at step 418, the MS may acquire the system information of the candidate cell. To do this, the MS may establish a communication channel on the cell and tune to its frequency. The system information may be in the form of a System Information Block (SIB) and may be obtained by tuning to the frequency of the cell and establishing a communication channel on it. The system information is generic and may be derived from other blocks than the SIB referred to throughout the present disclosure. The MS will then decode the system information to acquire suitability parameters and evaluate the cell based on these parameters (step 420). If it is determined that the MS meets these requirements (step 422), for example, based on the measurements previously performed in addition to the decoded parameters, the MS may camp on the candidate cell and perform re-selection to it (step 424). If the MS is deemed to be unsuitable, the MS will remain camped on the serving cell.

Additionally and optionally, a registration update may be performed when the MS has camped in the new cell (not shown). This registration update may explicitly notify the network that the MS has re-selected to a new cell or new registration area. Additionally and optionally, data may be transmitted and received to and from the network in the new cell (not shown). The registration update step (not shown) may include for example a routing area update, location update, combined routing area update or similar. For further information regarding registration updates please see the 3GPP TS 24.008 specification, "Mobile radio interface Layer 3 specification; Core network protocols; Stage 3", which is incorporated herein by reference.

Figure 5:
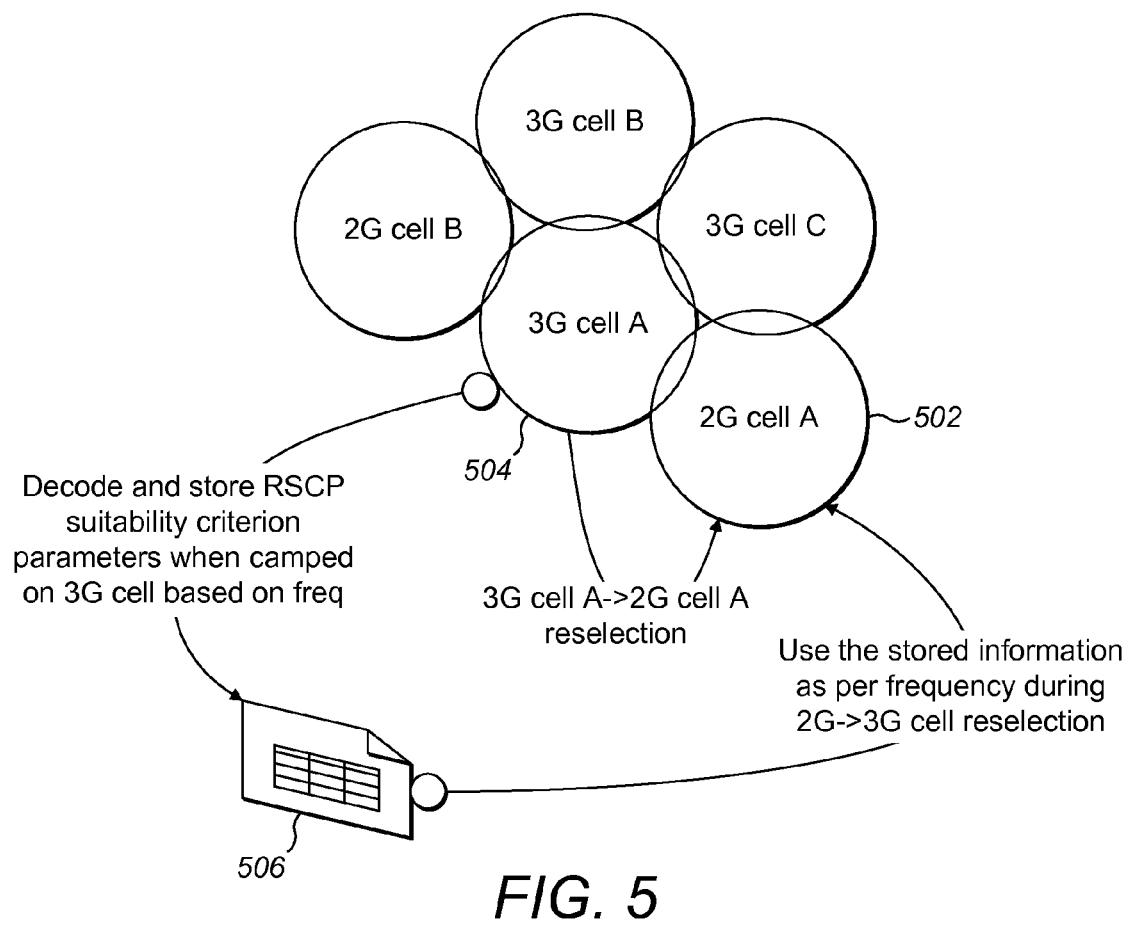
FIG. 5 shows a view of information flow illustrating an example of the present disclosure in which stored suitability parameters are applied on a per-frequency basis.

FIG. 5 provides a high level view of the information flow. When an MS is camped on a 3G cell 504, the RSCP suitability criterion parameters are stored according to the frequency of the cell. This store 506 may contain multiple parameters and frequencies. As shown, when performing 2G to 3G cell re-selection, i.e. from cell 502 to cell 504, the stored information is used on a per-frequency basis.

In order to effect the above example, it may be advantageous for an MS to maintain a list of frequencies and threshold parameters. For example, for every cell having a new frequency encountered, the threshold parameters for that frequency are stored. Additionally, each time new threshold parameters are decoded from a cell having a particular frequency, the stored criteria can be replaced. This may occur, once the MS has decoded the system information of a cell (step 420) if the cell previously met the criteria (step 616).

Figure 6:
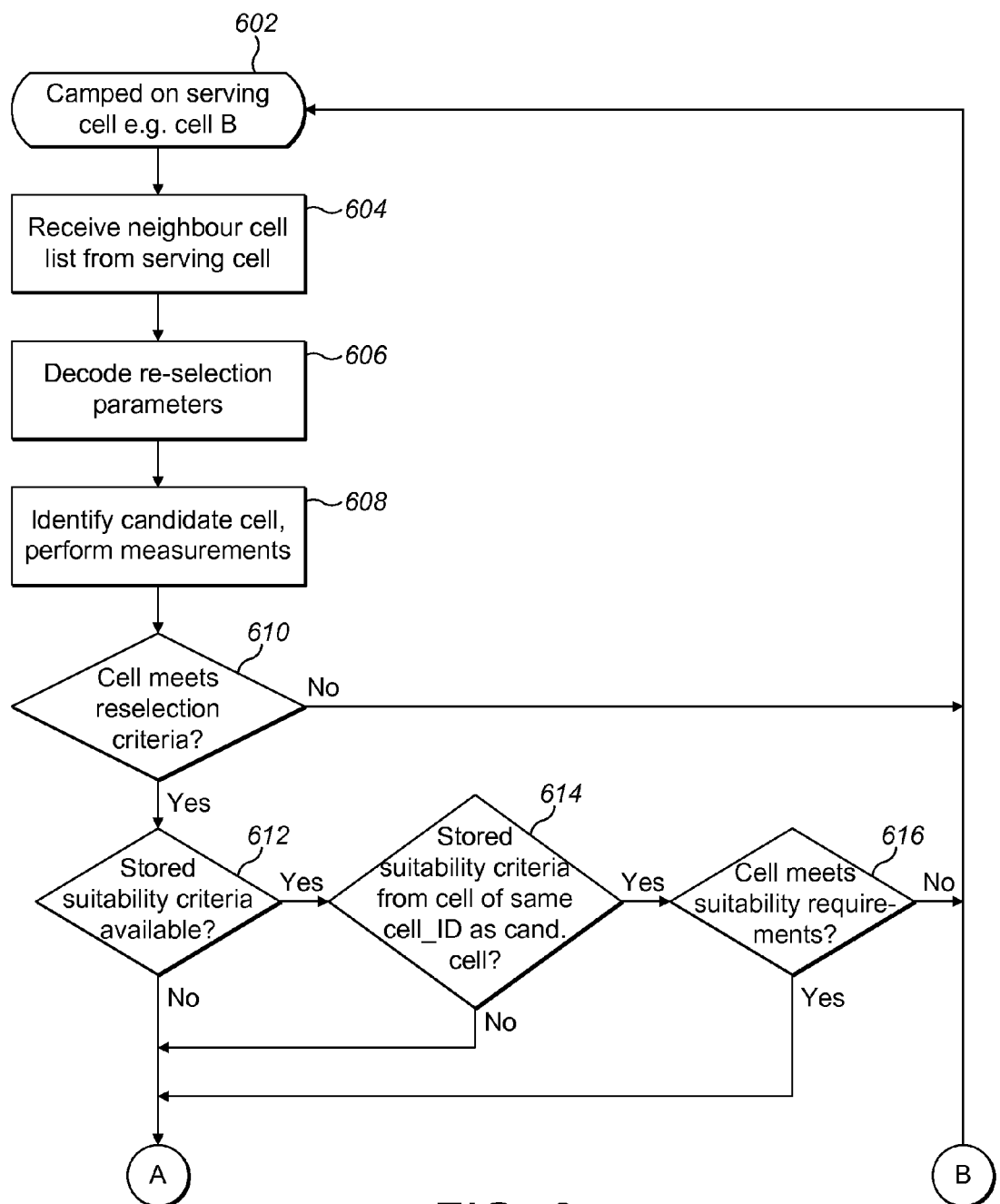
FIG. 6 shows a flow diagram illustrating an example of the present disclosure in which stored suitability parameters are applied on a per-cell basis.
Figure 6:
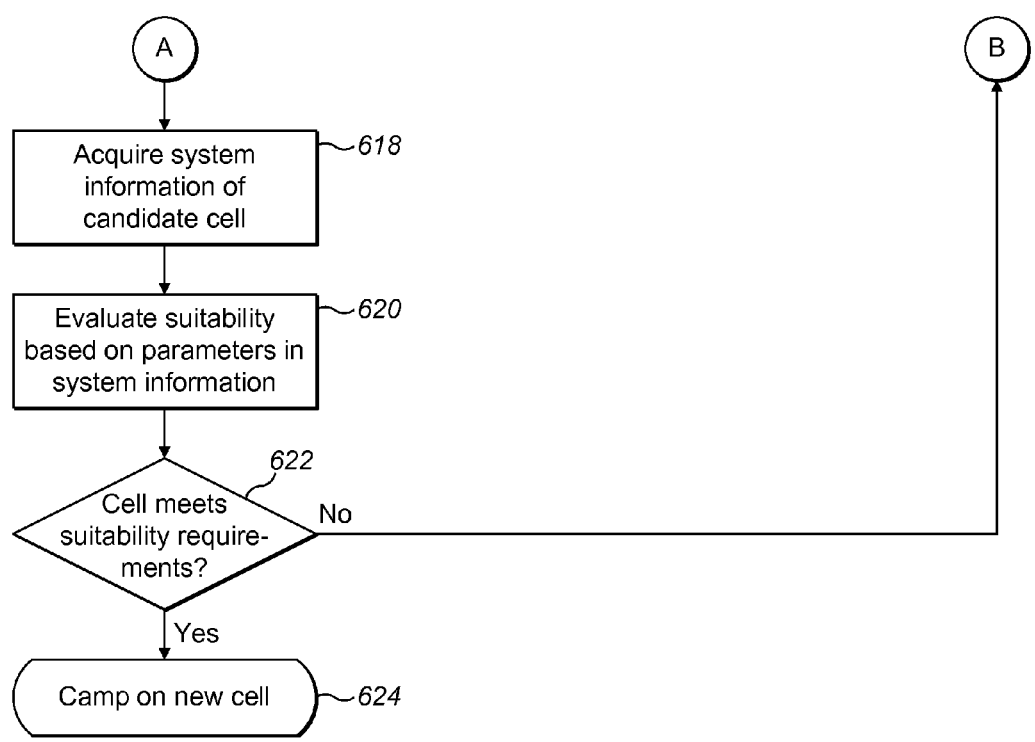

In another embodiment, instead of being stored and used on a per-frequency basis, each threshold parameter may be used only on a per-cell basis. FIG. 6 illustrates this example. At step 602, the MS is camped on the serving cell. The MS may first receive a neighbour cell list from the serving cell (step 604). The MS may then decode certain re-selection parameters from the neighbour cell list broadcast by the serving cell (step 606). The MS then identifies a candidate cell and performs measurements of it, such as signal strength, quality or power (step 608). If the cell does not meet the re-selection requirements, the MS remains camped on the serving cell. If the candidate cell does meet the re-selection requirements (step 610), the MS goes on to check if it has any stored criteria available (step 612). If there are no stored criteria available at all, the MS continues with the re-selection process and tunes to the frequency of the cell to decode system information.

The MS then checks if there any stored criteria available which were obtained from a cell having the same cell_ID as the candidate cell (step 614). If there are no applicable stored criteria, i.e. none were obtained from a cell having the same cell_ID as the candidate cell, the MS continues with the re-selection process and tunes to the frequency of the cell to decode system information.

The cell_ID may be the scrambling code of the cell or may be another identifier of the cell. The cell_ID need not be globally unique but may be locally unique. The identifier used to differentiate between cells in this particular example is an identifier that can be derived from the physical layer, i.e a physical layer identifier, such that the candidate cell can be identified without having to decode system information of the cell. Examples of such locally unique identifiers (that can be derived from the physical layer) include the 'physical layer cell identifier' of an E-UTRAN cell and the 'primary scrambling code' of a UTRAN cell.

In this way, criteria can only be applied to the cell from which it was obtained. This obviates the limitations of conventional re-selection where an MS may be 'stuck' unnecessarily. Battery life is still minimised, when compared to the known storage methods and where no parameters are stored, since an MS will not be tune to the frequency of a cell multiple times to decode the parameters; once is enough for them to be stored and re-used (for example, they may be re-used if the measurements change).

If the MS has stored criteria obtained from a cell having the same cell_ID as the candidate cell, the candidate cell is checked against these criteria (step 616), for example, using the measurements performed in step 608. If the test is successful, the MS continues with the re-selection process. If it is not, the MS remains camped on the serving cell.

Optionally, before acquiring the system information of the candidate cell to decode suitability parameters at step 618, not shown is that the MS may evaluate the candidate cell using default parameters which are not explicitly signalled. In one example the default parameter is a predetermined amount and is specified in the re-selection specification. If the candidate cell does not meet the requirements based on this default parameter, the MS does not continue with the re-selection and the MS remains camped on the serving cell. If the MS does meet these requirements based on the default parameter, the MS continues with the re-selection process.

The MS will then, if the conditions described above are met or not as the case may be, tune to the frequency of the candidate cell and acquire system information (step 618). The suitability of the cell for re-selection is then evaluated based on parameters decoded from the system information (step 620). If the cell meets the suitability requirements (step 622), the MS may camp on the cell (step 624). If it does not, the MS may remain camped on the serving cell (step 602). The MS may maintain a cell-parameter list, such that for each cell_ID, the latest parameters decoded are stored and replaced. In this way, each time stored criteria is used, it is most likely to be as accurate as possible for that cell.

In a further example, Closed Subscriber Group cells (CSG) cells may be treated differently to non-CSG cells. In the known algorithms, there is no discrimination as to the parameters which can be applied to and retrieved from these cells. In one embodiment, in a similar manner to that described above, a parameter may be stored separately if it has been decoded from a CSG cell. This parameter may then only be applied to cells which are also CSG cells. In an additional example, the stored CSG criteria may only be applied to CSG candidate cells operating on the same frequency as the cell from which the criteria was obtained. Further, the stored CSG criteria may only be applied to CSG candidate cells having the same ID as the cell from which the criteria was obtained. In this way, the fact that a CSG cell may have significantly different re-selection criteria does not hamper non-CSG cell re-selection; since CSG parameters are not stored and used against non-CSG cells and CSG parameters are only applied against CSG cells.

Figure 7:
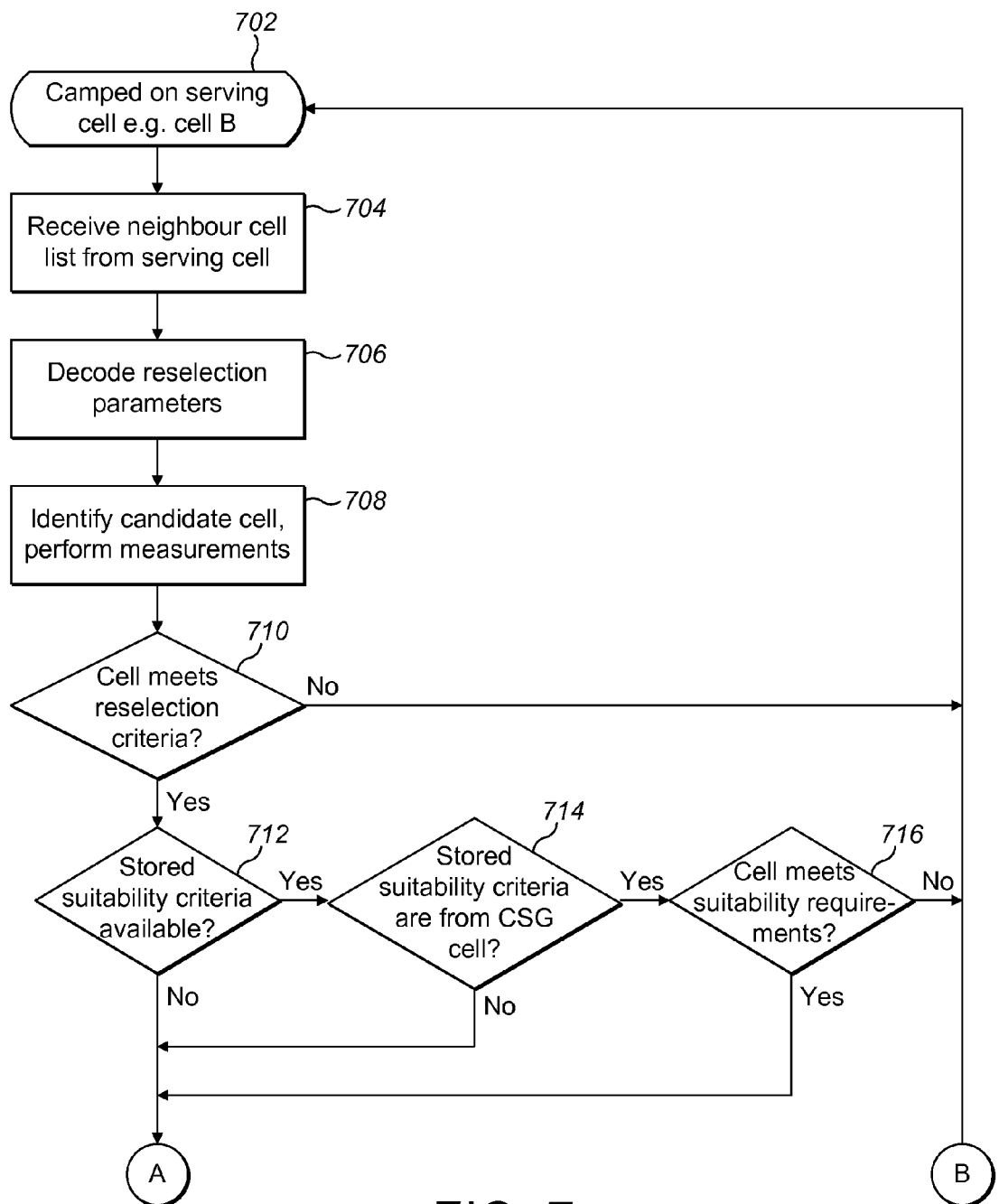
FIG. 7 shows a flow diagram illustrating an example of the present disclosure relating to Closed Subscriber Group (CSG) Cells.
Figure 7:
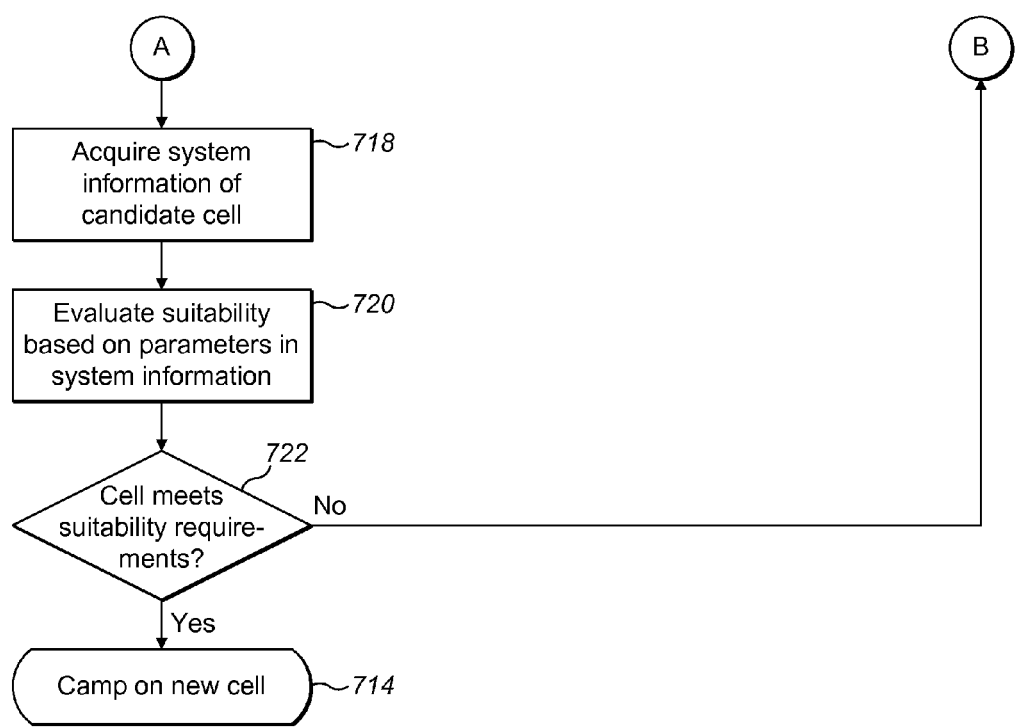

FIG. 7 illustrates this example, in which parameters are applied only to CSG cells only if they are derived from a CSG cell. At step 702, the MS is camped on the serving cell. The MS may first receive a neighbour cell list from the serving cell (step 704). The MS may then decode certain re-selection parameters from the neighbour cell list broadcast by the serving cell (step 706). The MS then identifies a candidate cell and performs measurements of it, such as signal strength, quality or power (step 708). The candidate cell is a CSG cell. If the cell does not meet the re-selection requirements, the MS remains camped on the serving cell. If the candidate cell does meet the re-selection requirements (step 710), the MS goes on to check if it has any stored criteria available (step 712). If there are none, the MS continues with the re-selection process and tunes to the frequency of the cell to decode system information.

The MS then checks if stored criteria are available which were obtained from a CSG cell. (step 714). If not, the MS continues with the re-selection process and tunes to the frequency of the cell to decode system information.

If the MS has stored criteria obtained from a CSG cell, the candidate CSG cell is checked against these criteria (step 716), for example, using the measurements performed in step 708. If the test is successful, the MS continues with the re-selection process. If it is not, the MS remains camped on the serving cell.

The MS will then, if the conditions described above are met or not as the case may be, tune to the frequency of the candidate cell and acquire system information (step 718). The suitability of the cell for re-selection is then evaluated based on parameters decoded from the system information (step 720). If the cell meets the suitability requirements (step 722), the MS may camp on the cell (step 724). If it does not, the MS may remain camped on the serving cell (step 702).

Optionally, before acquiring the system information of the candidate cell to decode suitability parameters at step 718, not shown is that the MS may evaluate the candidate cell using default parameters which are not explicitly signalled. In one example the default parameter is a predetermined amount and is specified in the re-selection specification. If the candidate cell does not meet the requirements based on this default parameter, the MS does not continue with the re-selection and the MS remains camped on the serving cell. If the MS does meet these requirements based on the default parameter, the MS continues with the re-selection process.

Figure 8:
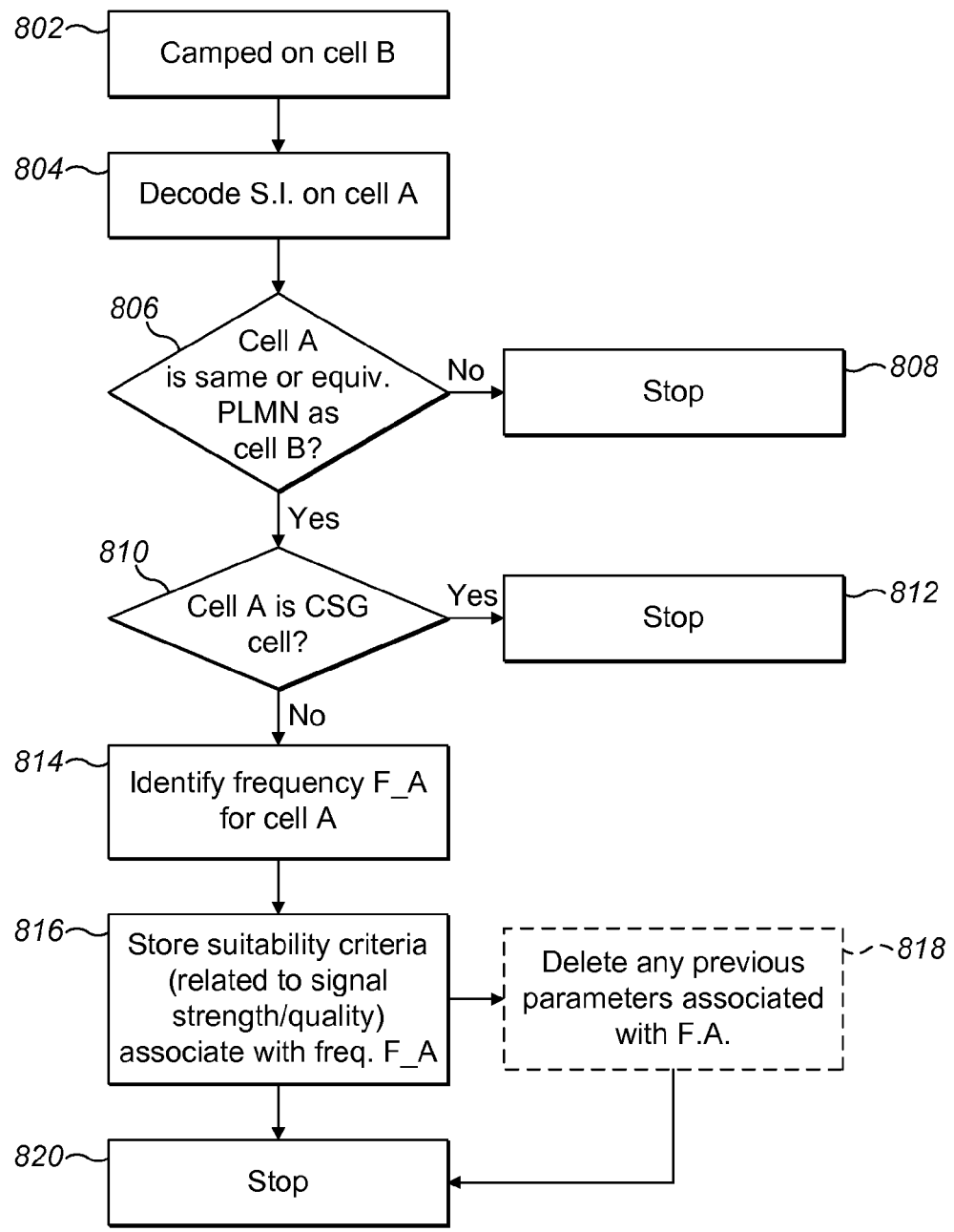
FIG. 8 shows a flow diagram illustrating an example of the present disclosure relating to storage of suitability criteria.

FIG. 8 illustrates a storing process according to the present disclosure. In FIG. 8, the step of stopping the process if the cell is a CSG cell is only applied where parameters from CSG cells are not stored or reused. Additionally, the step of deleting previously stored parameters is optional. Although this illustrates storage of CSG criteria, the illustration is also applicable to non-CSG cells storing frequency or identity specific parameters, whereby the criteria for storage of the parameters is altered as required.

With the MS camped on a serving cell (step 802), the MS may decode system information of a cell (step 804). The cell, referred to here as 'cell A' may be a candidate cell which the MS has previously evaluated or may be any other cell. In a known manner, the MS may evaluate if the cell which the parameters are decoded from, cell A, is of the same or an equivalent PLMN as the serving cell (step 806). If it is not, the parameters may not be stored and the process may stop (step 806). If it is, the process may continue. This ensures that unnecessary parameters are not stored and the network may be able to control the configuration of the stored parameters. Next, in accordance with the present example, the MS will check if the parameters are derived from a CSG cell (step 810). If they are, then the process will stop and the parameters will not be stored (step 812). This is merely one example of the present disclosure. Other examples are described herein where the parameter is stored independently of the non-CSG parameters and the CSG parameters are used only to evaluate CSG cells.

In accordance with an earlier described example, the MS may then identify the frequency of the cell from which the parameters were derived (step 814). The suitability criteria decoded from the system information are then stored by the MS and associated with the frequency of the cell for subsequent use (step 816). Any previous parameters associated with the frequency of this cell, i.e. F_A, may then optionally be deleted (step 818). The process may then be finished (step 820). The above storing process is equally applicable to the process of storing parameters in association with a cell's unique identifier or any combination of the described applicability of criteria.

In a further example, it is contemplated that cells may broadcast a "do not store" flag to indicate that the MS shall not store parameters for that cell. This may be useful for, for example test cells, which may have very particular or unique settings. Alternatively, there may be some implicit indication or definition of cells for which parameters should not be stored at all; for example, one or more of the CSG cells as illustrated in FIG. 8, barred cells or cells where a particular reject cause was received.

Stored values may also be subject to timer expiry, to ensure that stored parameters (in particular, very restrictive parameters) time out and don't permanently restrict re-selection.

Replacement of stored values by more recently received values may also be restricted based on:

the absolute value of the decoded values
the value relative to a previously stored value (higher/lower/greater than some difference).

This may be useful to prevent storage of obviously very restrictive parameters or unusual parameters, or to generally ensure that the most optimistic values are stored to avoid the device incorrectly abandoning re-selection evaluation based on stored parameters.

The parameters stored by the MS may have been obtained through idle mode re-selection or may alternatively have been obtained in connected mode or through some other method. It is described that the parameters are obtained through decoding system information of a cell. This need not always be the case, for example the parameters could be broadcast separately from system information. Other methods of obtaining and storing the parameters to those described above are envisaged.

Figure 10:
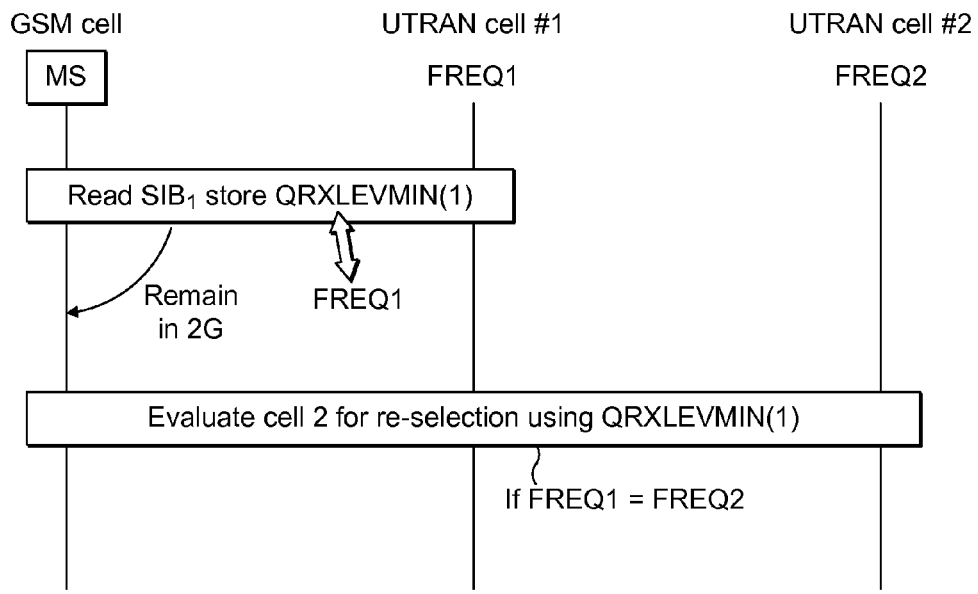
FIG. 10 shows a process illustrating an example of the present disclosure in which stored suitability parameters are applied on a per-frequency basis.

FIGS. 10 to 14 illustrate certain examples of the present disclosure. Of course it is envisaged that any of these described examples can be combined. FIG. 10 illustrates an MS which first reads the System Information Block (SIB) of a first UTRAN Cell 1. The Qrxlevmin parameter is stored on the MS and associated with the Frequency, FREQ1, of UTRAN Cell 1 where the parameters came from. The MS remains on the GSM serving cell, perhaps because Cell 1 is not appropriate for re-selection; however the reason is irrelevant. The MS then evaluates UTRAN Cell 2 for re-selection. If the frequency of Cell 2, FREQ2, is equal to FREQ1, then the MS uses the stored Qrxlevmin value to evaluate Cell 2. Not shown is that, if the evaluation is successful, the MS will re-select to Cell 2 or alternatively, the MS will continue or complete the re-selection process towards Cell 2 because it may not be conclusive after this test that re-selection will be successful. Also not shown is that if the frequencies are not equal, the evaluation is performed without the stored parameter.

Figure 11:
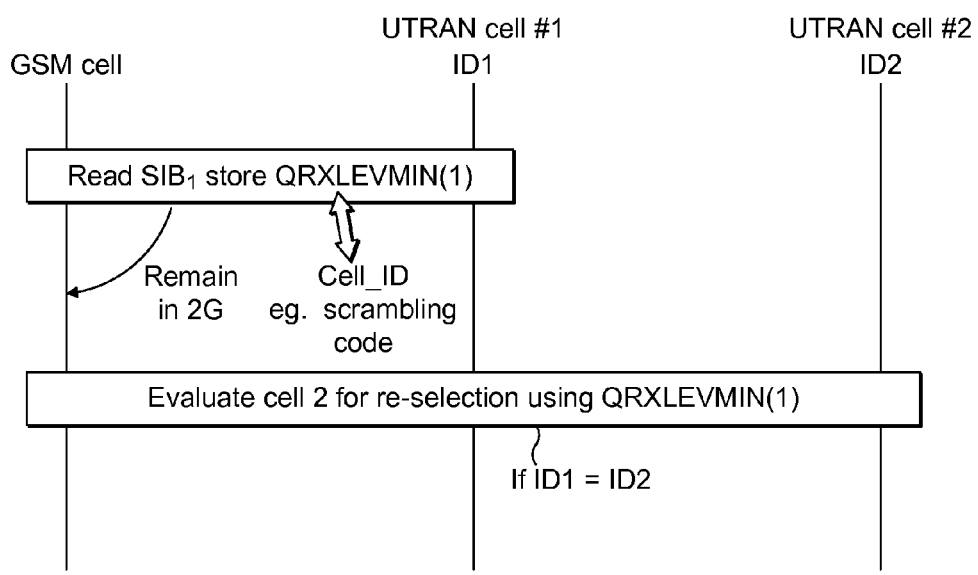
FIG. 11 shows a process illustrating an example of the present disclosure in which stored suitability parameters are applied on a per-cell basis.

FIG. 11 illustrates an MS which first reads the SIB of a first UTRAN Cell 1. The Qrxlevmin parameter is stored on the MS and associated with the identity, ID1, of UTRAN Cell 1 where the parameters came from. The identity ID1 may, for example, be the scrambling code. The MS remains on the GSM serving Cell. The MS then evaluates UTRAN Cell 2 for re-selection. If the Cell_ID of Cell 2, ID2, is equal to ID1, then the MS uses the stored Qrxlevmin value to evaluate Cell 2. Not shown is that, if the evaluation is successful, the MS will re-select to Cell 2. Also not shown is that if the Cell IDs are not equal, the evaluation is performed without the stored parameter.

Figure 12:
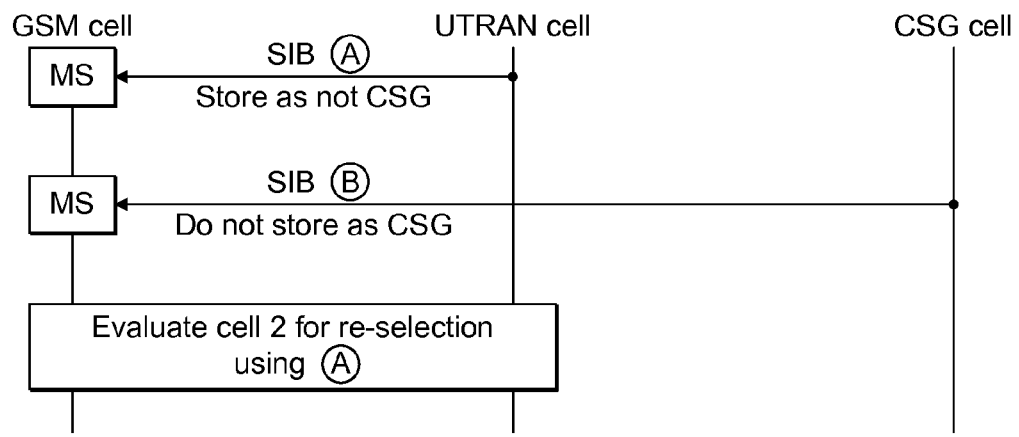
FIG. 12 shows a process illustrating an example of the present disclosure relating to Closed Subscriber Group (CSG) Cells.

FIG. 12 illustrates an example of the present disclosure relating to CSG cells. The MS first decodes the System Information Block (SIB) of a first UTRAN cell. The MS stores the Qrxlevmin as the cell is a UTRAN cell and not a CSG cell. The MS then decodes the SIB of a CSG cell (which may also be a UTRAN cell). In this example, the Qrxlevmin is not stored since the cell is a CSG cell. The MS then evaluates the UTRAN cell for re-selection. The MS uses the stored Qrxlevmin value obtained from the first UTRAN Cell in the evaluation, since this was stored and the Qrxlevmin from the CSG cell was not.

Figure 13:
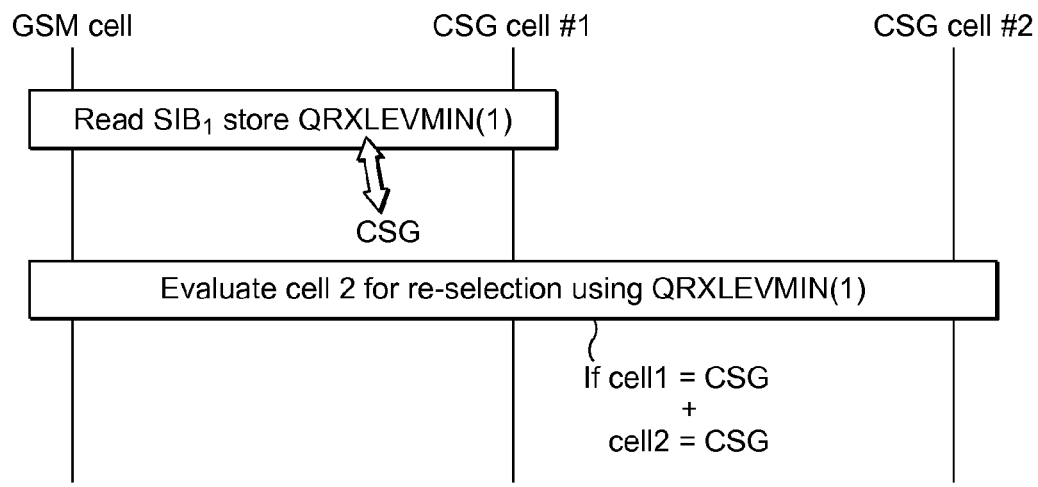
FIG. 13 shows a process illustrating an example of the present disclosure relating to Closed Subscriber Group (CSG) Cells.

FIG. 13 illustrates another example of the present disclosure relating to CSG cells. The MS reads the SIB of a first CSG Cell 1 and decodes the SIB. The MS then stores the Qrxlevmin and associates it in its data store with an indication that the parameter was obtained from a CSG cell. The MS remains camped on the serving cell, in this case a GSM cell. The MS then evaluates a second CSG Cell 2 for re-selection using the stored Qrxlevmin value since Cell 2 is a CSG cell.

Figure 14:
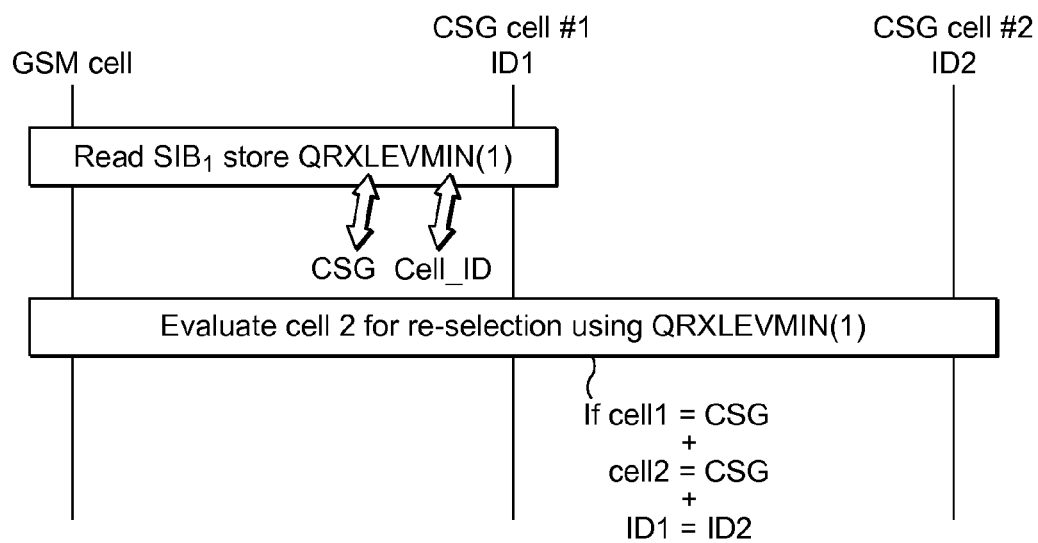
FIG. 14 shows a process illustrating an example of the present disclosure relating to Closed Subscriber Group (CSG) Cells.

FIG. 14 illustrates another example of the present disclosure. The MS is camped on a GSM cell. The MS reads and decodes the SIB of a first CSG Cell 1. The MS then stores the Qrxlevmin and associates it in the data store with an indication that the cell is a CSG Cell and the Cell_ID of the cell, ID1, from which the Qrxlevmin is derived. The MS remains camped on the GSM Cell. The MS then evaluates a second CSG Cell 2 for re-selection using the stored Qrxlevmin only if the cell is a CSG cell and the Cell_ID of the second cell, ID2, equals ID1. Preferably, the frequency of the cell and the Cell_ID may be considered jointly as described above, for example, the CSG cell may be evaluated using stored parameters only if the frequency and the Cell_ID of the cell from which the parameters were obtained are the same as those for the candidate cell.

A specific exemplary implementation of an example of the present disclosure will now be described. In a multi RAT system, whenever the UE attempts to camp on a UTRAN FDD cell (and/or is camped on the cell, and/or has any other reason to read the SIB of a UTRAN FDD cell) it decodes the RSCP criterion parameters from SIBs and stores it for future use. The UE may store the frequency of the cell in addition to other parameters. When a UE moves to 2G, the UE can start applying the stored suitability criteria parameters for 2G to 3G cell re-selections towards all UTRAN FDD cells configured on the frequency for which last information was stored.

Currently only the RSCP criterion is stored and used in the system but with this change the UE needs to store the frequency associated with RSCP criterion. The UE may have to maintain a list of frequency and associated RSCP criterion parameters. If the UE subsequently reads the SIB of another UTRAN FDD cell operating on a frequency for which it has stored suitability parameters, then it may replace the stored values with those from the SIBs it has just read. The list will get cleared after PLMN selection (see 3GPP TS 23.122).

The present disclosure reduces the chances of a device being stuck in 2G in certain configurations, provides improved flexibility to operators in configuring suitability criteria (since these will only be used for other cells of the same frequency) and allows 2G to 3G cell re-selection to non "restricted" frequencies of the PLMN in the case where certain frequencies are "restricted" by means of high suitability thresholds.

Considering the scenario of cells A, B and C described above, where cell B is the serving cell, cell A is a cell from which parameters have previously been decoded and cell C is the current candidate cell, the parameters associated with Cell A may be:
PLMN ID (referred to as PLMN_A],
Frequency, [F_A]
Physical layer address (PCI/PSC) [P_A] or
Whether it is a CSG cell [is CSG_A].

These parameters may all be determined by decoding the system information (SIB) of cell A. The system information is generic and may be derived from other blocks than the SIB referred to throughout the present disclosure. The PLMN rules in these examples are merely exemplary and are not necessary to the present disclosure. They are an additional, independent constraint.

The parameters associated with Cell B, which is the serving cell in this exemplary scenario, may be:
PLMN ID, [PLMN_B]; or
[Frequency, Physical layer address (PCI/PSC) which is relevant only if Cell B is of the same RAT as Cells A,C].

The parameters associated with Cell C may be:
Frequency, [F_C];
Physical layer address (PCI/PSC) [P_C];

Whether it is a CSG cell [is CSG_C]—This may only be determinable either based on F_C, or, based on P_C and knowledge of the range of physical layer addresses reserved for CSG cells; or

[PLMN_C which may not be known at the time when the initial evaluation of radio signal quality/strength is carried out].

Typically, the conventional specifications specify that the parameters from Cell A can be used to evaluate Cell C if PLMN_A=PLMN_B or PLMN_A and PLMN_B are equivalent.

One of the examples of the disclosure is to modify this rule to be that parameters from Cell A can be used to evaluate Cell C if
    i) PLMN_A=PLMN_B or PLMN_A and PLMN_B are equivalent and
    ii) F_A=F_C.

Considering another example, illustrated in FIG. 8, taking into account CSG cells, this can be expressed as: Parameters from Cell A can be used to evaluate Cell C if
    i) PLMN_A=PLMN_B or PLMN_A and PLMN_B are equivalent, and
    ii) F_A=F_C, and
    iii) neither Cell A nor cell C are CSG cells (i.e. is CSG_A=False and is CSG_C=False)

A further example relating to CSG cells (which, in effect, states that cells A and C must be both CSG cells), can be expressed as:
Parameters from Cell A can be used to evaluate Cell C if
    i) PLMN_A=PLMN_B or PLMN_A and PLMN_B are equivalent, and
    ii) F_A=F_C, and
    iii) both Cell A and cell C are CSG cells (i.e. is CSG_A=True and is CSG_C=True)

A further example relating to CSG cells (which, in effect, states that cells A and C must be, with high probability, the same cell), can be expressed as the above conditions in addition to:
    iv) P_A=P_C Further modifications to the above rules can be considered, to address the case where different (but equivalent) PLMNs have different re-selection criteria, by modifying rule i) in each or any combination of the cases above to:
    i) PLMN_A=PLMN_B In a further example of the present disclosure, previously stored suitability requirements (which may have been obtained as a result of ranking-based re-selection) shall not be used when evaluating cells according to priority-based re-selection rules. In a priority-based re-selection algorithm, threshold parameters may be broadcast in the serving cell, as described above. In the present example, the restriction on the use of stored suitability parameters may be dependent on whether the corresponding (signal quality/signal strength) parameters are available in the current serving cell, for example, broadcast by the cell. This is not always the case.

Figure 9:
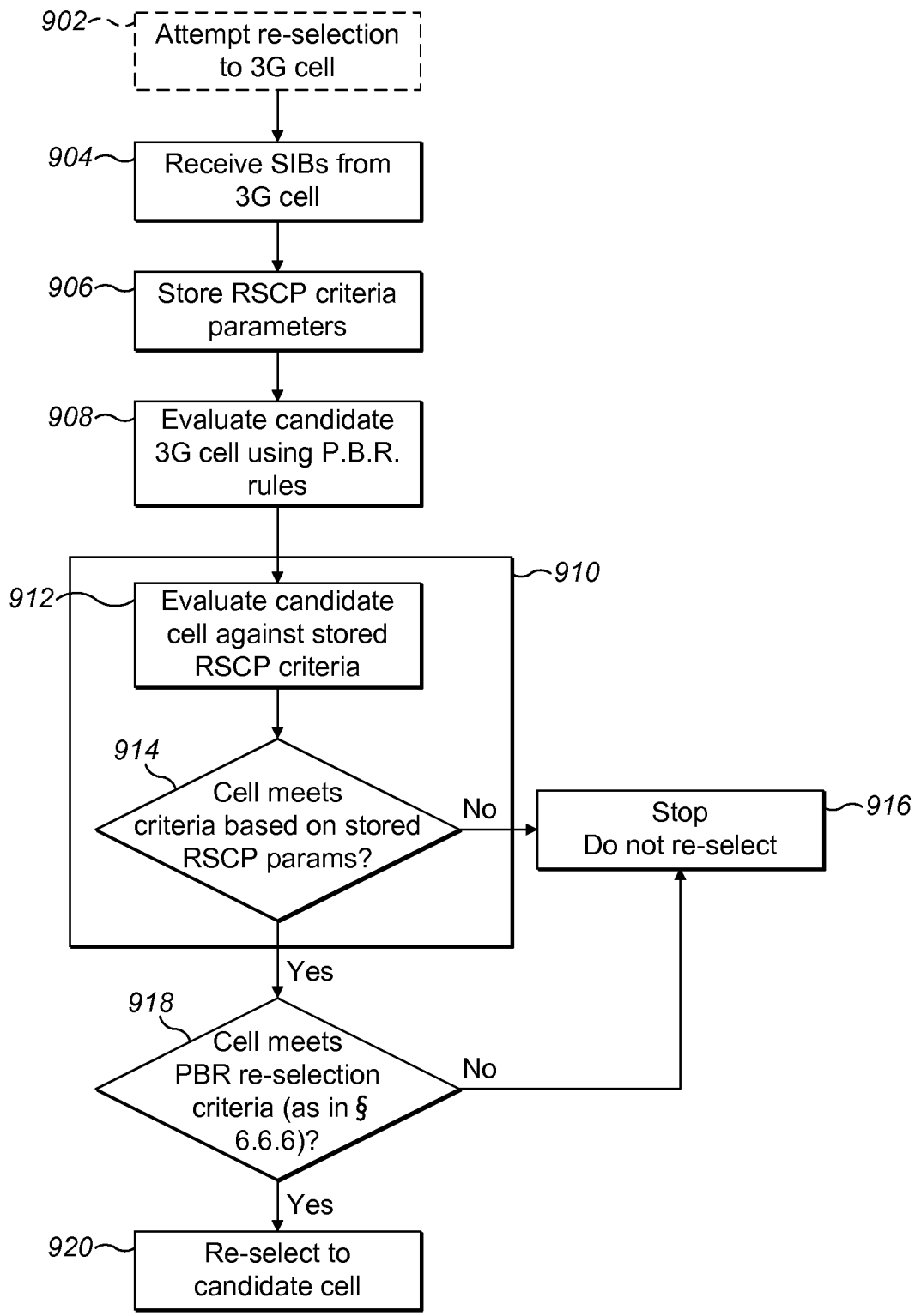
FIG. 9 shows a flow diagram illustrating an example of the present disclosure relating to priority-based re-selection.

FIG. 9 illustrates this particular example. The process may optionally begin with an MS attempting re-selection to a 3G cell. The MS receives the System Information Blocks (SIBs) from the 3G cell (step 904) and then decodes and stores the Received Signal Code Power (RSCP) criteria parameters (step 906). The MS may then evaluate a candidate 3G cell using the priority-based re-selection rules in the known manner (step 908).

Conventionally, the MS will then evaluate the candidate cell against stored RSCP criteria (step 912) and, if the cell does not meet the criteria based on the stored RSCP parameters (step 914), the process will stop and the MS will not re-select to the cell (step 916). If the candidate cell does meet the criteria (step 914), then the cell will be evaluated to see if it meets the priority-based re-selection criteria, as stated in section 6.6.6. of the 45.008 specification.

According to the present disclosure, however, the steps covered by the area marked 910, are not to be carried out. According to the present disclosure, in a priority-based re-selection algorithm, the candidate cell is not to be evaluated using stored threshold criteria. These criteria may have been obtained as part of a ranking-based algorithm and by decoding system information from another cell, or the same cell.

In the present example, when the MS has evaluated a candidate cell using the priority-based re-selection rules (step 908), it then determines if the candidate cell meets the priority-based re-selection criteria regardless, or irrespective, of any stored parameters (step 918). If the cell does not meet the criteria, the evaluation ends and the MS does not re-select to the cell (step 916). If the candidate cell does meet the re-selection criteria in accordance with the priority-based re-selection rules, the MS performs re-selection to the cell (step 920).

In this way, the priority-based re-selection algorithm is not hampered by incorrect parameters, which may have been stored during ranking-based re-selection. If the parameters are broadcast by the serving cell, they would remain the primary criteria to be used in priority-based re-selection. If parameters are not broadcast, then the MS should determine the appropriateness of the cell for re-selection without using stored parameters which may be untrustworthy.

Figure 15:
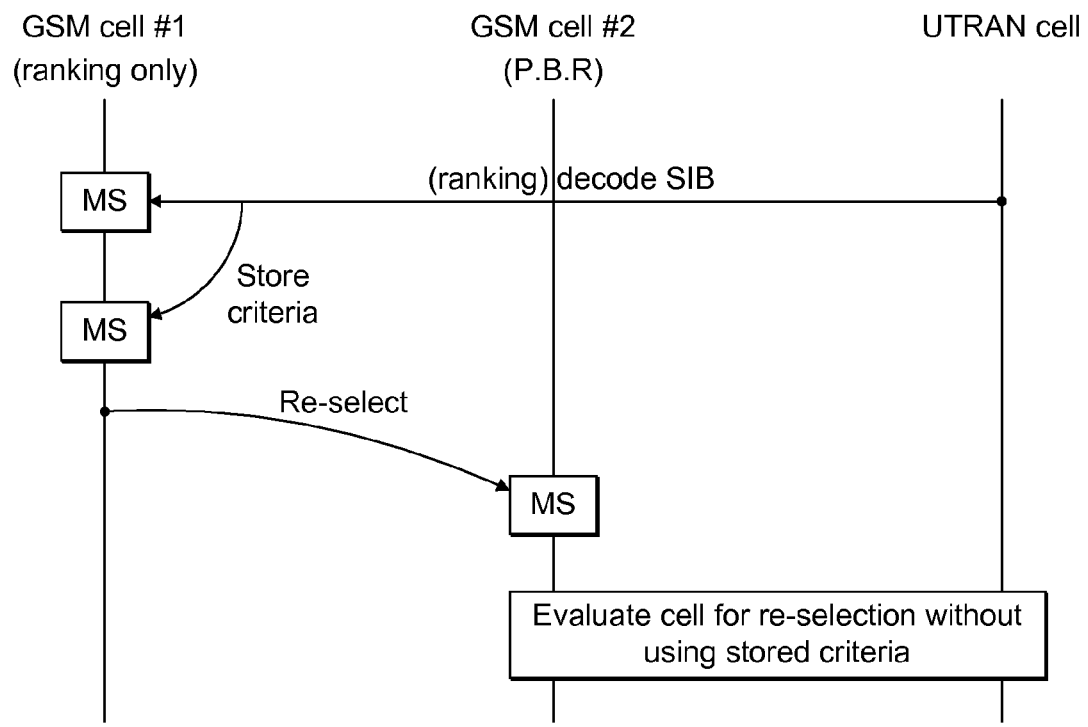
FIG. 15 shows a process illustrating an example of the present disclosure relating to priority-based re-selection; and, FIG. 16 shows a flow diagram illustrating an example of the present disclosure in which certain radio-related evaluations are not performed.

FIG. 15 illustrates an MS which first reads the System Information Block (SIB) of a UTRAN Cell while camped on a first GSM Cell 1. In GSM Cell 1 only ranking algorithms are used for re-selection to UTRAN cells. The Qrxlevmin parameter is stored on the MS. The MS may perform re-selection from the GSM cell 1 to a second GSM Cell 2. The GSM Cell 2 supports priority-based re-selection. From the GSM Cell 2, the MS may evaluate the UTRAN cell using priority-based re-selection. When performing the priority-based evaluation, the MS will not use the stored criteria that were obtained from the UTRAN cell during the ranking algorithm. Not shown is that, if the evaluation is successful, the MS will re-select to the UTRAN Cell.

An exemplary algorithm which may be used to implement the principles of the above disclosure will now be described. Although the language of the algorithm which this example builds on may be altered or clarified, the principles illustrated by the text which has been inserted and altered when compared to the original algorithm are equally applicable to any amended algorithm.

This is an algorithm for cell re-selection from GSM to UMTS based on cell ranking. The algorithm in this subclause shall be used for re-selection from GSM to UMTS if the conditions for the use of the cell re-selection algorithm based on priority information are not satisfied.

If the 3G Cell Re-selection list includes UTRAN frequencies, the MS shall, at least every 5 s update the value RLA_C for the serving cell and each of the at least 6 strongest non serving GSM cells.

The MS shall then reselect a suitable (see 3GPP TS 25.304) UTRAN cell if
    for a TDD cell the measured RSCP value is equal to or greater than TDD_Qoffset for a period of 5 s and
    for an FDD cell the following criteria are all met for a period of 5 s:

1. its measured RSCP value exceeds the value of RLA_C for the serving cell and all of the suitable (see 3GPP TS 43.022) non-serving GSM cells by the value FDD_Qoffset,
2. its measured Ec/No value is equal or greater than the value FDD_Qmin–FDD_Qmin_Offset, and
3. its measured RSCP value is equal to or greater than FDD_RSCP_threshold.

In case of a cell re-selection occurring within the previous 15 seconds, FDD_Qoffset or TDD_Qoffset is increased by 5 dB.

Ec/No and RSCP are the measured quantities, see subclause 8.1.5.

FDD_RSCP_threshold equals FDD_RSCPmin–min ((P_MAX–21 dBm), 3 dB) if FDD_RSCPmin is broadcast on the serving cell, else Qrxlevmin+Pcompensation+10 dB, if these parameters are available, otherwise the default value of FDD_RSCPmin.

Qrxlevmin is the minimum required RX level in the UTRAN FDD cell (dBm), see 3GPP TS 25.304.

Pcompensation is max(UE_TXPWR_MAX_RACH–P_MAX, 0) (dB), see 3GPP TS 25.304.

UE_TXPWR_MAX_RACH is the maximum TX power level an MS may use when accessing the UTRAN FDD cell on RACH (dBm), see 3GPP TS 25.304.

P_MAX is the maximum RF output power of the MS (dBm) in UTRAN FDD mode, see 3GPP TS 25.304.

FDD_Qmin, FDD_Qoffset and optionally FDD_RSCPmin and FDD_Qmin_Offset are broadcast on BCCH of the serving cell.

TDD_Qoffset is broadcast on BCCH of the serving cell.

Note 1: The parameters required to determine if the UTRAN cell is suitable are broadcast on BCCH of the UTRAN cell. An MS may start re-selection towards the UTRAN cell before decoding the BCCH of the UTRAN cell, leading to a short interruption of service if the UTRAN cell is not suitable.

Note 2: If FDD_RSCPmin is broadcast, optimum GSM to UTRAN re-selection performance is achieved if UTRAN cells at UTRAN coverage border areas are planned for +24 dBm UE power.

Note 3: The parameter TDD_Qoffset is an absolute threshold for re-selection towards a target UTRAN TDD cell.

The MS shall store the UTRAN cell RSCP suitability criterion parameters above, whenever decoded from a UTRAN FDD cell of an equivalent PLMN while attempting to camp on the UTRAN FDD cell unless the cell is a CSG cell/indicates 'do not store'/is unsuitable because i it is part of the "list of forbidden LAs for roaming" 1 or it is barred/or would result in a FDD_RSCP_threshold which is [greater than that currently stored for cells on the same frequency/greater than [XX] dB. The most recently stored parameters from a UTRAN FDD cell of an equivalent PLMN are valid re-selection criteria towards all UTRAN FDD cells except CSG cells and cells evaluated according to the priority-based re-selection algorithm (see sub-clauses 6.6.7 and 6.6.6 respectively). Stored values which were received more than [5] minutes ago shall be cleared. This list of parameters shall be cleared after PLMN selection (see 3GPP TS 23.122).

It should be noted that the "/" here is used to distinguish different aspects of the disclosure, though they may be combinable.

Cell re-selection to UTRAN shall not occur within 5 seconds after the MS has reselected a GSM cell from an UTRAN cell if a suitable GSM cell can be found.

In case of a re-selection attempt towards a barred UTRAN cell, the MS shall abandon further re-selection attempts towards this UTRAN cell as defined by the $T_{barred}$ value on the barred UTRAN cell (see 3GPP TS 25.331).

In case the highest ranked UTRAN cell is not suitable (see 3GPP TS 25.304) due to being part of the "list of forbidden LAs for roaming" or belonging to a PLMN which is not indicated as being equivalent to the registered PLMN, the MS may abandon further re-selection attempts towards this UTRAN cell and all other cells on the same frequency, for a period of up to 20 min. If the MS has to perform cell selection, this limitation shall be removed. If the MS is redirected under GERAN control to a frequency for which the timer is running, any limitation on that frequency shall be removed.

If more than one UTRAN cell fulfils the above criteria, the MS shall select the cell with the greatest RSCP value.

A further exemplary algorithm which may be used to implement the principles of the above disclosure will now be described. Although the language of the algorithm which this example builds on may be altered or clarified, the principles illustrated by the text which has been inserted and altered when compared to the original algorithm are equally applicable to any amended algorithm.

This is an algorithm for inter-RAT cell re-selection based on priority information. The algorithm in this subclause shall be used for inter-RAT cell re-selection if priorities are available to the MS and thresholds are provided by the network, and if the mobile station supports priority based inter-RAT cell re-selection and priority information for the serving cell is provided by the network. A mobile station supporting E-UTRAN shall support priority based inter-RAT cell re-selection towards all the supported RATs. A mobile station not supporting E-UTRAN and supporting UTRAN and supporting priority based re-selection from UTRAN to GERAN shall support priority based inter-RAT cell re-selection towards UTRAN.

The network shall provide priority information if E-UTRAN frequencies are included in the neighbour cell list; the network may provide priority information if only UTRAN frequencies are included in the neighbour cell list. If priority information is available to the mobile station and the mobile station supports priority based inter-RAT cell re-selection, the algorithm in this subclause shall be used for inter-RAT re-selection towards all RATs. The rules regarding which set of priorities is valid at any given time are defined in 3GPP TS 44.018.

NOTE 1: "Priority information" includes priorities and thresholds which are related to each UTRAN or E-UTRAN frequency (e.g. UTRAN_PRIORITY, E-UTRAN_PRIORITY, THRESH_UTRAN_high, THRESH_E-UTRAN_high) and information related to the serving cell (e.g. GERAN_P-RIORITY, THRESH_GSM_low).

NOTE 2: Throughout the specification, the phrase "neighbour cell list" will include also the E-UTRAN Neighbour Cell list where appropriate.

NOTE 3: Priorities need to be provided also for frequencies of networks that do not support priority-based cell re-selection.

If the 3G Cell Re-selection list or the E-UTRAN Neighbour Cell list includes frequencies of other radio access technologies, the MS shall, at least every 5 s update the value RLA_C for the serving cell and each of the at least 6 strongest non serving GSM cells.

The MS shall then reselect a suitable (see 3GPP TS 25.304 for UTRAN and 3GPP TS 36.304 for E-UTRAN) cell of another radio access technology if the criteria below are satisfied. S_non-serving_XXX is the measurement quantity of a non-serving inter-RAT cell and XXX indicates the other radio access technology/mode and is defined as follows:

for a UTRAN cell, is the measured RSCP value for the cell minus UTRAN_QRXLEVMIN for the cell's frequency;

for a E-UTRAN cell, is the measured RSRP value for the cell minus E-UTRAN_QRXLEVMIN for the cell's frequency if THRESH_E-UTRAN_high_Q is not provided; otherwise, if THRESH_E-UTRAN_high_Q is provided, is the measured RSRQ value for the cell minus E-UTRAN_QQUALMIN for the cell's frequency.

Stored suitability requirements (e.g. such RSCP suitability requirements stored as specified in sub-clause 6.6.5) shall not be used for UTRAN cells when evaluating cells according to the criteria in this sub-clause.

For a GSM cell, S_GSM is defined as the C1 value for the cell (see subclause 6.4);

Cell re-selection to a cell of another inter-RAT frequency shall be performed if any of the conditions below (to be evaluated in the order shown) is satisfied:

The S_non-serving_XXX of one or more cells of a higher priority inter-RAT frequency is greater than THRESH_XXX_high (or, in case of an E-UTRAN target, THRESH_E-UTRAN_high_Q, if provided) during a time interval T_re-selection; in that case, the mobile station shall consider the cells for re-selection in decreasing order of priority and, for cells of the same inter-RAT frequency or of inter-RAT frequencies of equal priority, in decreasing order of S_non-serving_XXX, and reselect the first cell that satisfies the conditions above;

The value of S_GSM is lower than THRESH_GSM_low for the serving cell and all measured GSM cells during a time interval T_re-selection; in this case, the mobile station shall consider for re-selection the inter-RAT cells in the following order, and reselect the first one that satisfies the following criteria:

cells of a lower priority inter-RAT frequency whose S_non-serving_XXX is greater than THRESH_XXX_low (or, in case of an E-UTRAN target, THRESH_E-UTRAN_low_Q, if provided) during a time interval T_re-selection; these cells shall be considered in decreasing order of priority and, for cells of the same RAT, in decreasing order of S_non-serving_XXX;

if no cells satisfy the criterion above, inter-RAT cells for which, during a time interval T_re-selection, S_non-serving_XXX is higher than S_GSM for the serving cell by at least a specific hysteresis H_PRIO; these cells shall be considered in decreasing order of S_non-serving_XXX.

A UTRAN FDD cell shall only be reselected if in addition to the criteria above, its measured Ec/No value is equal to or greater than FDD_Qmin–FDD_Qmin_Offset.

If E-UTRAN_Qmin is provided for a E-UTRAN frequency, a E-UTRAN cell on that frequency shall only be reselected if, in addition to the criteria above, its measured RSRQ value is equal to or greater than E-UTRAN_Qmin. A mobile station shall store {all/RSRQ-related} suitability requirements from an E-UTRAN cell on the same PLMN or on an equivalent PLMN as that of the serving cell[, to which it has attempted re-selection] [unless it received an indication from that cell e.g. in system information that suitability requirements for that cell shall not be stored] [or the cell was a CSG cell] for was not suitable]. When evaluating an E-UTRAN cell, the most recently-stored RSRQ-related suitability requirements received from an E-UTRAN cell [other than those obtained from a CSG cell] on the same frequency/frequency of the same priority shall be used if E-UTRAN_Qmin is not provided by the serving cell.

If THRESH_E-UTRAN_high_Q is provided for a E-UTRAN frequency, and if E-UTRAN_RSRPmin is provided, a E-UTRAN cell on that frequency shall only be reselected if, in addition to the criteria above, its measured RSRP value is equal to or greater than E-UTRAN_RSRPmin. If E-UTRAN_RSRPmin is not provided, the default value shall be used.

E-UTRAN cells which are included in the list of not allowed cells shall not be considered as candidates for cell re-selection. If the strongest cells on a E-UTRAN frequency are included in the list of not allowed cells, the mobile station may reselect the strongest valid cell (see subclause 8.4.7) on that frequency.

Cell re-selection to a cell of another radio access technology (e.g. UTRAN or E-UTRAN) shall not occur within 5 seconds after the MS has reselected a GSM cell from an inter-RAT cell if a suitable GSM cell can be found.

If the mobile station applies either common priorities or individual priorities received through dedicated signalling and priorities are available only for some inter-RAT frequencies, cells belonging to frequencies for which no priority is available or no threshold is provided by the serving cell shall not be considered for measurement and for cell re-selection.

If a mobile station in camped normally state (see 3GPP TS 43.022) applies individual priorities received through dedicated signalling and no priority is available for the serving cell, the mobile station shall consider any GSM cell (including the serving cell) to have lowest priority (i.e. lower than the eight network configured values).

A mobile station in camped on any cell state (see 3GPP TS 43.022) shall ignore individual priorities received through dedicated signalling and shall apply priorities received from the system information of the serving cell while attempting to find a suitable cell. If the mobile station supports CS voice services, the MS shall avoid reselecting acceptable (but not suitable) E-UTRA cells regardless of the priorities provided in system information.

NOTE 4: If the MS is camping on an acceptable cell, individual priorities are not discarded until an event leading to their deletion occurs.

In case of a re-selection attempt towards a barred UTRAN cell, the MS shall abandon further re-selection attempts towards this UTRAN cell as defined by the $T_{barred}$ value on the barred UTRAN cell (see 3GPP TS 25.331).

In case of a re-selection attempt towards a barred E-UTRAN cell, the MS shall abandon further re-selection attempts towards this E-UTRAN cell for a period of up to 20 min.

In case the MS attempts re-selection to a UTRAN cell which is not suitable (see 3GPP TS 25.304) due to being part of the "list of forbidden LAs for roaming" or belonging to a PLMN which is not indicated as being equivalent to the registered PLMN, the MS may abandon further re-selection attempts towards this UTRAN cell and all other cells on the same frequency, for a period of up to 20 min. If the MS has to perform cell selection, this limitation shall be removed. If the MS is redirected under GERAN control to a frequency for which the timer is running, any limitation on that frequency shall be removed.

In case the MS attempts re-selection to a E-UTRAN cell which is not suitable (see 3GPP TS 36.304) due to being part of the "list of forbidden tracking areas for roaming" (see 3GPP TS 24.301), and if the MS has received the PCID to TA Mapping information element (see 3GPP TS 44.018 and 3GPP TS 44.060) for the frequency of the cell, it shall abandon further re-selection attempts towards this E-UTRAN cell and any E-UTRAN cell which is known to belong to the same Tracking Area until the PCID to TA Mapping information changes in the serving cell or until cell re-selection occurs. If the mobile station has not received the PCID to TA Mapping information element for the frequency of the cell, the MS may abandon further re-selection attempts towards this E-UTRAN cell and all other cells on the same frequency, for a period of up to 20 min. If the MS has to perform cell selection, this limitation shall be removed. If the MS is redirected under GERAN control to a frequency for which the timer is running, any limitation on that frequency shall be removed.

In case the MS attempts re-selection to a E-UTRAN cell which is not suitable (see 3GPP TS 36.304) due to belonging to a PLMN which is not indicated as being equivalent to the registered PLMN, the MS may abandon further re-selection attempts towards this E-UTRAN cell and all other cells on the same frequency, for a period of up to 20 min. If the MS has to perform cell selection, this limitation shall be removed. If the MS is redirected under GERAN control to a frequency for which the timer is running, any limitation on that frequency shall be removed.

A further exemplary algorithm which may be used to implement the principles of the above disclosure will now be described. Although the language of the algorithm which this example builds on may be altered or clarified, the principles illustrated by the text which has been inserted and altered when compared to the original algorithm are equally applicable to any amended algorithm.

This is an algorithm for cell selection and re-selection to CSG cells and hybrid cells. Firstly, for cell re-selection to CSG cells, if a mobile station is a member of at least one Closed Subscriber Group, i.e. at least one CSG ID is included in the MS's CSG Whitelist, then, in addition to normal cell re-selection, the MS shall use an autonomous search function to detect UTRAN and/or E-UTRAN CSG cells. The autonomous search function shall at least detect previously visited allowed CSG cells, according to performance requirements.

NOTE 1: The autonomous search function is implementation dependent and controls when and/or where to search for allowed CSG cells.

NOTE 1a: (void).
NOTE 2: (void).
NOTE 3: (void).

If the strongest cell (see 3GPP TS 25.304 and 3GPP TS 36.304 for the definition of the strongest cell) which the MS has detected on a UTRAN or E-UTRAN frequency during a time interval T_re-selection is a suitable CSG cell (see 3GPP TS 25.304 and 3GPP TS 36.304 for suitability criteria for UTRAN and E-UTRAN CSG cells respectively), it should reselect to this cell irrespective of the cell re-selection rules applicable for the cell on which the MS is currently camped.

The MS shall disable the autonomous search function for CSG cells if the MS has no CSG Whitelist or the MS's CSG Whitelist is empty.

When the MS has no or an empty CSG Whitelist, and the MS has stored "CSG PSC Split Information" or "CSG PCI Split Information", the MS shall ignore for measurement and cell re-selection cells known to be CSG cells, i.e.:
cells on a UTRAN frequency with PSC in the stored range "CSG PSC Split Information" for that frequency (see 3GPP TS 25.331);
cells on an E-UTRAN frequency with PCI in the stored range "CSG PCI Split Information" for that frequency (see 3GPP TS 36.331).

In addition, when the MS has no or an empty CSG Whitelist, the MS may ignore for measurement and cell re-selection cells known to be CSG cells according to implementation specific means on a frequency for which no "CSG PCI Split Information" or "CSG PSC Split Information" is stored.

The network may provide information about dedicated UTRAN CSG frequencies and/or dedicated E-UTRAN CSG frequencies. In this case, the MS may use the autonomous search function only on these dedicated frequencies and on the other frequencies listed in the system information. When the MS has no or an empty CSG Whitelist, the MS shall ignore those frequencies for measurement and cell re-selection.

A mobile station shall store the RSRP/RSCP/RSRQ [i.e. signal quality and/or signal strength] related suitability requirements received from a CSG cell; these shall be maintained independently of criteria stored for non-CSG cells. When evaluating a CSG cell, the mobile station shall use the most recently-stored values from a [CSG] cell {on the same frequency/with the CSG ID. or When evaluating a CSG cell, the mobile station shall use the stored values from the same cell (or a cell with the same frequency and PCI/PSC) {Provided these were received less than [2] minutes ago.

Secondly, for cell re-selection to hybrid cells, if a mobile station is a member of at least one Closed Subscriber Group then, in addition to normal cell re-selection, the MS shall use an autonomous search function to detect hybrid cells. The autonomous search function shall at least detect previously visited hybrid cells whose CSG IDs are included in the CSG whitelist of the MS, according to the performance requirements.

NOTE: The autonomous search for hybrid cells does not imply that the MS needs to constantly check the CSG IDs of all cells it sees, and the impact on battery consumption should be minimised.

If a neighbour cell has been detected as a hybrid cell and the CSG ID of the hybrid cell is included in the CSG Whitelist of the MS, re-selection to that cell shall follow the rules for CSG cells in subclause 6.6.7.1. Otherwise normal cell re-selection rules shall apply.

Thirdly, for manual CSG ID selection, if NAS requests AS to search for available CSG IDs, the MS shall perform the search and report the results to NAS as described in 3GPP TS 25.304 for UTRAN and as described in 3GPP TS 36.304 for E-UTRAN. If a CSG ID is manually selected by NAS, the MS shall behave as specified in 3GPP TS 25.304 or in 3GPP TS 36.304, depending on the RAT type of the selected CSG cell.

A further example of the present disclosure will now be described.

In some cases, as part of the typically known re-selection algorithm, the device is required to evaluate one or more aspects of the target cell (such as signal quality or signal strength, etc.) based on parameters such as thresholds broadcast by the serving cell (in this exemplary scenario, cell B).

However, it currently is required to re-evaluate these aspects once it has read the system information from the candidate cell (cell C), as part of the suitability check (since the suitability criteria include tests based on parameters broadcast by the candidate cell). This results in the device evaluating the same aspects twice. In a well-configured network, the parameters should be such that a cell which meets the re-selection criteria (based on parameters broadcast in the serving cell) should not fail the corresponding tests based on parameters broadcast in the candidate cell. In this scenario, the second test is redundant.

However, and furthermore, if the device performs both evaluations and fails the second test (i.e. based on parameters broadcast in the candidate cell C), it will return to the serving cell. It may then repeat this process endlessly until cell C no longer meets the criteria based on the parameters broadcast by cell B. This is likely an incorrect configuration of the network. In this scenario, the second test may result in the mobile station repeatedly attempting re-selection to the same cell.

Storage and re-use of parameters from cells A or C may address this latter problem, however, no provision is currently made in the priority-based re-selection scheme for storage of criteria from a candidate cell (see 6.6.6 of 45.008).

Furthermore, as noted elsewhere, storage of the suitability criteria broadcast by cell C in this scenario may cause incorrect abandonment of re-selection attempts to other cells (i.e. other than cell C), since a likely problem here is that cell C's suitability criteria (as determined based on parameters transmitted by cell C) are incorrectly set such that the criteria are too high.

Figure 16:
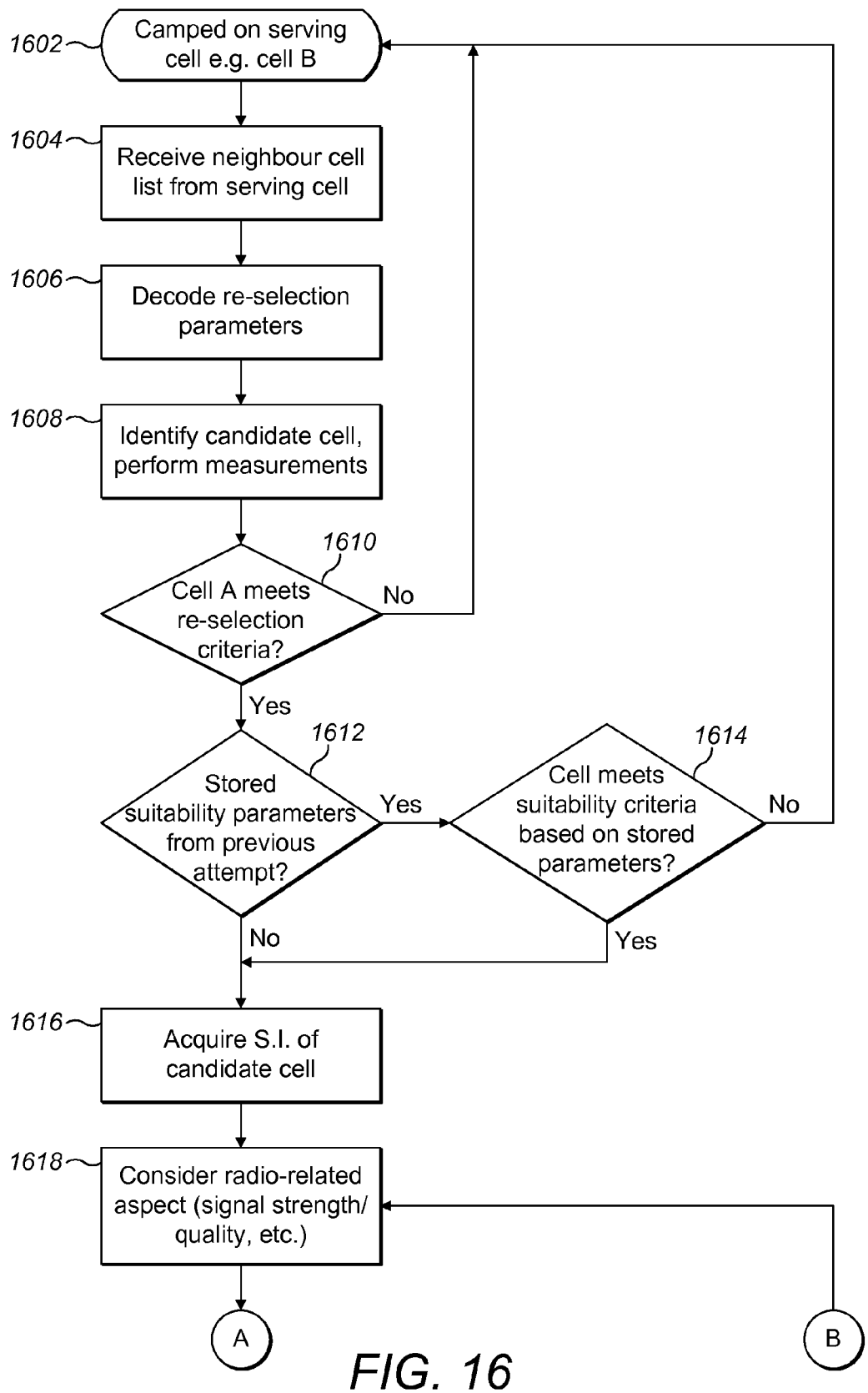
Figure 16:
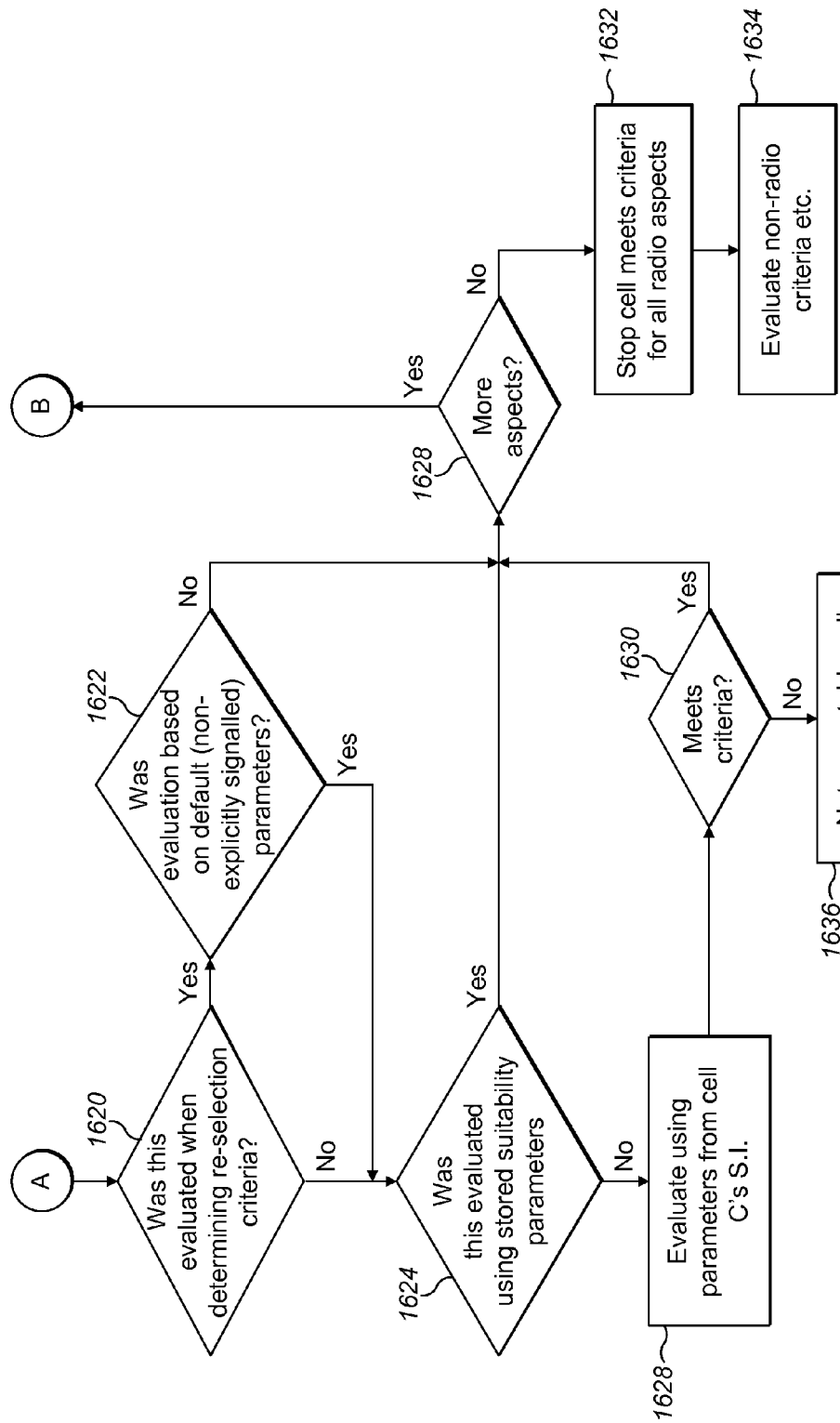

In a further exemplary implementation of the disclosure, it would be preferable for the device not to carry out some or any tests (e.g. as part of the test for suitability) based on criteria broadcast by cell C, if the criteria for re-selection based on parameters broadcast in the serving cell have already been tested and met. If re-selection criteria are met and the subset of suitability criteria are met, the device may remain camped in the candidate cell, irrespective of the value (s) of the parameter(s) associated with the skipped suitability check(s) broadcast in the candidate cell. This process is illustrated in FIG. 16.

As a further exemplary implementation: it should omit only those suitability tests which evaluate specific aspects (signal strength, signal quality) which were tested as part of the re-selection procedure. In some cases, only one of signal strength/quality might be tested as part of the re-selection algorithm.

As yet a further exemplary implementation it should omit only those tests which evaluate specific aspects (signal strength, signal quality) which were tested as part of the re-selection procedure and which were based on parameters which were broadcast or transmitted by the serving cell (as opposed to using default, standardised values).

As a further exemplary implementation, the above exception may apply only to "threshold-based" tests (i.e. where a measured quantity of the candidate cell must meet or exceed some determined absolute value), but not to "relative value" tests—e.g. where a measured value must exceed some other measured value (of the candidate cell, serving cell and/or one or more other cells) by some minimum difference.

In an exemplary scenario of the latter exemplary implementation, for CSG cells, a candidate CSG cell may meet the re-selection criteria if it is the strongest on its frequency. This is considered a 'relative' test of signal strength, rather than an absolute test.

In typical conventional networks, that a device may currently be required to check suitability criteria twice: once using stored values (obtained from the same, or a different cell), and once using values received from the candidate cell once it has decoded the relevant system information.

Currently, there is a relatively high risk that the suitability parameters stored by the device and used for the initial evaluation of suitability (i.e. before system information of candidate cell has been received) may be different from those broadcast by the candidate cell itself. It is therefore reasonably possible that the suitability criteria may be met in respect of the first test, but not for the second.

In a further exemplary implementation of the disclosure which is illustrated in FIG. 16, if a restriction on the usage of stored parameters from cell A when evaluating cell C is in place (such as, they must be on the same frequency, or both must be non-CSG cells), then the risk that the parameters are different is significantly lowered. Therefore, according to this exemplary implementation of the disclosure, to further reduce the need for evaluation of parameters and/or to reduce the risk that a device determines (based on stored parameters) to perform re-selection, acquires system information of the candidate cell, and then determines that the re-selection is not possible. The device may omit the second suitability check. This is similar to the omission in the preceding exemplary implementation of the disclosure.

This may be conditional on the frequency of cell A and cell C being the same; optionally, further criteria may apply— such as the physical layer address of cell A and cell C must be the same; in general, any suitable criteria can be used, such as those listed above.

A further condition may be that cell A and cell C were both re-selection candidates while the device was initially camped in cell B—for example, in the following case:
  i) device is camped in cell B
  ii) device attempts re-selection to cell A; reads suitability criteria for cell A and determines these are not met; remains in cell B
  iii) device attempts re-selection to cell C—cell C and cell A operate on the same frequency; cell C meets the suitability criteria as obtained from cell A; device does not re-evaluate suitability criteria based on parameters obtained from cell C. (In other words, the device camps on cell C independent of the suitability parameters signalled by cell C).

It is worth noting that if operators coordinate the configuration of suitability parameters for cells across a serving PLMN and equivalent PLMNs to such an extent that these parameters are similar across all cells, then this solution may be applicable even without any constraints on cell A and cell C.

In FIG. 16, the illustrated process starts with the MS camped on a serving cell, cell B (step 1602). The MS may then optionally receive a neighbour cell list from the serving cell (step 1604). The MS then decodes re-selection parameters from the list (step 1606). The MS will then identify a candidate cell and perform measurements on it (step 1608). If the cell does not meet re-selection criteria, the MS remains camped on the serving cell (step 1610). If the criteria are met, the MS checks if it has stored suitability parameters available (step 1612). If the MS has stored suitability parameters available, the MS checks the cell against these criteria (step 1614). If the criteria are not met, the MS remains camped on the serving cell. If the criteria are met or the MS does not have parameters stored and available for testing, the MS moves on to acquiring system information of the candidate cell (step 1616).

After acquiring system information, the MS considers radio related aspects such as signal strength or quality (step 1618). If these were evaluated when determining if the cell met re-selection criteria (step 1620) and the evaluation was not based on default parameters which were not explicitly signalled (step 1622) then the MS moves on to check another radio related aspect (step 1626). If there are no more aspects, then the cell is determined to meet the criteria (step 1632) and non-radio related criteria are evaluated (step 1634). In this way, if signalled criteria was used and checked against radio-related aspects then the MS does not re-determine the suitability.

If the radio related aspects were not evaluated when determining if the cell met re-selection criteria (step 1620) and if the evaluation used stored suitability parameters (step 1624), then the MS moves on to check another radio related aspect (step 1626). If there are no more aspects, then the cell is determined to meet the criteria (step 1632) and non-radio related criteria are evaluated (step 1634). In this way, if signalled criteria was used and checked against radio-related aspects then the MS does not re-determine the suitability.

If the radio related aspects were evaluated when determining if the cell met re-selection criteria (step 1620) and the evaluation was based on default parameters which were not explicitly signalled (step 1622), then the MS checks if the evaluation used stored suitability parameters (step 1624). If it did, the MS moves on to check another radio related aspect (step 1626). If there are no more aspects, then the cell is determined to meet the criteria (step 1632) and non-radio related criteria are evaluated (step 1634). In this way, if signalled criteria was used and checked against radio-related aspects then the MS does not re-determine the suitability.

If the MS did not use stored suitability parameters (step 1624), the MS evaluates the cell using parameters from the candidate cell's system information (step 1628), by establishing a communication channel and decoding the parameters. If the cell does not meet the criteria, it is determined to be unacceptable and the MS remains camped on the serving cell (step 1636). If it does meet the criteria, the MS moves on to check another radio related aspect (step 1626). If there are no more aspects, then the cell is determined to meet the criteria (step 1632) and non-radio related criteria are evaluated (step 1634). In this way, if signalled criteria was used and checked against radio-related aspects then the MS does not re-determine the suitability.

An exemplary algorithm for implementing examples of the present disclosure will now be described. This is an algorithm for inter-RAT cell re-selection based on priority information.

The algorithm in this subclause shall be used for inter-RAT cell re-selection if priorities are available to the MS and thresholds are provided by the network, and if the mobile station supports priority based inter-RAT cell re-selection and priority information for the serving cell is provided by the network A mobile station supporting E-UTRAN shall support priority based inter-RAT cell re-selection towards all the supported RATs. A mobile station not supporting E-UTRAN and supporting UTRAN and supporting priority based re-selection from UTRAN to GERAN shall support priority based inter-RAT cell re-selection towards UTRAN.

The network shall provide priority information if E-UTRAN frequencies are included in the neighbour cell list; the network may provide priority information if only UTRAN frequencies are included in the neighbour cell list. If priority information is available to the mobile station and the mobile station supports priority based inter-RAT cell re-selection, the algorithm in this subclause shall be used for inter-RAT re-selection towards all RATs. The rules regarding which set of priorities is valid at any given time are defined in 3GPP TS 44.018.

NOTE 1: "Priority information" includes priorities and thresholds which are related to each UTRAN or E-UTRAN frequency (e.g. UTRAN_PRIORITY, E-UTRAN_PRIORITY, THRESH_UTRAN_high, THRESH_E-UTRAN_high) and information related to the serving cell (e.g. GERAN_PRIORITY, THRESH_GSM_low).

NOTE 2: Throughout the specification, the phrase "neighbour cell list" will include also the E-UTRAN Neighbour Cell list where appropriate.

NOTE 3: Priorities need to be provided also for frequencies of networks that do not support priority-based cell re-selection.

If the 3G Cell Re-selection list or the E-UTRAN Neighbour Cell list include frequencies of other radio access technologies, the MS shall, at least every 5 s update the value RLA_C for the serving cell and each of the at least 6 strongest non serving GSM cells.

The MS shall then reselect a suitable cell of another radio access technology if the criteria below are satisfied. S_non-serving_XXX is the measurement quantity of a non-serving inter-RAT cell and XXX indicates the other radio access technology/mode and is defined as follows:

for a UTRAN cell, is the measured RSCP value for the cell minus UTRAN_QRXLEVMIN for the cell's frequency;

for a E-UTRAN cell, is the measured RSRP value for the cell minus E-UTRAN_QRXLEVMIN for the cell's frequency if THRESH_E-UTRAN_high_Q is not provided; otherwise, if THRESH_E-UTRAN_high_Q is provided, is the measured RSRQ value for the cell minus E-UTRAN_QQUALMIN for the cell's frequency.

For a GSM cell, S_GSM is defined as the C1 value for the cell (see subclause 6.4);

The definition of a suitable cell is specified in 3GPP TS 25.304 for UTRAN and 3GPP TS 36.304 for E-UTRAN. However, for the purposes of cell re-selection, the suitability requirements related to signal strength (respectively signal quality) need not be evaluated (i.e. the cell may be considered suitable even if it does not meet the requirements for signal strength (respectively signal quality) as specified in the definition of suitability, using parameters obtained from the system information of the candidate cell) if either:

signal strength (respectively signal quality) was evaluated as part of the re-selection algorithm, and the corresponding parameters used in the re-selection algorithm (e.g. for UMTS FDD signal quality, FDD_Qmin, FDD_Qmin_Offset; for UMTS signal strength, UTRAN_QRXLEVMIN) were explicitly signalled in the serving cell (i.e. default values were not used)

or:

the cell meets the suitability criteria for signal strength (respectively signal quality) based on stored parameters which were received from a cell operating using the same radio access technology and on the same frequency.

It should be noted and understood that the list of corresponding parameters above is not exhaustive. The disclosure applies where all, or some specified portion, of the parameters must be explicitly signalled and not default values.

Cell re-selection to a cell of another inter-RAT frequency shall be performed if any of the conditions below (to be evaluated in the order shown) is satisfied:

The S_non-serving_XXX of one or more cells of a higher priority inter-RAT frequency is greater than THRESH_XXX_high (or, in case of an E-UTRAN target, THRESH_E-UTRAN_high_Q, if provided) during a time interval T_re-selection; in that case, the mobile station shall consider the cells for re-selection in decreasing order of priority and, for cells of the same inter-RAT frequency or of inter-RAT frequencies of equal priority, in decreasing order of S_non-serving_XXX, and reselect the first cell that satisfies the conditions above;

the value of S_GSM is lower than THRESH_GSM_low for the serving cell and all measured GSM cells during a time interval T_re-selection; in this case, the mobile station shall consider for re-selection the inter-RAT cells in the following order, and reselect the first one that satisfies the following criteria:

cells of a lower priority inter-RAT frequency whose S_non-serving_XXX is greater than THRESH_XXX_ low (or, in case of an E-UTRAN target, THRESH_E-UTRAN_low_Q, if provided) during a time interval T_re-selection; these cells shall be considered in decreasing order of priority and, for cells of the same RAT, in decreasing order of S_non-serving_XXX;

if no cells satisfy the criterion above, inter-RAT cells for which, during a time interval T_re-selection, S_non-serving_XXX is higher than S_GSM for the serving cell by at least a specific hysteresis H_PRIO; these cells shall be considered in decreasing order of S_non-serving_XXX.

A UTRAN FDD cell shall only be reselected if, in addition to the criteria above, its measured Ec/No value is equal to or greater than FDD_Qmin–FDD_Qmin_Offset.

If E-UTRAN_Qmin is provided for a E-UTRAN frequency, a E-UTRAN cell on that frequency shall only be reselected if, in addition to the criteria above, its measured RSRQ value is equal to or greater than E-UTRAN_Qmin.

If THRESH_E-UTRAN_high_Q is provided for a E-UTRAN frequency, and if E-UTRAN_RSRPmin is provided, a E-UTRAN cell on that frequency shall only be reselected if, in addition to the criteria above, its measured RSRP value is equal to or greater than E-UTRAN_RSRPmin. If E-UTRAN_RSRPmin is not provided, the default value shall be used.

E-UTRAN cells which are included in the list of not allowed cells shall not be considered as candidates for cell re-selection. If the strongest cells on a E-UTRAN frequency are included in the list of not allowed cells, the mobile station may reselect the strongest valid cell (see subclause 8.4.7) on that frequency.

Cell re-selection to a cell of another radio access technology (e.g. UTRAN or E-UTRAN) shall not occur within 5 seconds after the MS has reselected a GSM cell from an inter-RAT cell if a suitable GSM cell can be found.

If the mobile station applies either common priorities or individual priorities received through dedicated signalling and priorities are available only for some inter-RAT frequencies, cells belonging to frequencies for which no priority is available or no threshold is provided by the serving cell shall not be considered for measurement and for cell re-selection.

If a mobile station in camped normally state (see 3GPP TS 43.022) applies individual priorities received through dedicated signalling and no priority is available for the serving cell, the mobile station shall consider any GSM cell (including the serving cell) to have lowest priority (i.e. lower than the eight network configured values).

A mobile station in camped on any cell state (see 3GPP TS 43.022) shall ignore individual priorities received through dedicated signalling and shall apply priorities received from the system information of the serving cell while attempting to find a suitable cell. If the mobile station supports CS voice services, the MS shall avoid reselecting acceptable (but not suitable) E-UTRA cells regardless of the priorities provided in system information.

NOTE 4: If the MS is camping on an acceptable cell, individual priorities are not discarded until an event leading to their deletion occurs.

In case of a re-selection attempt towards a barred UTRAN cell, the MS shall abandon further re-selection attempts towards this UTRAN cell as defined by the $T_{barred}$ value on the barred UTRAN cell (see 3GPP TS 25.331).

In case of a re-selection attempt towards a barred E-UTRAN cell, the MS shall abandon further re-selection attempts towards this E-UTRAN cell for a period of up to 20 min.

In case the MS attempts re-selection to a UTRAN cell which is not suitable (see 3GPP TS 25.304) due to being part of the "list of forbidden LAs for roaming" or belonging to a PLMN which is not indicated as being equivalent to the registered PLMN, the MS may abandon further re-selection attempts towards this UTRAN cell and all other cells on the same frequency, for a period of up to 20 min. If the MS has to perform cell selection, this limitation shall be removed. If the MS is redirected under GERAN control to a frequency for which the timer is running, any limitation on that frequency shall be removed.

In case the MS attempts re-selection to a E-UTRAN cell which is not suitable (see 3GPP TS 36.304) due to being part of the "list of forbidden tracking areas for roaming" (see 3GPP TS 24.301), and if the MS has received the PCID to TA Mapping information element (see 3GPP TS 44.018 and 3GPP TS 44.060) for the frequency of the cell, it shall abandon further re-selection attempts towards this E-UTRAN cell and any E-UTRAN cell which is known to belong to the same Tracking Area until the PCID to TA Mapping information changes in the serving cell or until cell re-selection occurs. If the mobile station has not received the PCID to TA Mapping information element for the frequency of the cell, the MS may abandon further re-selection attempts towards this E-UTRAN cell and all other cells on the same frequency, for a period of up to 20 min. If the MS has to perform cell selection, this limitation shall be removed. If the MS is redirected under GERAN control to a frequency for which the timer is running, any limitation on that frequency shall be removed.

In case the MS attempts re-selection to a E-UTRAN cell which is not suitable (see 3GPP TS 36.304) due to belonging to a PLMN which is not indicated as being equivalent to the registered PLMN, the MS may abandon further re-selection attempts towards this E-UTRAN cell and all other cells on the same frequency, for a period of up to 20 min. If the MS has to perform cell selection, this limitation shall be removed. If the MS is redirected under GERAN control to a frequency for which the timer is running, any limitation on that frequency shall be removed.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present disclosure are not limited to any particular operating system, system architecture, mobile device architecture, server architecture, or computer programming language.

The various embodiments presented above are merely examples and variations of the innovations described herein will be apparent to persons of ordinary skill in the art. As embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

It is to be noted that the methods as described have actions carried out in a particular order. However, it will be clear that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a wireless telecommunications device or UTRAN or other user equipment or access network components, a combination of multiple such components for example in communication with one another or a sub-network or full network of such components.

Embodiments have been described here in relation to 3GPP specifications. However the method and apparatus described are not intended to be limited to the specifications or the versions thereof referred to herein but may be applicable to future versions or other specifications.

According to an aspect of the disclosure, there may be provided a method performed by a device in a wireless network, the method comprising: storing a parameter of a first cell associated with a characteristic of the first cell; and, determining the suitability of a second cell for re-selection by the device, wherein, if the second cell has a characteristic in common with said characteristic of the first cell, determining the re-selection suitability of the second cell in accordance with said stored parameter.

The method may also further comprise: deleting from the device any previously stored parameters associated with said characteristic of the first cell.

The characteristic of the first cell may be the carrier frequency of the first cell.

According to another aspect of the disclosure, there may be provided a method performed by a device in a wireless network, the method comprising: determining network identification information of said first cell; determining a parameter of suitability criteria of a second cell; determining network identification information of said second cell; and, if said network identification information of said first cell is equal or equivalent to said network identification information of said second cell, storing said parameter.

The method may also further comprise: after the act of storing said parameter, associating said stored parameter with a characteristic of the second cell and determining the suitability of a third cell for re-selection by the device, wherein, if the third cell has a characteristic of the third cell in common with said characteristic of the second cell associated with said stored parameter, determining the re-selection suitability of the third cell in accordance with said stored parameter.

The method may also further comprise: deleting from the device any previously stored parameters associated with said characteristic of the second cell.

According to another aspect of the disclosure, there may be provided a method performed by a device in a wireless network, the method comprising: determining a parameter of suitability criteria of a second cell; determining if said second cell belongs to a closed subscriber group; and, if said second cell fails to belong to a closed subscriber group, storing said parameter.

The method may also further comprise: after the act of storing said parameter, associating said stored parameter with a characteristic of the second cell and determining the suitability of a third cell for re-selection by the device, wherein, if the third cell has a characteristic in common with said characteristic of the second cell associated with said stored parameter, determining the re-selection suitability of the third cell in accordance with said stored parameter.

The method may also further comprise: deleting from the device any previously stored parameters associated with said characteristic of the second cell.

According to another aspect of the disclosure, there may be provided a device for use in a wireless network, the device comprising one or more processors; a wireless transceiver coupled to the one or more processors; and memory coupled to the one or more processors, the one or more processors being operative to: store a parameter of a first cell associated with a characteristic of the first cell; and, determine the suitability of a second cell for re-selection by the device, wherein, if the second cell has a characteristic in common with said characteristic of the first cell, the re-selection suitability of the second cell is determined in accordance with said stored parameter.

The device may be further operative to: delete from the device any previously stored parameters associated with said characteristic of the first cell.

The characteristic of the first cell may also be the carrier frequency of the first cell.

According to another aspect of the disclosure, there is provided a device for use in a wireless network, the device comprising one or more processors; a wireless transceiver coupled to the one or more processors; and memory coupled to the one or more processors, the one or more processors being operative to: communicate with a first cell; determine network identification information of said first cell; determine a parameter of suitability criteria of a second cell; determine network identification information of said second cell; and, if said network identification information of said first cell is equal to said network identification information of said second cell, store said parameter.

The device may be further operative to: after said parameter has been stored, associate said stored parameter with a characteristic of the second cell and determine the suitability of a third cell for re-selection by the device, wherein, if the third cell has a characteristic in common with said characteristic of the second cell associated with said stored parameter, the re-selection suitability of the third cell is determined in accordance with said stored parameter.

The device may be further operative to: delete any previously stored parameters associated with said characteristic of the second cell.

According to another aspect of the disclosure, there may be provided a device for use in a wireless network, the device comprising one or more processors; a wireless transceiver coupled to the one or more processors; and memory coupled to the one or more processors, the one or more processors being operative to: communicate with a first cell; determine a parameter of suitability criteria of a second cell; determine if said second cell belongs to a closed subscriber group; and, if said second cell fails to belong to a closed subscriber group, storing said parameter.

The device may be further operative to: after said parameter has been stored, associate said stored parameter with characteristic of the second cell and determine the suitability of a third cell for re-selection by the device, wherein, if the third cell has characteristic in common with said characteristic of the second cell associated with said stored parameter, the re-selection suitability of the third cell is determined in accordance with said stored parameter.

The device may be further operative to: delete any previously stored parameters associated with said characteristic of the second cell.

According to another aspect of the disclosure, there may be provided a method performed by a device in a wireless network, the method comprising: determining a parameter from a first set of criteria, said criteria being re-selection criteria, of a second cell and, if said parameter satisfies a predetermined condition: determining system information of said second cell; and, determining the suitability of the second cell for re-selection by the device using a second set of criteria, said second set of criteria being suitability criteria, wherein if said suitability criteria contains the parameter included in said set of re-selection criteria, determining the suitability without re-determining said parameter for use in said suitability criteria.

The method may also further comprise: performing cell re-selection to said second cell.

According to another aspect of the disclosure, there may be provided a device for use in a wireless network, the device comprising one or more processors; a wireless transceiver coupled to the one or more processors; and memory coupled to the one or more processors, the one or more processors being operative to: determine a parameter from a first set of criteria, said criteria being re-selection criteria, of a second cell and, if said parameter satisfies a predetermined condition: determine system information of said second cell; and, determine the suitability of the second cell for re-selection by the device using a second set of criteria, said second set of criteria being suitability criteria, wherein if said suitability criteria contains the parameter included in said set of re-selection criteria, the device being operative to determine the suitability without re-determining said parameter for use in said suitability criteria.

The method according to the first aspect may also further comprise: if the second cell is determined to be suitable in accordance with said stored parameter, acquiring system information of the second cell.

The method according to the first aspect may also further comprise: if the second cell is determined not to be suitable in accordance with said stored parameter, omitting to acquire system information of the second cell.

According to another aspect of the disclosure, there may be provided a method performed by a device in a first cell of a radio access network, the method comprising evaluating an aspect of a second cell against a re-selection criterion, receiving system information of said second cell; and, determining the suitability of said second cell without evaluating said aspect against suitability criterion using parameters received in said system information.

The method may also further comprise: performing cell re-selection to said second cell.

According to another aspect of the disclosure, there may be provided a method performed by a device in a first cell of a radio access network, the method comprising evaluating an aspect of a second cell against a stored suitability criterion, receiving system information of said second cell; and, determining the suitability of said second cell without evaluating said aspect against suitability criterion using parameters received in said system information.

The method may also further comprise: performing cell re-selection to said second cell.

Additionally, the characteristic of the second cell may be determined by reference to one or more aspects of the physical layer, in isolation or in combination with data stored in the UE.

The invention claimed is:

1. A method in a wireless cellular telecommunications device camped on a serving cell, the device storing a parameter obtained from a first cell that is different from the serving cell, the method comprising:
    measuring an attribute of a signal received from a candidate UTRAN cell; and,
    evaluating the candidate cell for re-selection,
    wherein, if a carrier frequency of the candidate cell matches a carrier frequency of the first cell, the evaluation of the candidate cell for re-selection is based on at least the measured attribute and the stored parameter, else
    the evaluation of the candidate cell for re-selection is performed without using the stored parameter.

2. A method according to claim 1, further comprising performing re-selection from the serving cell to the candidate cell based on the evaluation.

3. A method according to claim 1, in which, if the frequency of the candidate cell matches the frequency of the first cell, the evaluation includes determining if the candidate cell meets re-selection requirements,
    wherein, if the measured attribute fails to exceed the stored parameter by a first pre-determined amount, the evaluation includes determining that the candidate cell does not meet re-selection requirements.

4. A method according to claim 3, in which the first predetermined amount is +10 dB.

5. A method according to claim 1, in which, if the carrier frequency of the candidate cell does not match the carrier frequency of the first cell, the evaluation of the candidate cell for re-selection includes:
    determining if the measured attribute exceeds a predetermined default value; and, if the measured attribute fails to exceed the predetermined default value, determining that the candidate cell does not meet re-selection requirements.

6. A method according claim 1, in which the device has having been previously camped on the first cell.

7. A method according to claim 1, in which the first cell and the candidate cell are of the same wireless radio access technology.

8. A method according to claim 1, in which the evaluation of the candidate cell includes:
    acquiring system information of the candidate cell, the system information including a parameter;
    determining if the measured attribute exceeds the candidate cell parameter by a second predetermined amount; and,
    if the measured attribute exceeds the candidate cell parameter by the second predetermined amount, performing re-selection to the candidate cell.

9. A method according to claim 8, in which the second predetermined amount is 0 dB.

10. A method according to claim 1, in which the stored parameter indicates a minimum required receive level.

11. A method according to claim 1, in which the measured attribute is received signal code power (RSCP).

12. A method according claim 1, in which the serving cell is a GERAN cell.

13. A method according to claim 1, further comprising:
acquiring a parameter of a second cell; and,
if a carrier frequency of the second cell does not match the carrier frequency of the first cell, storing said second cell parameter,
else if the carrier frequency of the second cell matches the carrier frequency of the first cell, replacing the stored parameter with the second cell parameter such that when evaluating a candidate cell for re-selection, if the carrier frequency of the candidate cell matches the carrier frequency of the second cell, the evaluation of the candidate cell for re-selection is based on at least the measured attribute and the stored second cell parameter.

14. A method according to claim 1, wherein if the candidate cell has an identifier equivalent to an identifier of the first cell, the evaluation of the candidate cell for re-selection is based on at least the measured attribute and the stored parameter, else
the evaluation of the candidate cell for re-selection is performed without using the stored parameter.

15. A method according to claim 14, in which the identifier is a primary scrambling code.

16. A method according to claim 1, further comprising:
determining if a candidate cell is a closed subscriber group cell; and,
if the candidate cell and the first cell are closed subscriber group cells, the evaluation of the candidate cell for re-selection is based on at least the measured attribute and the stored parameter, else
the evaluation of the candidate cell for re-selection is performed without using the stored parameter.

17. A method according to claim 1, in which the serving and candidate cells are of the same wireless radio network.

18. A method according to claim 1, in which the serving and candidate cells are of different wireless radio networks.

19. A wireless cellular telecommunications device adapted to:
camp on a serving cell;
store a parameter obtained from a first cell that is different from the serving cell;
measure an attribute of a signal received from a candidate UTRAN cell; and, evaluate the candidate cell for re-selection,
wherein if a carrier frequency of the candidate cell matches a carrier frequency of the first cell, the evaluation of the candidate cell for re-selection is based on at least the measured attribute and the stored parameter, else
the evaluation of the candidate cell for re-selection is performed without using the stored parameter.

20. A device according to claim 19, further adapted to perform re-selection from the serving cell to the candidate cell based on the evaluation.

21. A device according to claim 19, in which, if the frequency of the candidate cell matches the frequency of the first cell, the evaluation includes determining if the candidate cell meets re-selection requirements,
wherein, if the measured attribute fails to exceed the stored parameter by a first pre-determined amount, the evaluation includes determining that the candidate cell does not meet re-selection requirements.

22. A device according to claim 21, in which the first predetermined amount is +10 dB.

23. A device according to claim 19, in which, if the carrier frequency of the candidate cell does not match the carrier frequency of the first cell, the evaluation of the candidate cell for re-selection includes:
determining if the measured attribute exceeds a predetermined default value; and, if the measured attribute fails to exceed the predetermined default value, determining that the candidate cell does not meet re-selection requirements.

24. A device according claim 19, in which the device has been previously camped on the first cell.

25. A device according to claim 19, in which the first cell and the candidate cell are of the same wireless radio access technology.

26. A device according to claim 19, in which the evaluation of the candidate cell includes:
acquiring system information of the candidate cell, the system information including a parameter;
determining if the measured attribute exceeds the candidate cell parameter by a second predetermined amount; and,
if the measured attribute exceeds the candidate cell parameter by the second predetermined amount, performing re-selection to the candidate cell.

27. A device according to claim 26, in which the second predetermined amount is 0 dB.

28. A device according to claim 19, in which the stored parameter indicates a minimum required receive level.

29. A device according to claim 19, in which the measured attribute is received signal code power (RSCP).

30. A device according claim 19, in which the serving cell is a GERAN cell.

31. A device according to claim 19, further adapted to:
acquire a parameter of a second cell; and,
if a carrier frequency of the second cell does not match the carrier frequency of the first cell, store said second cell parameter,
else if the carrier frequency of the second cell matches the carrier frequency of the first cell, replace the stored parameter with the second cell parameter such that when evaluating a candidate cell for re-selection, if the carrier frequency of the candidate cell matches the carrier frequency of the second cell, the evaluation of the candidate cell for re-selection is based on at least the measured attribute and the stored second cell parameter.

32. A device according to claim 19, wherein if the candidate cell has an identifier equivalent to an identifier of the first cell, the evaluation of the candidate cell for re-selection is based on at least the measured attribute and the stored parameter, else
the evaluation of the candidate cell for re-selection is performed without using the stored parameter.

33. A device according to claim 32, in which the identifier is a primary scrambling code.

34. A device according to claim 19, further comprising:
determining if a candidate cell is a closed subscriber group cell; and,
if the candidate cell and the first cell are closed subscriber group cells, the evaluation of the candidate cell for re-selection is based on at least the measured attribute and the stored parameter, else
the evaluation of the candidate cell for re-selection is performed without using the stored parameter.

35. A device according to claim 19, in which the serving and candidate cells are of the same wireless radio network.

36. A device according to claim 19, in which the serving and candidate cells are of different wireless radio networks.

37. A computer-readable storage medium having stored thereon instructions which can be executed by a device to:
camp on a serving cell;
store a parameter obtained from a first cell that is different from the serving cell;
measure an attribute of a signal received from a candidate UTRAN cell; and,
evaluate a candidate cell for re-selection,
wherein, if a carrier frequency of the candidate cell matches a carrier frequency of the first cell, the evaluation of the candidate cell for re-selection is based on at least the measured attribute and the stored parameter, else
the evaluation of the candidate cell for re-selection is performed without using the stored parameter.

38. A method in a wireless cellular telecommunications device camped on a serving cell, the device storing a parameter obtained from a first cell that is different from the serving cell, the method comprising:
measuring an attribute of a signal received from a candidate cell; and
evaluating the candidate cell for re-selection according to a ranking algorithm,
wherein, if a carrier frequency of the candidate cell matches a carrier frequency of the first cell, the evaluation of the candidate cell for re-selection is based on at least the measured attribute and the stored parameter, else
the evaluation of the candidate cell for re-selection is performed without using the stored parameter.

39. A method according to claim 38, in which the candidate cell is a UTRAN cell.

40. A method according to claim 38, further comprising performing re-selection from the serving cell to the candidate cell based on the evaluation.

41. A method according to claim 38, in which, if the frequency of the candidate cell matches the frequency of the first cell, the evaluation includes determining if the candidate cell meets re-selection requirements,
wherein, if the measured attribute fails to exceed the stored parameter by a first pre-determined amount, the evaluation includes determining that the candidate cell does not meet re-selection requirements.

42. A method according to claim 41, in which the first predetermined amount is +10 dB.

43. A method according to claim 38, in which, if the carrier frequency of the candidate cell does not match the carrier frequency of the first cell, the evaluation of the candidate cell for re-selection includes:
determining if the measured attribute exceeds a predetermined default value; and, if the measured attribute fails to exceed the predetermined default value, determining that the candidate cell does not meet re-selection requirements.

44. A method according claim 38, in which the device has been previously camped on the first cell.

45. A method according to claim 38, in which the first cell and the candidate cell are of the same wireless radio access technology.

46. A method according to claim 38, in which the evaluation of the candidate cell includes:
acquiring system information of the candidate cell, the system information including a parameter;
determining if the measured attribute exceeds the candidate cell parameter by a second predetermined amount; and,
if the measured attribute exceeds the candidate cell parameter by the second predetermined amount, performing re-selection to the candidate cell.

47. A method according to claim 38, in which the second predetermined amount is 0 dB.

48. A method according to claim 38, in which the stored parameter indicates a minimum required receive level.

49. A method according to claim 38, in which the measured attribute is received signal code power (RSCP).

50. A method according claim 38, in which the serving cell is a GERAN cell.

51. A method according to claim 38, further comprising:
acquiring a parameter of a second cell; and,
if a carrier frequency of the second cell does not match the carrier frequency of the first cell, storing said second cell parameter,
else if the carrier frequency of the second cell matches the carrier frequency of the first cell, replacing the stored parameter with the second cell parameter such that when evaluating a candidate cell for re-selection, if the carrier frequency of the candidate cell matches the carrier frequency of the second cell, the evaluation of the candidate cell for re-selection is based on at least the measured attribute and the stored second cell parameter.

52. A method according to claim 38, wherein if the candidate cell has an identifier equivalent to an identifier of the first cell, the evaluation of the candidate cell for re-selection is based on at least the measured attribute and the stored parameter, else
the evaluation of the candidate cell for re-selection is performed without using the stored parameter.

53. A method according to claim 52, in which the identifier is a primary scrambling code.

54. A method according to claim 38, further comprising:
determining if a candidate cell is a closed subscriber group cell; and, if the candidate cell and the first cell are closed subscriber group cells, the evaluation of the candidate cell for re-selection is based on at least the measured attribute and the stored parameter, else
the evaluation of the candidate cell for re-selection is performed without using the stored parameter.

55. A method according to claim 38, in which the serving and candidate cells are of the same wireless radio network.

56. A method according to claim 38, in which the serving and candidate cells are of different wireless radio networks.

57. A wireless cellular telecommunications device adapted to:
camp on a serving cell;
store a parameter obtained from a first cell that is different from the serving cell;
measure an attribute of a signal received from one or more candidate cells; and,
evaluate a candidate cell for re-selection according to a ranking algorithm, wherein, if a carrier frequency of the candidate cell matches a carrier frequency of the first cell, the evaluation of the candidate cell for re-selection is based on at least the measured attribute and the stored parameter, else
the evaluation of the candidate cell for re-selection is performed without using the stored parameter.

58. A device according to claim 57, in which the candidate cell is a UTRAN cell.

59. A device according to claim 57, further adapted to perform re-selection from the serving cell to the candidate cell based on the evaluation.

60. A device according to claim 57, in which, if the frequency of the candidate cell matches the frequency of the first cell, the evaluation includes determining if the candidate cell meets re-selection requirements,
wherein, if the measured attribute fails to exceed the stored parameter by a first pre-determined amount, the evaluation includes determining that the candidate cell does not meet re-selection requirements.

61. A device according to claim 60, in which the first predetermined amount is +10 dB.

62. A device according to claim 57, in which, if the carrier frequency of the candidate cell does not match the carrier frequency of the first cell, the evaluation of the candidate cell for re-selection includes:
determining if the measured attribute exceeds a predetermined default value; and, if the measured attribute fails to exceed the predetermined default value, determining that the candidate cell does not meet re-selection requirements.

63. A device according claim 57, in which the device has been previously camped on the first cell.

64. A device according to claim 57, in which the first cell and the candidate cell are of the same wireless radio access technology.

65. A device according to claim 57, in which the evaluation of the candidate cell includes:
acquiring system information of the candidate cell, the system information including a parameter;
determining if the measured attribute exceeds the candidate cell parameter by a second predetermined amount; and,
if the measured attribute exceeds the candidate cell parameter by the second predetermined amount, performing re-selection to the candidate cell.

66. A device according to claim 65, in which the second predetermined amount is 0 dB.

67. A device according to claim 57, in which the stored parameter indicates a minimum required receive level.

68. A device according to claim 57, in which the measured attribute is received signal code power (RSCP).

69. A device according claim 57, in which the serving cell is a GERAN cell.

70. A device according to claim 57, further adapted to:
acquire a parameter of a second cell; and,
if a carrier frequency of the second cell does not match the carrier frequency of the first cell, store said second cell parameter,
else if the carrier frequency of the second cell matches the carrier frequency of the first cell, replace the stored parameter with the second cell parameter such that when evaluating a candidate cell for re-selection, if the carrier frequency of the candidate cell matches the carrier frequency of the second cell, the evaluation of the candidate cell for re-selection is based on at least the measured attribute and the stored second cell parameter.

71. A device according to claim 57, wherein if the candidate cell has an identifier equivalent to an identifier of the first cell, the evaluation of the candidate cell for re-selection is based on at least the measured attribute and the stored parameter, else
the evaluation of the candidate cell for re-selection is performed without using the stored parameter.

72. A device according to claim 71, in which the identifier is a primary scrambling code.

73. A device according to claim 57, further comprising:
determining if a candidate cell is a closed subscriber group cell; and,
if the candidate cell and the first cell are closed subscriber group cells, the evaluation of the candidate cell for re-selection is based on at least the measured attribute and the stored parameter, else
the evaluation of the candidate cell for re-selection is performed without using the stored parameter.

74. A device according to claim 57, in which the serving and candidate cells are of the same wireless radio network.

75. A device according to claim 57, in which the serving and candidate cells are of different wireless radio networks.

76. A computer-readable storage medium having stored thereon instructions which can be executed by a device to:
camp on a serving cell;
store a parameter obtained from a first cell that is different from the serving cell;
measure an attribute of a signal received from a candidate cell; and,
evaluate the candidate cell for re-selection according to a ranking algorithm,
wherein, if a carrier frequency of the candidate cell matches a carrier frequency of the first cell, the evaluation of the candidate cell for re-selection is based on at least the measured attribute and the stored parameter, else
the evaluation of the candidate cell for re-selection is performed without using the stored parameter.

* * * * *

UNITED STATES PATENT AND TRADEMARK OFFICE
CERTIFICATE OF CORRECTION

PATENT NO. : 8,521,167 B2
APPLICATION NO. : 13/308008
DATED : August 27, 2013
INVENTOR(S) : Raghavendra Magadi Rangaiah, David Philip Hole and Johanna Lisa Dwyer It is certified that error appears in the above-identified patent and that said Letters Patent is hereby corrected as shown below:

IN THE CLAIMS:

Claim 6, column 46, line 49, insert --to-- after "according".

Claim 6, column 46, line 50, delete "having".

Claim 12, column 47, line 3, insert --to-- after "according".

Claim 24, column 48, line 10, insert --to-- after "according".

Claim 30, column 48, line 31, insert --to-- after "according".

Claim 44, column 49, line 56, insert --to-- after "according".

Claim 50, column 50, line 10, insert --to-- after "according".

Claim 63, column 51, line 18, insert --to-- after "according".

Claim 69, column 51, line 39, insert --to-- after "according".

Signed and Sealed this
Tenth Day of December, 2013

Margaret A. Focarino
*Commissioner for Patents of the United States Patent and Trademark Office*